US010901431B1

(12) United States Patent
Ebrahimi Afrouzi et al.

(10) Patent No.: US 10,901,431 B1
(45) Date of Patent: Jan. 26, 2021

(54) SYSTEM AND METHOD FOR GUIDING HEADING OF A MOBILE ROBOTIC DEVICE

(71) Applicants:Ali Ebrahimi Afrouzi, San Diego, CA (US); Lukas Fath, York (CA); Chen Zhang, Richmond (CA); Brian Highfill, Castro Valley, CA (US)

(72) Inventors: Ali Ebrahimi Afrouzi, San Diego, CA (US); Lukas Fath, York (CA); Chen Zhang, Richmond (CA); Brian Highfill, Castro Valley, CA (US)

(73) Assignee: AI Incorporated, Toronto (CA)

( * ) Notice: Subject to any disclaimer, the term of this patent is extended or adjusted under 35 U.S.C. 154(b) by 13 days.

(21) Appl. No.: 16/504,012

(22) Filed: Jul. 5, 2019

Related U.S. Application Data

(63) Continuation-in-part of application No. 15/410,624, filed on Jan. 19, 2017, now Pat. No. 10,386,847.

(60) Provisional application No. 62/746,688, filed on Oct. 17, 2018, provisional application No. 62/740,573, filed on Oct. 3, 2018, provisional application No. 62/740,580, filed on Oct. 3, 2018, provisional application No. 62/702,148, filed on Jul. 23, 2018, provisional application No. 62/699,101, filed on Jul. 17, 2018, provisional application No. 62/720,478, filed on Aug. 21, 2018, provisional application No. 62/720,521, filed on Aug. 21, 2018, provisional application No. 62/735,137, filed on Sep. 23, 2018, provisional application No. 62/740,558, filed on Oct. 3, 2018, provisional application No. 62/696,723, filed on Jul. 11, 2018, provisional application No.

(Continued)

(51) Int. Cl.
*G05D 1/02* (2020.01)
*G06T 7/68* (2017.01)
*G06T 7/521* (2017.01)
*G06T 7/70* (2017.01)

(52) U.S. Cl.
CPC ........... *G05D 1/0246* (2013.01); *G06T 7/521* (2017.01); *G06T 7/68* (2017.01); *G06T 7/70* (2017.01)

(58) Field of Classification Search
USPC .................................................. 700/245–264
See application file for complete search history.

(56) References Cited

U.S. PATENT DOCUMENTS 4,119,900 A * 10/1978 Kremnitz ............. G05B 13/047
318/580
5,202,661 A * 4/1993 Everett, Jr. ............ G08B 13/00
340/522
(Continued)

*Primary Examiner* — Jonathan L Sample

(57) ABSTRACT

A tangible, non-transitory, machine readable medium storing instructions that when executed by an image processor effectuates operations including: causing the camera to capture one or more images of an environment of the robotic device; receiving, with the image processor, one or more multidimensional arrays including at least one parameter that describes a feature included in the one or more images, wherein values of the at least one parameter correspond with pixels of a corresponding one or more images of the feature; determining, with the image processor, an amount of asymmetry of the feature in the one or more images based on at least a portion of the values of the at least one parameter; and, transmitting, with the image processor, a signal to the processor of the controller to adjust a heading of the robotic device by an amount proportional to the amount of asymmetry of the feature.

20 Claims, 58 Drawing Sheets

Related U.S. Application Data

62/736,676, filed on Sep. 26, 2018, provisional application No. 62/699,367, filed on Jul. 17, 2018, provisional application No. 62/699,582, filed on Jul. 17, 2018.

(56) References Cited

U.S. PATENT DOCUMENTS

| | | | | |
|---|---|---|---|---|
| 5,804,942 | A * | 9/1998 | Jeong | G05D 1/0255 318/580 |
| 5,961,571 | A * | 10/1999 | Gorr | G01S 3/783 340/988 |
| 6,038,501 | A * | 3/2000 | Kawakami | G05D 1/0227 701/23 |
| 6,041,274 | A * | 3/2000 | Onishi | G01B 11/005 318/580 |
| 6,308,118 | B1 * | 10/2001 | Holmquist | B66F 9/063 701/23 |
| 7,012,551 | B2 * | 3/2006 | Shaffer | B60R 1/00 315/82 |
| 7,509,213 | B2 * | 3/2009 | Choi | G05D 1/0225 318/568.12 |
| 8,175,743 | B2 * | 5/2012 | Nara | G01B 11/002 700/178 |
| 8,352,075 | B2 * | 1/2013 | Cho | G06T 7/514 700/259 |
| 8,452,450 | B2 * | 5/2013 | Dooley | A47L 11/4036 700/258 |
| 8,521,352 | B1 * | 8/2013 | Ferguson | G05D 1/0212 701/25 |
| 8,781,627 | B2 * | 7/2014 | Sandin | G05D 1/028 700/258 |
| 9,327,407 | B2 * | 5/2016 | Jones | G05D 1/0227 |
| 9,392,920 | B2 * | 7/2016 | Halloran | G05D 1/0225 |
| 2002/0051128 | A1 * | 5/2002 | Aoyama | G01S 7/4811 356/4.03 |
| 2004/0210344 | A1 * | 10/2004 | Hara | B64C 33/025 700/245 |
| 2005/0134440 | A1 * | 6/2005 | Breed | G01S 17/89 340/435 |
| 2006/0058921 | A1 * | 3/2006 | Okamoto | G05D 1/0214 700/255 |
| 2006/0129276 | A1 * | 6/2006 | Watabe | G05D 1/0274 700/245 |
| 2006/0136097 | A1 * | 6/2006 | Kim | G05D 1/0234 700/258 |
| 2007/0192910 | A1 * | 8/2007 | Vu | G05D 1/0274 700/245 |
| 2007/0250212 | A1 * | 10/2007 | Halloran | A47L 9/2894 700/245 |
| 2007/0285041 | A1 * | 12/2007 | Jones | G05D 1/0227 318/568.12 |
| 2008/0039974 | A1 * | 2/2008 | Sandin | B60L 50/52 700/258 |
| 2009/0118890 | A1 * | 5/2009 | Lin | G05D 1/0246 701/28 |
| 2010/0172136 | A1 * | 7/2010 | Williamson, III | F41H 13/00 362/259 |
| 2010/0292884 | A1 * | 11/2010 | Neumann | G05D 1/0242 701/25 |
| 2011/0288684 | A1 * | 11/2011 | Farlow | G05D 1/0038 700/264 |
| 2012/0078417 | A1 * | 3/2012 | Connell, II | B25J 13/087 700/248 |
| 2012/0182392 | A1 * | 7/2012 | Kearns | B25J 19/023 348/46 |
| 2012/0206336 | A1 * | 8/2012 | Bruder | G01S 7/4808 345/156 |
| 2013/0094668 | A1 * | 4/2013 | Poulsen | H03G 11/002 381/107 |
| 2013/0105670 | A1 * | 5/2013 | Borosak | B60Q 9/004 250/214.1 |
| 2013/0138246 | A1 * | 5/2013 | Gutmann | G05D 1/0274 700/253 |
| 2013/0226344 | A1 * | 8/2013 | Wong | G05D 1/0242 700/258 |
| 2013/0245937 | A1 * | 9/2013 | DiBernardo | G05D 1/0234 701/514 |
| 2013/0325244 | A1 * | 12/2013 | Wang | B25J 9/1689 701/26 |
| 2014/0074287 | A1 * | 3/2014 | LaFary | B25J 9/1676 700/253 |
| 2014/0088761 | A1 * | 3/2014 | Shamlian | G05D 1/0227 700/253 |
| 2014/0324270 | A1 * | 10/2014 | Chan | G01S 7/4814 701/28 |
| 2015/0054639 | A1 * | 2/2015 | Rosen | H04M 3/2281 340/439 |
| 2015/0125035 | A1 * | 5/2015 | Miyatani | B25J 9/1697 382/103 |
| 2015/0168954 | A1 * | 6/2015 | Hickerson | G01S 7/483 700/259 |
| 2015/0202770 | A1 * | 7/2015 | Patron | G06Q 20/386 700/245 |
| 2015/0234385 | A1 * | 8/2015 | Sandin | B60L 50/62 700/258 |
| 2016/0096272 | A1 * | 4/2016 | Smith | B25J 9/0081 700/253 |
| 2016/0121487 | A1 * | 5/2016 | Mohan | H04L 67/34 700/248 |
| 2016/0188985 | A1 * | 6/2016 | Kim | B25J 9/1666 701/28 |
| 2016/0375592 | A1 * | 12/2016 | Szatmary | B25J 11/0085 700/255 |
| 2017/0036349 | A1 * | 2/2017 | Dubrovsky | B25J 9/162 |

* cited by examiner

SYSTEM AND METHOD FOR GUIDING HEADING OF A MOBILE ROBOTIC DEVICE

CROSS-REFERENCE TO RELATED APPLICATIONS

This application is a Continuation-in-Part of Non-Provisional patent application Ser. No. 15/410,624, filed Jan. 19, 2017, which claims the benefit of Provisional Patent Application No. 62/297,403, filed Feb. 19, 2016.

Additionally, this application claims the benefit of Provisional Patent Application Nos. 62/746,688, filed Oct. 17, 2018, 62/740,573, filed Oct. 3, 2018, 62/740,580, filed Oct. 3, 2018, 62/702,148, filed Jul. 23, 2018, 62/699,101, filed Jul. 17, 2018, 62/720,478, filed Aug. 21, 2018, 62/720,521, filed Aug. 21, 2018, 62/735,137, filed Sep. 23, 2018, 62/740,558, filed Oct. 3, 2018, 62/696,723, filed Jul. 11, 2018, 62/736,676, filed Sep. 26, 2018, 62/699,367, filed Jul. 17, 2018, and 62/699,582, filed Jul. 17, 2018, each of which is hereby incorporated by reference.

In this patent, certain U.S. patents, U.S. patent applications, or other materials (e.g., articles) have been incorporated by reference. Specifically, U.S. patent application Ser. Nos. 16/048,179, 16/048,185, 16/163,541, 16/163,562, 16/163,508, 16/185,000, 16/041,286, 15/406,890, 14/673,633, 16/163,530, 16/297,508, 15/955,480, 15/425,130, 15/955,344, 15/243,783, 15/954,335, 15/954,410, 15/257,798, 15/674,310, 15/224,442, 15/683,255, 14/817,952, 15/619,449, 16/198,393, 62/740,558, 16/239,410, 15/447,122, and 16/393,921 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to methods for automatically guiding or directing the heading of a mobile robotic device.

BACKGROUND

Mobile robots are being used with increased frequency to accomplish a variety of routine tasks. In some cases, a mobile robot has a heading, or a front end which is ideally positioned towards the location where work should begin. It may be beneficial in some cases for a mobile robot to be able to automatically sense the direction of its heading in relation to parts of an environment, for example, the walls of a room, so that it may maintain a desired heading in relation thereto.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a robotic device, including: a chassis including a set of wheels; a motor to drive the set of wheels; a battery to power the robotic device; a controller in communication with the motor and wheels, the controller including a processor operable to control the motor and wheels to steer movement of the robotic device; a camera; and, a tangible, non-transitory, machine readable medium storing instructions that when executed by an image processor effectuates operations including: causing the camera to capture one or more images of an environment of the robotic device; receiving, with the image processor, one or more multidimensional arrays including at least one parameter that describes a feature included in the one or more images, wherein values of the at least one parameter correspond with pixels of a corresponding one or more images of the feature; determining, with the image processor, an amount of asymmetry of the feature in the one or more images based on at least a portion of the values of the at least one parameter; and, transmitting, with the image processor, a signal to the processor of the controller to adjust a heading of the robotic device by an amount proportional to the amount of asymmetry of the feature, and wherein the robotic device maintains its heading while moving along a movement path within the environment until it either reaches a border of the environment or the image processor detects asymmetry of the feature in the one or more images.

Provided is a method for guiding a robotic device, including: capturing, with a camera, one or more images of a feature of an environment; receiving, with an image processor, the one or more images of the feature; determining, with the image processor, an amount of asymmetry of the feature in the one or more images based on at least a portion of the pixels in the one or more images; and, transmitting, with the image processor, a signal to a controller in communication with a wheel motor of a robotic device to adjust the heading of the robotic device by an amount proportional to the amount of asymmetry of the feature, wherein the controller maintains the heading of the robotic device while moving along a movement path until the robotic device either reaches a border or the image processor detects asymmetry of the feature in the one or more images.

DETAILED DESCRIPTION OF SOME EMBODIMENTS

Some embodiments relate to a method for guiding or directing the heading of a mobile robotic device.

In some embodiments, one or more collimated light emitters positioned on a mobile robotic device emit collimated light beams in a predetermined pattern. The light pattern may include two light points, or may be more complex. For the purposes of this teaching, a pattern including two light points will be used as an example. However, any pattern may be used without limitation. In some embodiments, the one or more light emitters are positioned such that light is emitted in a predetermined plane onto surfaces in front of the one or more light emitters. In some embodiments, a camera positioned on the mobile robotic device captures images of the light pattern as it is projected upon surfaces substantially opposite the light emitters. In some embodiments, the captured images are sent to a processor electrically coupled to the camera and the processor analyzes the images to determine whether the image of the light pattern is distorted. Distortion of the image will occur if the plane upon which the image is projected is not parallel to the plane in which the light is emitted. If the image is distorted, the plane of light emission is not parallel to the surface upon which the light is being projected. If the image is not distorted, the plane of light emission is parallel to the surface upon which the light is being projected. Depending on the results of the image analysis, the device may take any of a variety of actions to maintain or correct its heading.

Figure 1A:
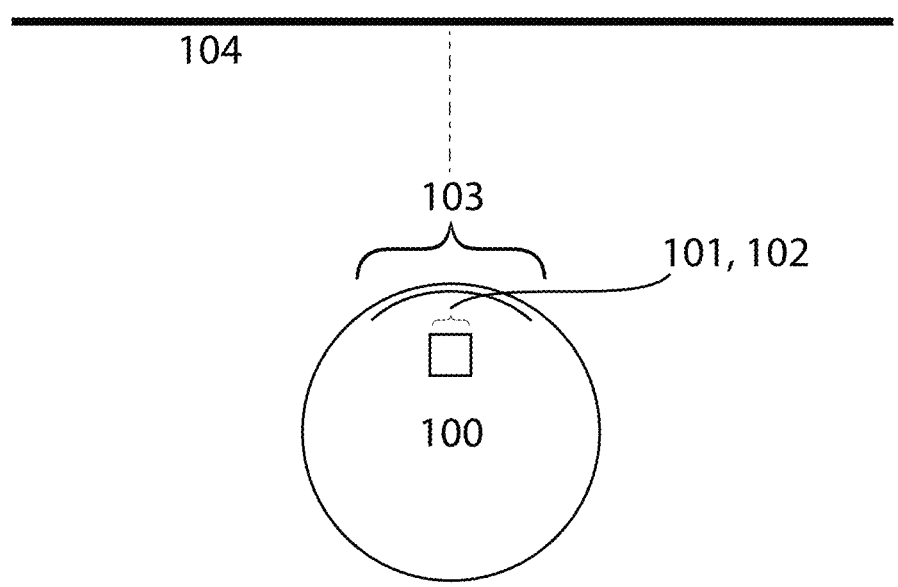
FIG. 1A illustrates an overhead view of a mobile robotic device with a camera and light emitter pair arranged to maintain a heading perpendicular to walls, according to some embodiments.
Figure 1B:
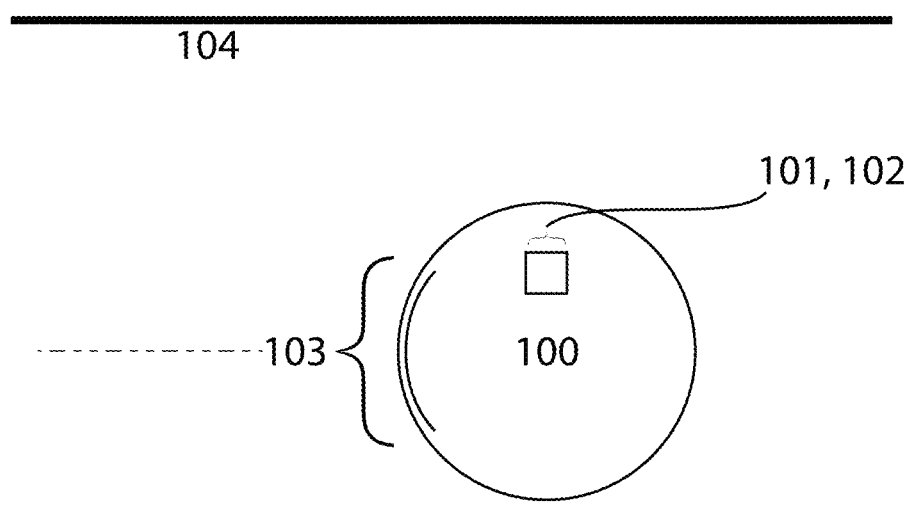
FIG. 1B illustrates an overhead view of a mobile robotic device with a camera and light emitter pair arranged to maintain a heading parallel to walls, according to some embodiments.

The system may be used to maintain any heading positioned desired; it is the light emitter and camera that will be maintained in a position parallel to surfaces upon which the light is projected, so the position of the light emitter and camera relative to the heading of the mobile robotic device will determine what heading will be maintained. For example, if it is desired to maintain a robotic device heading perpendicular to walls in the workspace, the light emitter and camera should be positioned parallel to the heading of the mobile robotic device. This way, when the camera and light emitter are perpendicular to the plane of the wall, the heading of the mobile robotic device will also be perpendicular to the wall. This is illustrated in FIG. 1A, where robotic device 100 has a camera and light emitter pair 101, 102 that are oriented in the same direction as the heading 103 of the robotic device. When the camera and light emitter pair 101, 102 are perpendicular to the wall 104, the heading of robotic device is also perpendicular thereto. If it is desired to maintain a robotic device heading parallel to walls in the workspace, the light emitter and camera should be positioned perpendicular to the heading of the mobile robotic device. For example, in FIG. 1B, the camera and light emitter pair 101, 102 are positioned perpendicular to the heading 103 of the robotic device 100. This way, when the camera and light emitter 101, 102 are perpendicular to the wall 104, the heading 103 of the mobile robotic device 100 will be parallel to the wall 104. The particular positioning of the camera and light emitter relative to the heading of the mobile robotic device is not limited to the examples shown here and may be any position as desired by a manufacturer or operator. The camera and light emitter may be positioned at 10 degrees, 30 degrees, 45 degrees, or any angle with respect to the heading of the mobile robotic device.

Figure 2A:
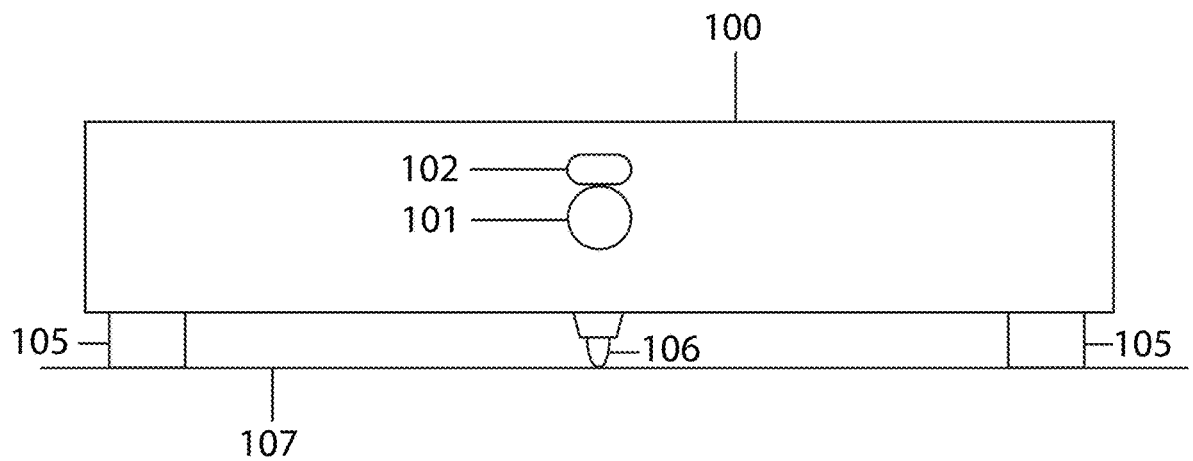
FIG. 2A illustrates a front elevation view of a mobile robotic device with a camera and light emitter pair, according to some embodiments.

FIG. 2A illustrates a front elevation view of a mobile robotic device 100. A light emitter 101 and camera 102 are positioned on the mobile robotic device 100. Positioned in this manner, the system will keep the heading of the mobile robotic device perpendicular to surfaces in the work environment. In the example shown, the mobile robotic device also includes left and right wheels 105 and a front wheel 106. The mobile robotic device is positioned on a work surface 107.

Figure 2B:
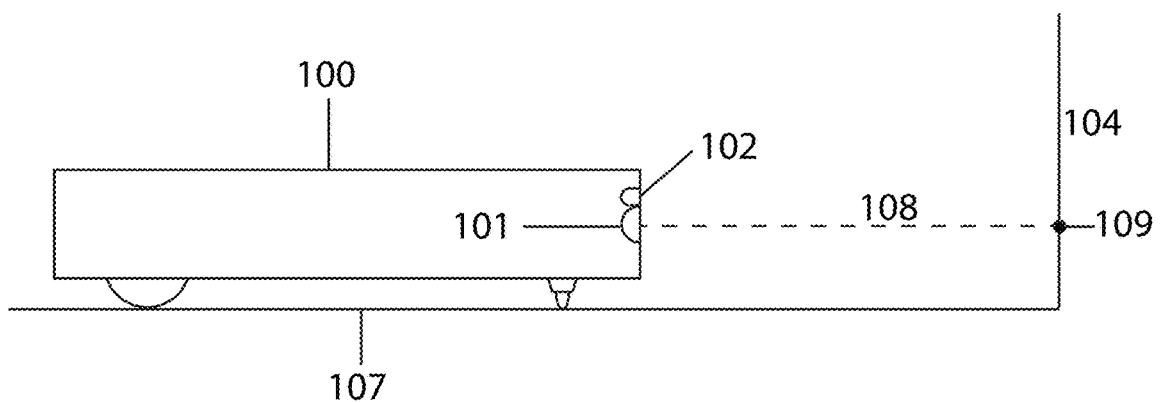
FIG. 2B illustrates a side elevation view of a mobile robotic device with a camera and light emitter pair, according to some embodiments.

FIG. 2B illustrates a side elevation view of the mobile robotic device 100. The projected light emissions from the light emitter 101 are represented by the dashed line 108. Again, the camera 102 can be seen positioned on the mobile robotic device in a manner such that it may capture images of the area where light emissions are projected. The mobile robotic device is positioned on the work surface 107 with its heading toward wall 104. In this position, light emissions 108 will be projected onto the wall 104 at or around the point 109.

Figure 3A:
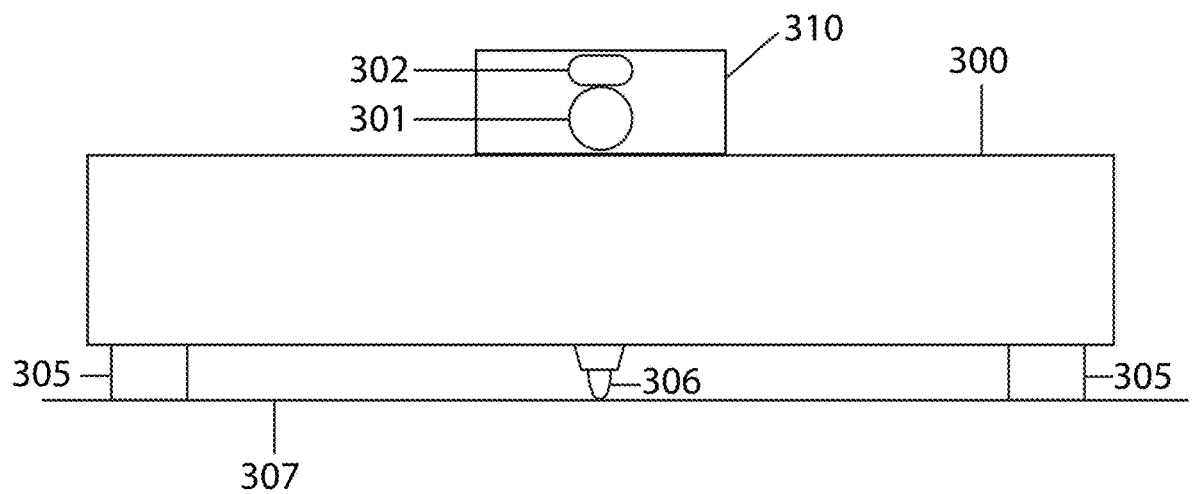
FIG. 3A illustrates a front elevation view of a mobile robotic device with a camera and light emitter pair on a rotatable housing, according to some embodiments.
Figure 3B:
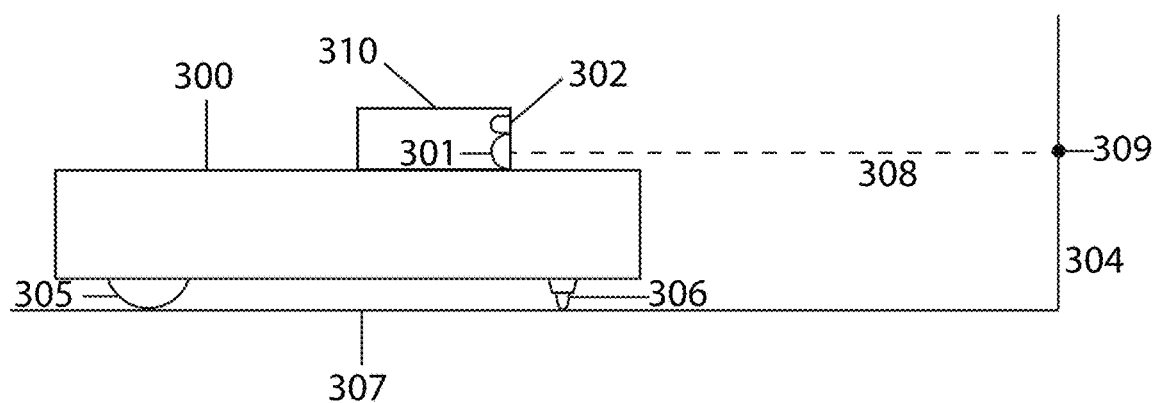
FIG. 3B illustrates a side elevation view of a mobile robotic device with a camera and light emitter pair on a rotatable housing, according to some embodiments.

FIGS. 3A and 3B illustrate an alternative embodiment. FIG. 3A illustrates a front elevation view of robotic device 300. In this embodiment, the light emitter 301 and camera 302 are positioned on a rotatable housing 310 that is positioned on the mobile robotic device. The housing 310 may be rotated relative to the mobile robotic device 300. In the example shown, the mobile robotic device also includes left and right wheels 305 and a front wheel 306. The mobile robotic device is positioned on a work surface 307.

FIG. 3B illustrates a side elevation view of robotic device 300. The light emitter 301 and camera 302 are positioned on the rotatable housing 310. The projected light emissions from the light emitter 301 are represented by the dashed line 308. Again, the camera 302 can be seen positioned in a manner such that it may capture images of the area where light emissions are projected. The mobile robotic device also includes wheels 305 and front wheel 306. The mobile robotic device is positioned on the work surface 307 and facing a wall 304. In this position, light emissions will be projected onto the wall 304 at or around the point 309.

Positioning the light emitter and camera on a rotatable housing serves to allow an operator to adjust the heading angle that the robotic device will maintain with relation to surfaces in the environment. An operator could rotate the housing 310 so that the robotic device maintains a heading perpendicular to surfaces, parallel to surfaces, at a 45 degree angle to surfaces, or any other angle without limitation.

In some embodiments, a mobile robotic device may contain a plurality of light emitter and camera sets positioned to be projected on and capture images of multiple surfaces.

In some embodiments, two sets of one light emitter and one camera are positioned parallel to and opposite one another to face two opposing directions. This configuration would permit a mobile robotic device to locate a reference surface with less movement than embodiments with only one light emitter and one camera.

Figure 4A:
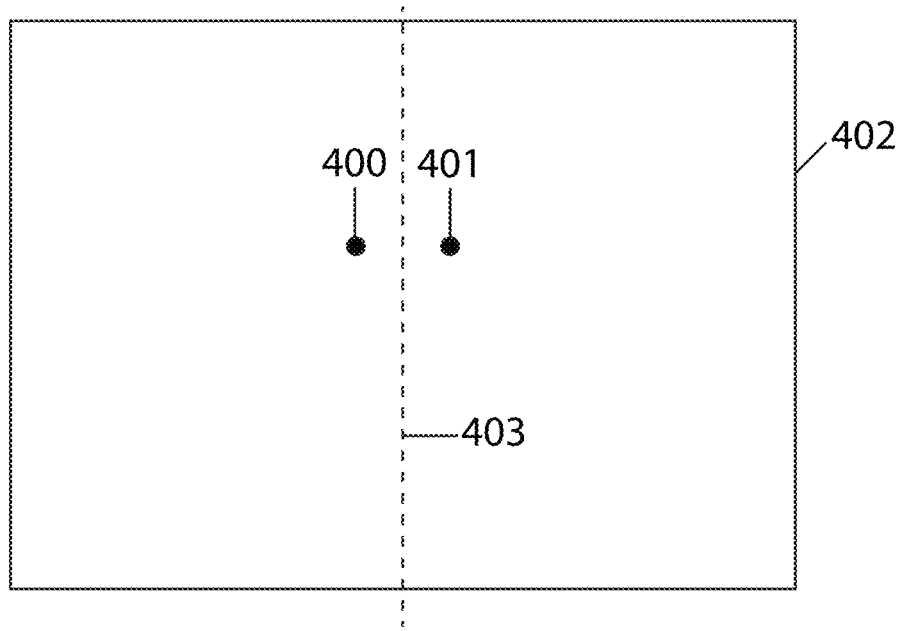
FIG. 4A illustrates a front elevation view of a light pattern captured by a camera, according to some embodiments.
Figure 4B:
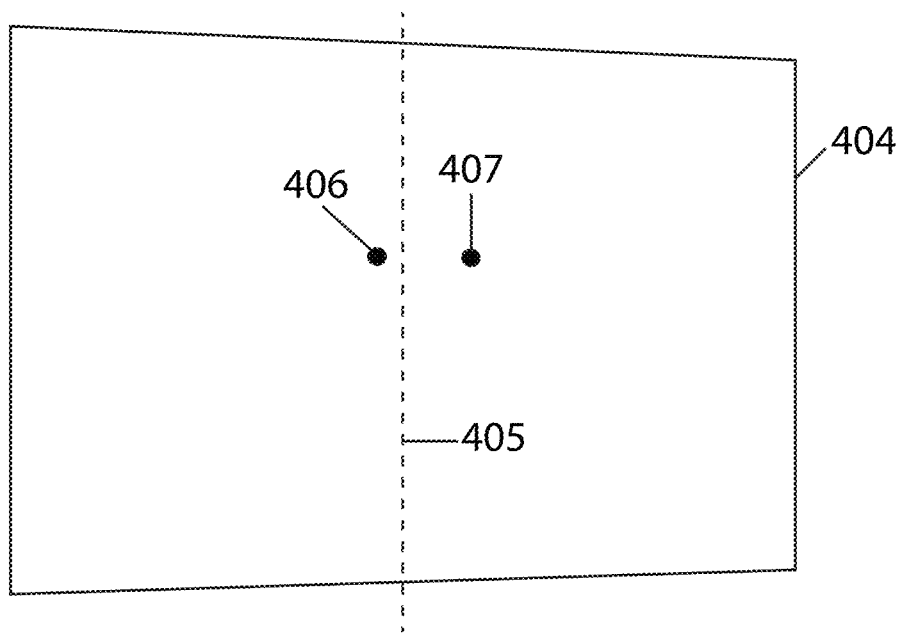
FIG. 4B illustrates a front elevation view of a light pattern captured by a camera, according to some embodiments.

FIG. 4A illustrates a front elevation view of a light pattern captured by a camera. The two points 400, 401 represent the light pattern emitted by a light emitter (not shown). When the image 402 is divided in half by a vertical centerline 403, the two sides of the image are mirror images. By dividing the image in half in this way and comparing the halves, the processor may determine whether there is any distortion in the image. FIG. 4B illustrates the same light pattern projected onto a surface plane which is not parallel to the plane of the light emitter and camera lens. When the image 404 is divided in half by the vertical centerline 405 and the halves are compared, they are not mirror images of each other. The point 406 is closer to the centerline than the point 407. Thus, the processor may determine that the plane upon which the light is projected is not parallel to the plane of light emission.

In some embodiments, upon detecting image distortion, such as described above, the mobile robotic device may be caused to turn a predetermined amount, and repeat the process of emitting the light pattern, capturing an image, and checking for distortion until such a time as the system finds there is substantially no distortion in the image.

Figure 5A:
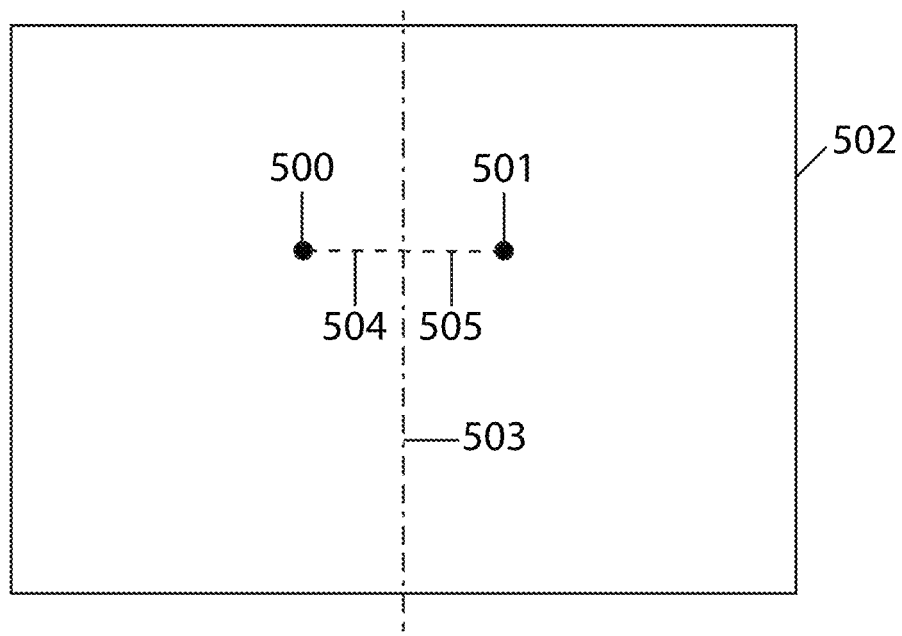
FIG. 5A illustrates a front elevation view of a light pattern captured by a camera, according to some embodiments.

In some embodiments, the processor is provided with data to assist with decision-making. Images of the projected light pattern are captured and analyzed. FIG. 5A illustrates that when the image 502 is divided in half by a vertical centerline 503, the distance from the centerline to each point 500, 501 may be measured by counting the number of columns of unilluminated pixels found between the centerline and the first illuminated pixel (the projected light) in both left and right directions. These distances may then be compared to determine whether the points are the same distance from the centerline. In FIG. 5A, the distances 504 and 505 are substantially the same, and thus the system may conclude that there is no distortion in the image and the plane of the surface on which the light is projected is parallel to the plane in which the light was emitted. In this case, the mobile robotic device would be caused to maintain its heading.

Figure 5B:
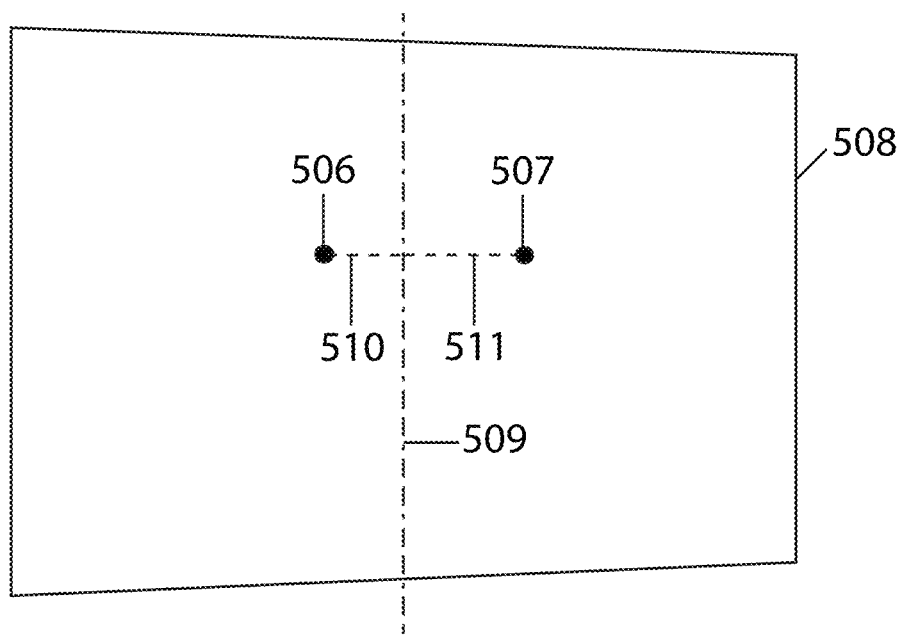
FIG. 5B illustrates a front elevation view of a light pattern captured by a camera, according to some embodiments.

FIG. 5B illustrates that when the image 508 is divided in half by a vertical centerline 509, the distance from the centerline to each point 506, 507 may be measured in the same manner as last described, by counting the number of columns of unilluminated pixels found between the centerline and the first illuminated pixel in both left and right directions. In this example, when compared, the distance 510 is smaller than the distance 511. The mobile robotic device shall be caused to adjust its heading by turning or rotating in the direction of the side on which the greater distance from the centerline to the illuminated pixel is detected. In some embodiments, the system my calculate the turning angle using $[F(A)-F(B)]*g(x) \propto$ turning angle, wherein $F(A)$ is a function of the counted distance from the centerline to the first illuminated pixel in a left direction, $F(B)$ is a function of the counted distance from the centerline to the first illuminated pixel in a right direction, x is a multidimensional array which contains specific parameters of the position of the illuminated pixels and the camera in relation to each other, and $g(x)$ is a transform function of x.

Based on the above formula, if A is larger than B, the result will be positive, and the robotic device will be caused to turn in a positive (clockwise) direction. If B is larger than A, the result will be negative, causing the robotic device to turn in a negative (counterclockwise) direction.

Figure 6:
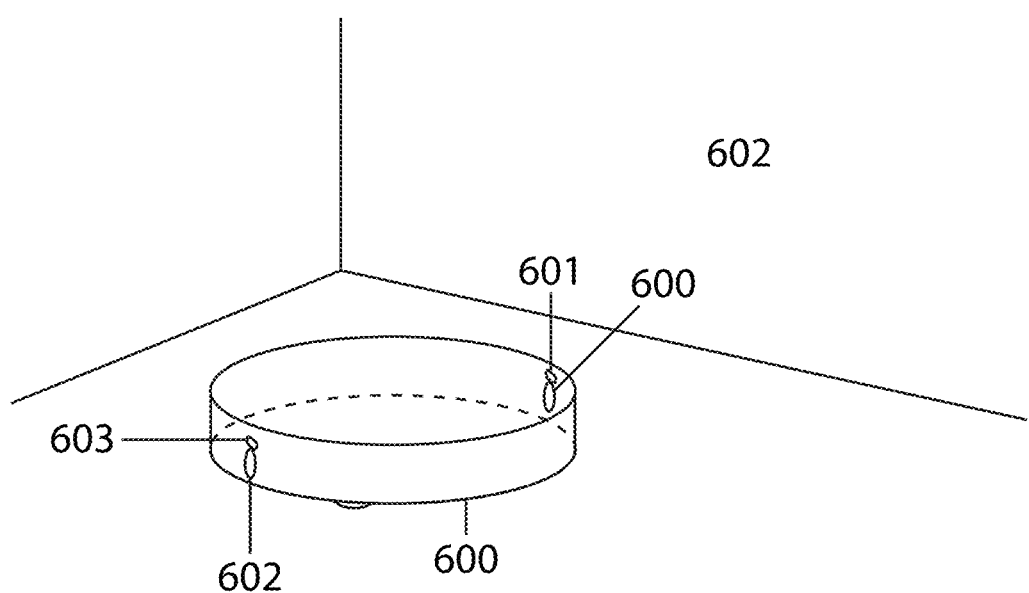
FIG. 6 illustrates a perspective view of a mobile robotic device with two camera and light emitter pairs, according to some embodiments.

FIG. 6 illustrates a perspective view of an embodiment of the invention with two light emitter and camera pairs. The robotic device 600 has a first light emitter 600 and camera 601 positioned in a first position perpendicular to the surface 500. A second light emitter 602 and camera 603 are positioned in a second position opposite of the first light emitter 600 and camera 601.

Figure 7:
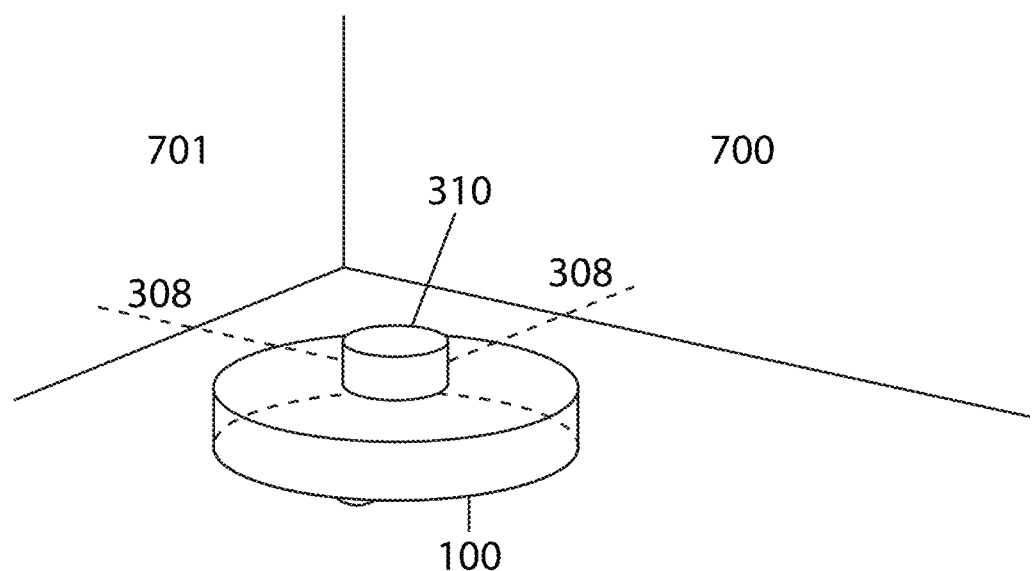
FIG. 7 illustrates a perspective view of a mobile robotic device with two camera and light emitter pairs on a rotatable housing, according to some embodiments.

FIG. 7 illustrates a perspective view of an embodiment with multiple light emitter and camera pairs positioned on a rotatable housing. The rotatable housing 310 is positioned on robotic device 100. Two light emitter and camera pairs are positioned on the housing (not shown) to emit and capture images of light on surfaces 700, 701 in two directions concurrently. The dashed lines 308 represent the projected light emissions from the light emitters.

In some embodiments, the method uses a machine learning algorithm to teach itself how to get to a desired heading faster. In some embodiments, the two illuminated points may be identified by dividing the space in the captured image into a grid and finding the x and y coordinates of the illuminated points. The x coordinates will have positions in relevance to a virtual vertical centerline. For each pair of x coordinates, an action (movement of the robotic device) will be assigned which, based on prior measurements, is supposed to change the heading of the robotic device to the desired heading with respect to the surface on which the points are projected.

Because a robotic device's work environment is stochastic, sensor measurements are prone to noise, and actuators are subject to systematic bias, there will be overshooting, undershooting and other unpredicted situations which may lead the robotic device to end up with a heading that is not exactly the desired heading in spite of the system predictions. In order to compensate for the above, in some embodiments, the method uses machine learning techniques to further enhance the turning process of finding the perpendicular state more accurately and faster.

Pre-measured data shall be provided during an initial set-up phase or during manufacture, which will be divided into two sets: training set and test set.

Training set data and test set data are entered into the system. With each set of x coordinates and relative position to the virtual vertical centerline, there is an associated action, which changes the heading of the robot to the desired heading. From this correspondence, the machine devises a function, which maps every relative position to an action.

From the initial training set, the robotic device devises a policy to associate a particular action with each sensed data point.

In a first step, the robotic device will use its test set data to measure the accuracy of its function or policy. If the policy is accurate, it continues to use the function, if the policy is not accurate, the robotic device revises the function until the testing shows a high accuracy of the function.

As the system gathers new data, or more correspondence between the x coordinates and the resulting action, the system revises the function to improve the associated actions.

A person skilled in the art will appreciate that different embodiments of the invention can use different machine learning techniques, including, but not limited to: supervised learning, unsupervised learning, reinforcement learning, and semi-supervised learning.

In some embodiments, a camera of the robotic device captures images of the environment. In some embodiments, the processor of the robotic device uses the images to create a map of the environment. In some embodiments, the images are transmitted to another external computing device and at least a portion of the map is generated by the processor of the external computing device. In some embodiments, the camera captures images while the robotic device moves back and forth across the environment in straight lines, such as in a boustrophedon pattern. In some embodiments, the camera captures images while the robotic device rotates 360 degrees. In some embodiments, the environment is captured in a continuous stream of images taken by the camera as the robotic device moves around the environment or rotates in one or more positions.

In some embodiments, the camera captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In some embodiments, the robotic device rotates to observe a second field of view partly overlapping the first field of view of the camera and captures a depth image of objects within the second field of view (e.g., differing from the first field of view due to a difference in camera pose). In some embodiments, the processor compares the readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, wherein the robotic device is holding the communication device, the processor infers the angular disposition of the robotic device from the size of the area of overlap and uses the angular disposition to adjust odometer information to overcome the inherent noise of an odometer. Further, in some embodiments, it is not necessary that the value of overlapping readings from the first and second fields of view be the exact same for the area of overlap to be identified. It is expected that readings will be affected by noise, resolution of the equipment taking the readings, and other inaccuracies inherent to measurement devices. Similarities in the value of readings from the first and second fields of view can be identified when the values of the readings are within a tolerance range of one another. The area of overlap may also be identified by the processor by recognizing matching patterns among the readings from the first and second fields of view, such as a pattern of increasing and decreasing values. Once an area of overlap is identified, in some embodiments, the processor uses the area of overlap as the attachment point and attaches the two fields of view to form a larger field of view. Since the overlapping readings from the first and second fields of view within the area of overlap do not necessarily have the exact same values and a range of tolerance between their values is allowed, the processor uses the overlapping readings from the first and second fields of view to calculate new readings for the overlapping area using a moving average or another suitable mathematical convolution. This is expected to improve the accuracy of the readings as they are calculated from the combination of two separate sets of readings. The processor uses the newly calculated readings as the readings for the overlapping area, substituting for the readings from the first and second fields of view within the area of overlap. In some embodiments, the processor uses the new readings as ground truth values to adjust all other readings outside the overlapping area. Once all readings are adjusted, a first segment of the map is complete. In other embodiments, combining readings of two fields of view may include transforming readings with different origins into a shared coordinate system with a shared origin, e.g., based on an amount of translation or rotation of the camera between frames. The transformation may be performed before, during, or after combining. The method of using the camera to capture readings within consecutively overlapping fields of view and the processor to identify the area of overlap and combine readings at identified areas of overlap is repeated, e.g., until at least a portion of the environment is discovered and a map is constructed. Additional mapping methods that may be used by the processor to generate a map of the environment are described in U.S. patent application Ser. Nos. 16/048,179, 16/048,185, 16/163,541, 16/163,562, 16/163,508, and 16/185,000, the entire contents of which are hereby incorporated by reference.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix can be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, can be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an IMU. In some embodiments, the translation and rotation of the camera between frames is measured by two separate movement measurement devices (e.g., optical encoder and gyroscope of the robotic device) and the movement of the robot is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

Figure 8A:
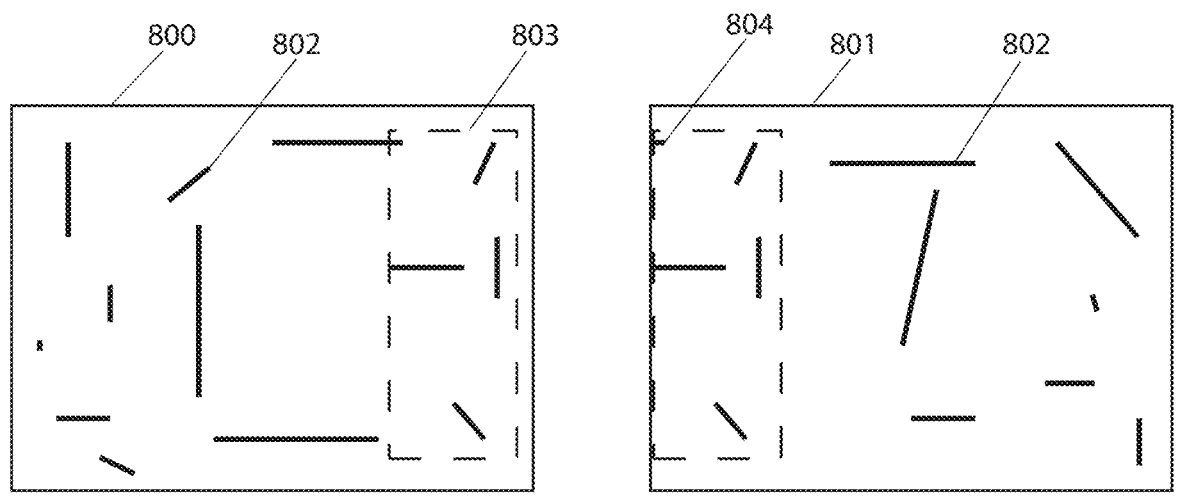
FIGS. 8A-8C illustrate how an overlapping area is detected in some embodiments using raw pixel intensity data and the combination of data at overlapping points.
Figure 8B:
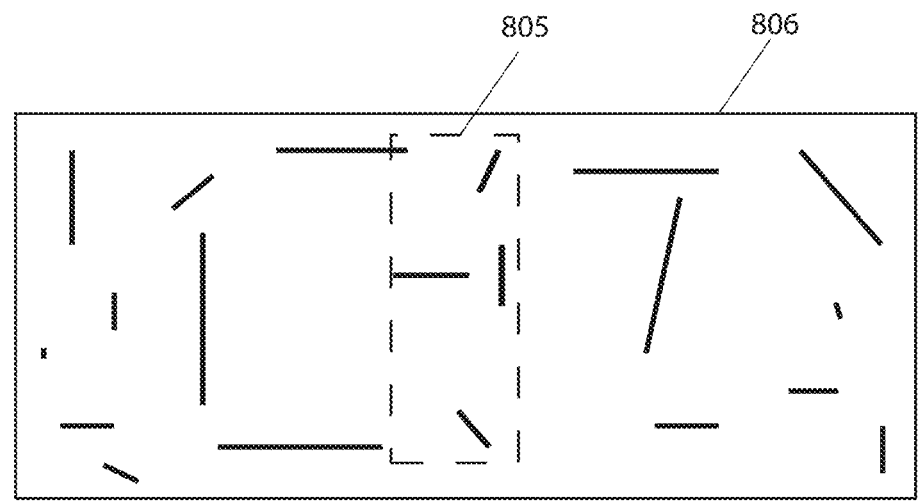
Figure 8C:
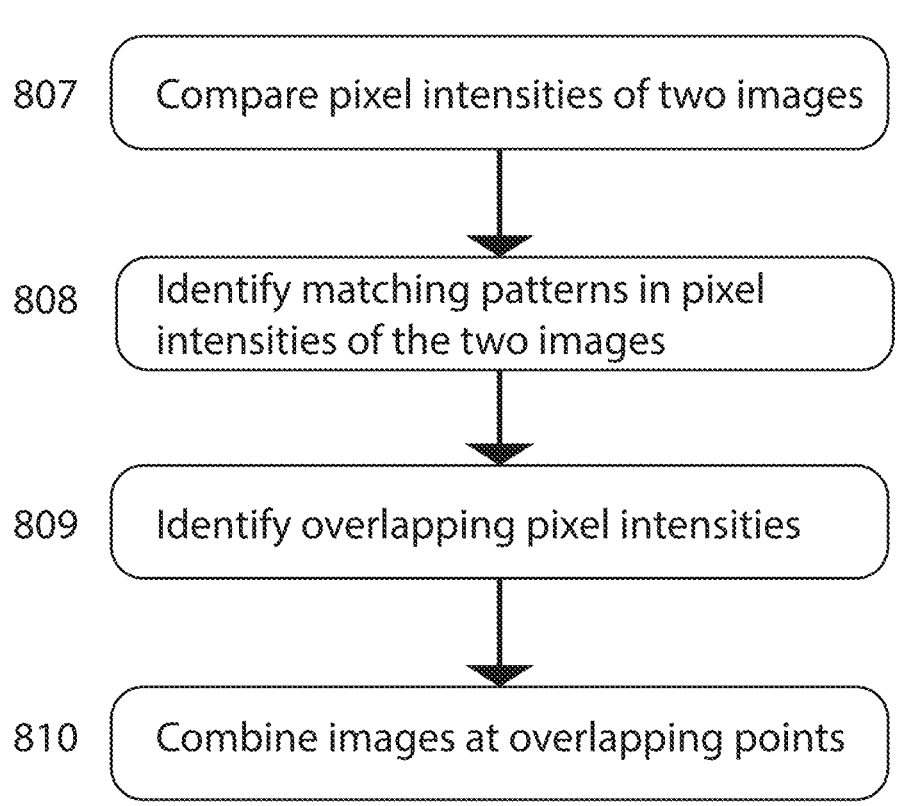

FIGS. 8A and 8B illustrate an example of identifying an area of overlap using raw pixel intensity data and the combination of data at overlapping points. In FIG. 8A, the overlapping area between overlapping image 800 captured in a first field of view and image 801 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 802 represent pixels with high pixel intensity value (such as those above a certain threshold) in each image. Area 803 of image 800 and area 804 of image 801 capture the same area of the environment and, as such, the same pattern for pixel intensity values is sensed in area 803 of image 800 and area 804 of image 801. After identifying matching patterns in pixel intensity values in image 800 and 801, an overlapping area between both images may be determined. In FIG. 8B, the images are combined at overlapping area 805 to form a larger image 806 of the environment. In some cases, data corresponding to the images may be combined. For instance, depth values may be aligned based on alignment determined with the image. FIG. 8C illustrates a flowchart describing the process illustrated in FIGS. 8A and 8B wherein a processor of a robot at first stage 807 compares pixel intensities of two images captured by a sensor of the robot, at second stage 808 identifies matching patterns in pixel intensities of the two images, at third stage 809 identifies overlapping pixel intensities of the two images, and at fourth stage 810 combines the two images at overlapping points.

Figure 9A:
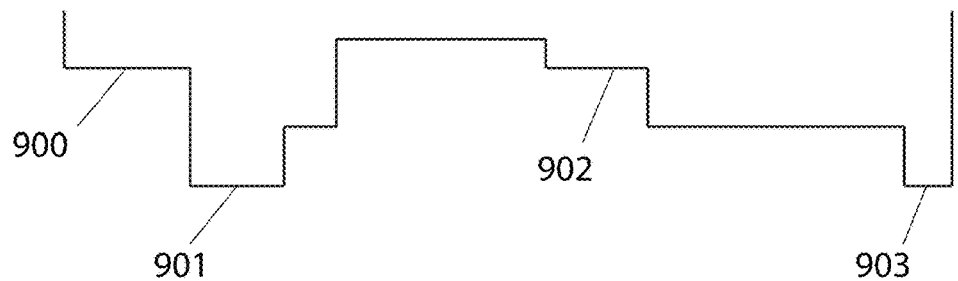
FIGS. 9A-9C illustrate how an overlapping area is detected in some embodiments using raw pixel intensity data and the combination of data at overlapping points.
Figure 9B:
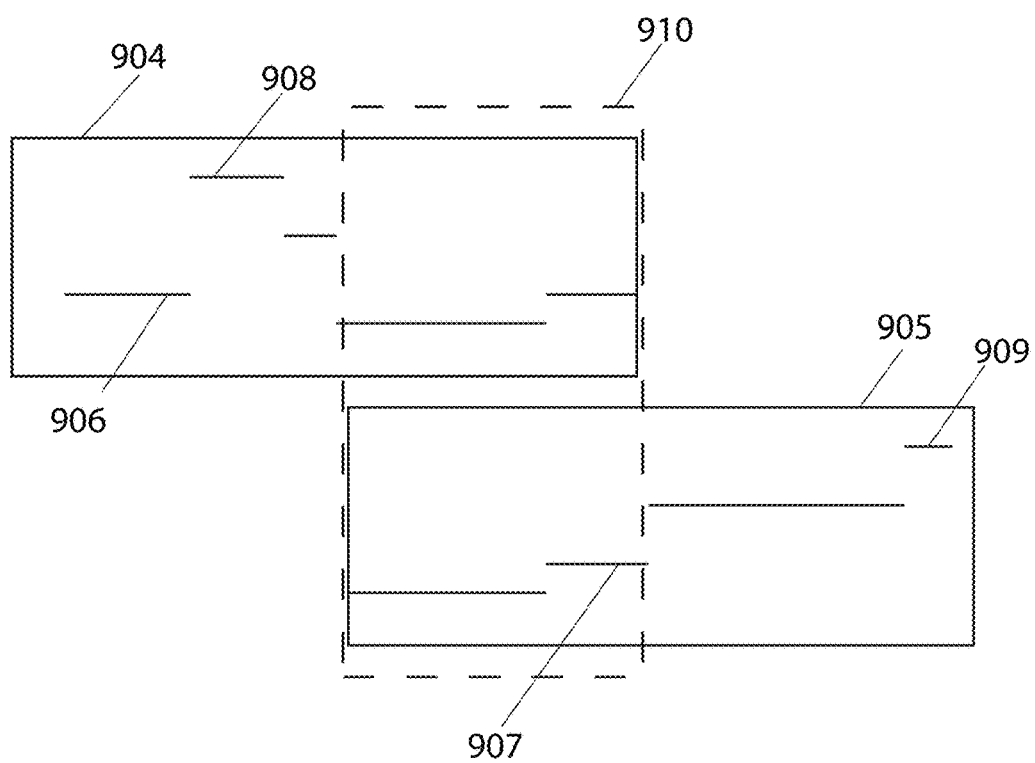
Figure 9C:
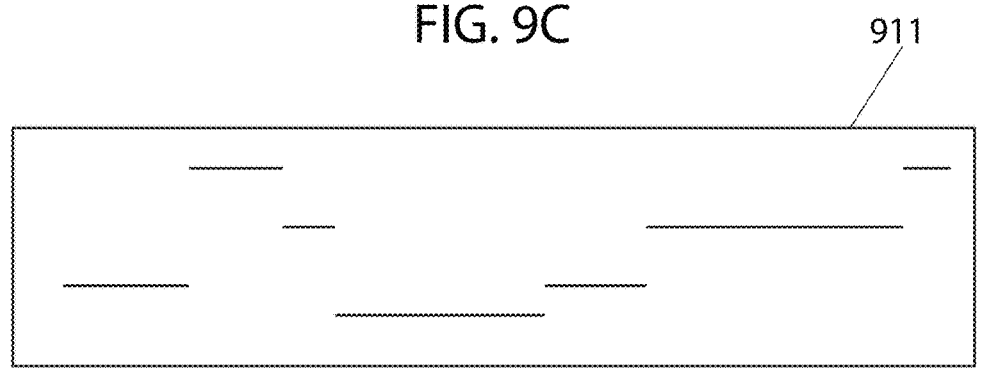

FIGS. 9A-9C illustrate another example of identifying an area of overlap using raw pixel intensity data and the combination of data at overlapping points. FIG. 9A illustrates a top (plan) view of an object, such as a wall, with uneven surfaces wherein, for example, surface 900 is further away from an observer than surface 901 or surface 902 is further away from an observer than surface 903. In some embodiments, at least one infrared line laser positioned at a downward angle relative to a horizontal plane coupled with at least one image sensor may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from an image sensor in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 9B, captured images 904 and 905 of the laser line projected onto the object surface for two different fields of view are shown. Projected laser lines with lower position, such as laser lines 906 and 907 in images 904 and 905 respectively, correspond to object surfaces 900 and 902, respectively, further away from the infrared illuminator and image sensor. Projected laser lines with higher position, such as laser lines 908 and 909 in images 904 and 905 respectively, correspond to object surfaces 901 and 903, respectively, closer to the infrared illuminator and image sensor. Captured images 904 and 905 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 904 and 905 bound within dashed lines 910 have similar arrangement of pixel intensities as both images captured a same portion of the object within their field of view. Therefore, images 904 and 905 may be combined at overlapping points to construct larger image 911 of the environment shown in FIG. 9C. The position of the laser lines in image 911, indicated by pixels with intensity value above a threshold intensity, may be used to infer depth of surfaces of objects from the infrared illuminator and image sensor (see, U.S. patent application Ser. No. 15/674,310, the entire contents of which is hereby incorporated by reference).

In some embodiments, the processor of the robot detects if a gap in the map exists. In some embodiments, the robot navigates to the area in which the gap exists for further exploration, capturing new images using the camera while exploring. New data is captured by the camera and combined with the existing map at overlapping points until the gap in the map no longer exists or is reduced.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

In some embodiments, the robotic device uses readings from its sensors to generate at least a portion of the map of the environment using the techniques described above (e.g., stitching readings together at overlapping points). In some embodiments, readings from external sensors (e.g., closed circuit television) are used to generate at least a portion of the map. In some embodiments, a depth perceiving device is used to measure depth to objects in the environment and depth readings are used to generate a map of the environment. Depending on the type of depth perceiving device used, depth may be perceived in various forms. The depth perceiving device may be a depth sensor, a camera, a camera coupled with IR illuminator, a stereovision camera, a depth camera, a time-of-flight camera or any other device which can infer depths from captured depth images. For example, in one embodiment the depth perceiving device may capture depth images containing depth vectors to objects, from which the processor can calculate the Euclidean norm of each vector, representing the depth from the camera to objects within the field of view of the camera. In some instances, depth vectors originate at the depth perceiving device and are measured in a two-dimensional plane coinciding with the line of sight of the depth perceiving device. In other instances, a field of three-dimensional vectors originating at the depth perceiving device and arrayed over objects in the environment are measured. In another example, the depth perceiving device infers depth of an object based on the time required for a light (e.g., broadcast by a depth-sensing time-of-flight camera) to reflect off of the object and return. In a further example, depth to objects may be inferred using the quality of pixels, such as brightness, intensity, and color, in captured images of the objects, and in some cases, parallax and scaling differences between images captured at different camera poses For example, a depth perceiving device may include a laser light emitter disposed on a baseplate emitting a collimated laser beam creating a projected light point on surfaces substantially opposite the emitter, two image sensors disposed on the baseplate, positioned at a slight inward angle towards to the laser light emitter such that the fields of view of the two image sensors overlap and capture the projected light point within a predetermined range of distances, the image sensors simultaneously and iteratively capturing images, and an image processor overlaying the images taken by the two image sensors to produce a superimposed image showing the light points from both images in a single image, extracting a distance between the light points in the superimposed image, and, comparing the distance to figures in a preconfigured table that relates distances between light points with distances between the baseplate and surfaces upon which the light point is projected (which may be referred to as 'projection surfaces' herein) to find an estimated distance between the baseplate and the projection surface at the time the images of the projected light point were captured. In some embodiments, the preconfigured table may be constructed from actual measurements of distances between the light points in superimposed images at increments in a predetermined range of distances between the baseplate and the projection surface.

Figure 10A:
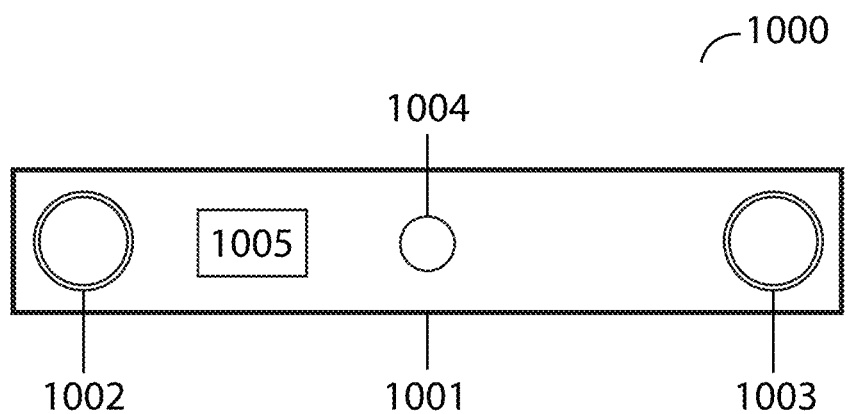
FIGS. 10A and 10B illustrates an example of a depth perceiving device, according to some embodiments.
Figure 10B:
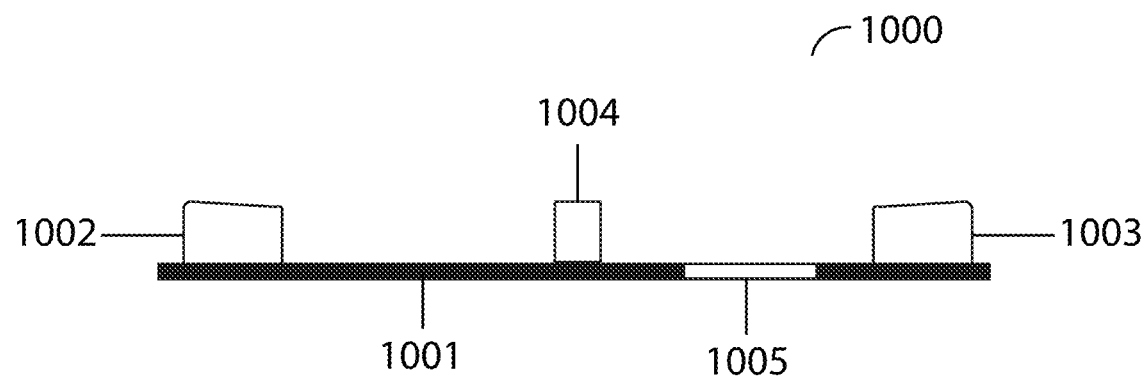
Figure 11:
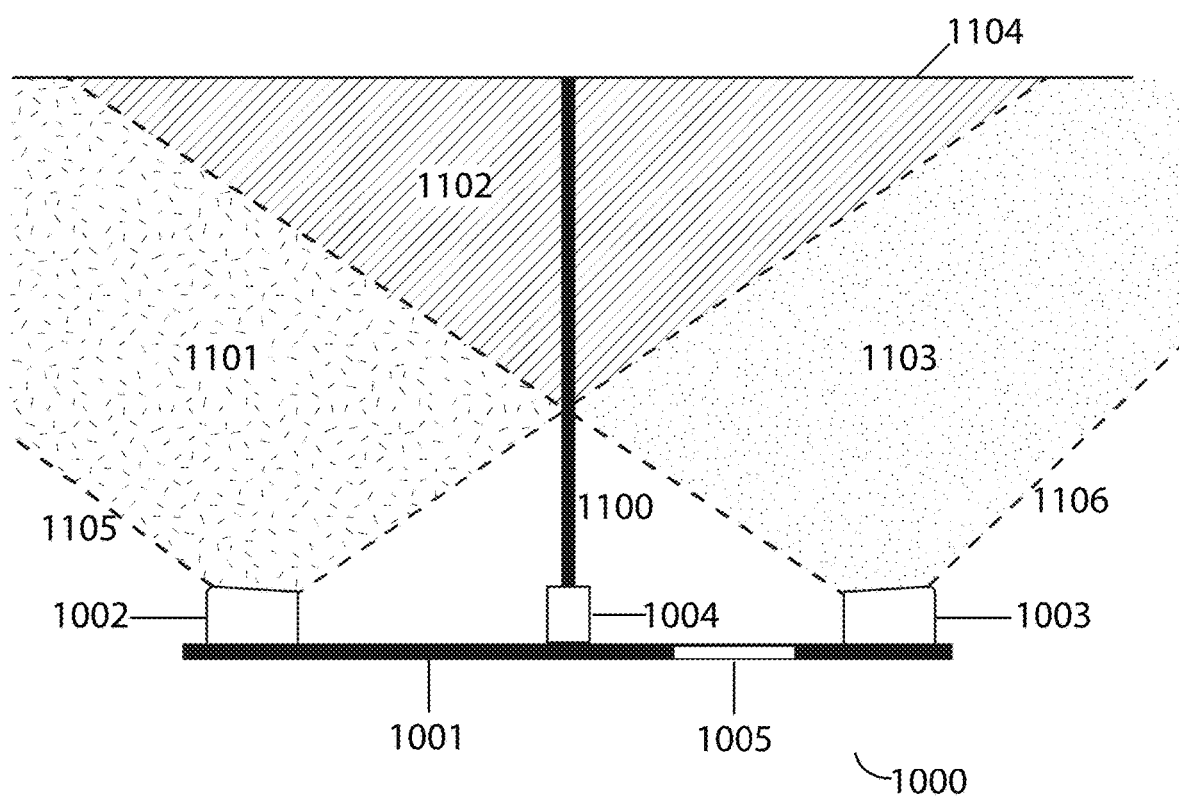
FIG. 11 illustrates an overhead view of an example of a depth perceiving device and fields of view of its image sensors, according to some embodiments.

FIGS. 10A and 10B illustrates a front elevation and top plan view of an embodiment of the depth perceiving device 1000 including baseplate 1001, left image sensor 1002, right image sensor 1003, laser light emitter 1004, and image processor 1005. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. FIG. 11 illustrates an overhead view of depth perceiving device 1000 including baseplate 1001, image sensors 1002 and 1003, laser light emitter 1004, and image processor 1005. Laser light emitter 1004 is disposed on baseplate 1001 and emits collimated laser light beam 1100. Image processor 1005 is located within baseplate 1001. Area 1101 and 1102 together represent the field of view of image sensor 1002. Dashed line 1105 represents the outer limit of the field of view of image sensor 1002 (it should be noted that this outer limit would continue on linearly, but has been cropped to fit on the drawing page). Area 1103 and 1102 together represent the field of view of image sensor 1003. Dashed line 1106 represents the outer limit of the field of view of image sensor 1003 (it should be noted that this outer limit would continue on linearly, but has been cropped to fit on the drawing page). Area 1102 is the area where the fields of view of both image sensors overlap. Line 1104 represents the projection surface. That is, the surface onto which the laser light beam is projected.

In some embodiments, each image taken by the two image sensors shows the field of view including the light point created by the collimated laser beam. At each discrete time interval, the image pairs are overlaid creating a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. This distance is then compared to figures in a preconfigured table that relates distances between light points with distances between the baseplate and projection surfaces to find an estimated distance between the baseplate and the projection surface at the time that the images were captured. As the distance to the surface decreases the distance measured between the light point captured in each image when the images are superimposed decreases as well. In some embodiments, the emitted laser point captured in an image is detected by the image processor by identifying pixels with high brightness, as the area on which the laser light is emitted has increased brightness. After superimposing both images, the distance between the pixels with high brightness, corresponding to the emitted laser point captured in each image, is determined.

Figure 12A:
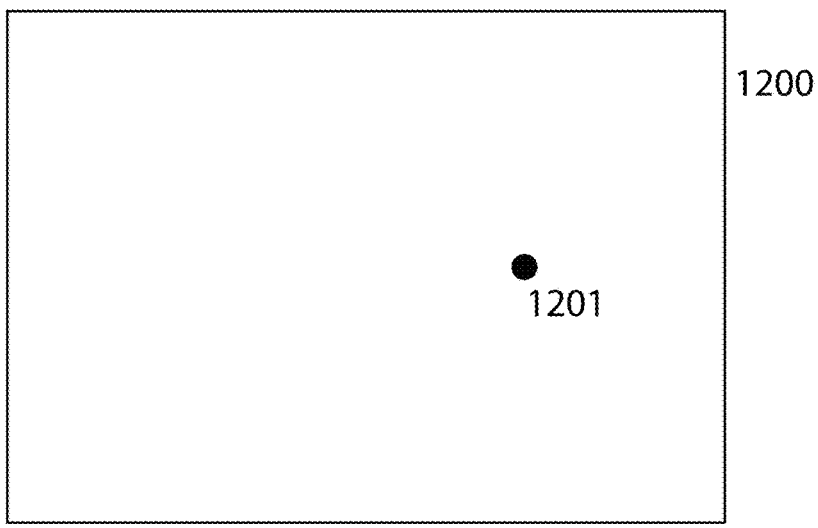
FIGS. 12A-12C illustrate an example of distance estimation using a variation of a depth perceiving device, according to some embodiments.
Figure 12B:
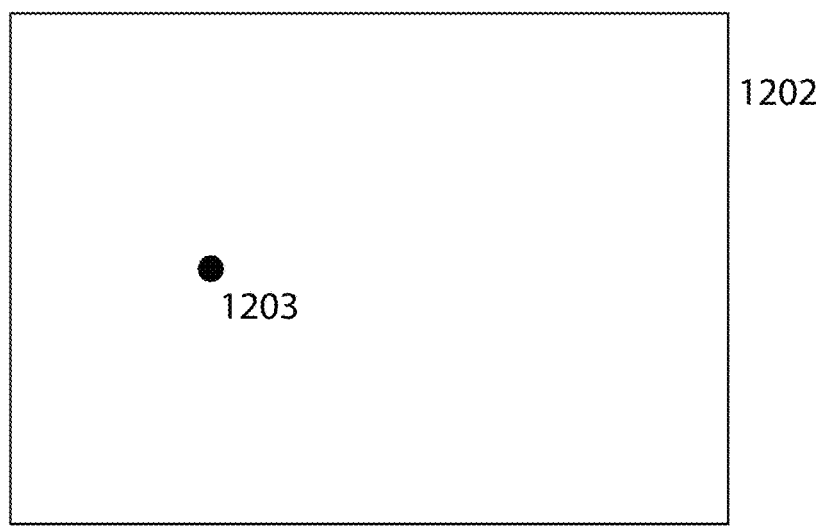
Figure 12C:
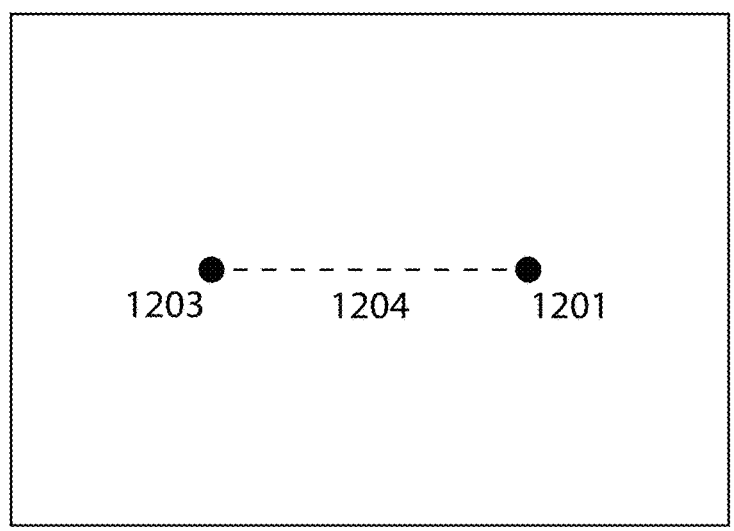

FIG. 12A illustrates an embodiment of the image captured by left image sensor 1002. Rectangle 1200 represents the field of view of image sensor 1002. Point 1201 represents the light point projected by laser beam emitter 1004 as viewed by image sensor 1002. FIG. 12B illustrates an embodiment of the image captured by right image sensor 1003. Rectangle 1202 represents the field of view of image sensor 1003. Point 1203 represents the light point projected by laser beam emitter 1004 as viewed by image sensor 1002. As the distance of the baseplate to projection surfaces increases, light points 1201 and 1203 in each field of view will appear further and further toward the outer limits of each field of view, shown respectively in FIG. 11 as dashed lines 1105 and 1106. Thus, when two images captured at the same time are overlaid, the distance between the two points will increase as distance to the projection surface increases. FIG. 12C illustrates the two images of FIG. 12A and FIG. 12B overlaid. Point 1201 is located a distance 1204 from point 1203, the distance extracted by the image processor 1005. The distance 1204 is then compared to figures in a preconfigured table that co-relates distances between light points in the superimposed image with distances between the baseplate and projection surfaces to find an estimate of the actual distance from the baseplate to the projection surface upon which the laser light was projected.

In some embodiments, the two image sensors are aimed directly forward without being angled towards or away from the laser light emitter. When image sensors are aimed directly forward without any angle, the range of distances for which the two fields of view may capture the projected laser point is reduced. In these cases, the minimum distance that may be measured is increased, reducing the range of distances that may be measured. In contrast, when image sensors are angled inwards towards the laser light emitter, the projected light point may be captured by both image sensors at smaller distances from the obstacle.

In some embodiments, the image sensors may be positioned at an angle such that the light point captured in each image coincides at or before the maximum effective distance of the distance sensor, which is determined by the strength and type of the laser emitter and the specifications of the image sensor used.

In some embodiments, the depth perceiving device further includes a plate positioned in front of the laser light emitter with two slits through which the emitted light may pass. In some instances, the two image sensors may be positioned on either side of the laser light emitter pointed directly forward or may be positioned at an inwards angle towards one another to have a smaller minimum distance to the object that may be measured. The two slits through which the light may pass results in a pattern of spaced rectangles. In some embodiments, the images captured by each image sensor may be superimposed and the distance between the rectangles captured in the two images may be used to estimate the distance to the projection surface using a preconfigured table relating distance between rectangles to distance from the surface upon which the rectangles are projected. The preconfigured table may be constructed by measuring the distance between rectangles captured in each image when superimposed at incremental distances from the surface upon which they are projected for a range of distances.

In some instances, a line laser is used in place of a point laser. In such instances, the images taken by each image sensor are superimposed and the distance between coinciding points along the length of the projected line in each image may be used to determine the distance from the surface using a preconfigured table relating the distance between points in the superimposed image to distance from the surface. In some embodiments, the depth perceiving device further includes a lens positioned in front of the laser light emitter that projects a horizontal laser line at an angle with respect to the line of emission of the laser light emitter. The images taken by each image sensor may be superimposed and the distance between coinciding points along the length of the projected line in each image may be used to determine the distance from the surface using a preconfigured table as described above. The position of the projected laser line relative to the top or bottom edge of the captured image may also be used to estimate the distance to the surface upon which the laser light is projected, with lines positioned higher relative to the bottom edge indicating a closer distance to the surface. In some embodiments, the position of the laser line may be compared to a preconfigured table relating the position of the laser line to distance from the surface upon which the light is projected. In some embodiments, both the distance between coinciding points in the superimposed image and the position of the line are used in combination for estimating the distance to the projection surface. In combining more than one method, the accuracy, range, and resolution may be improved.

Figure 13A:
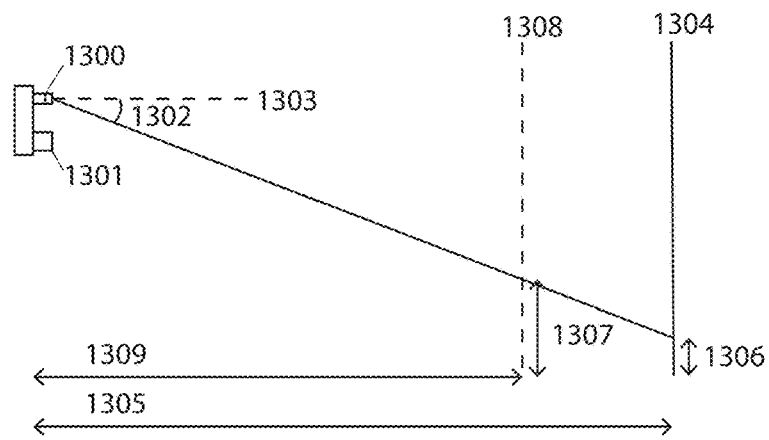
FIGS. 13A-13C illustrate an example of distance estimation using a variation of a depth perceiving device, according to some embodiments.
Figure 13B:
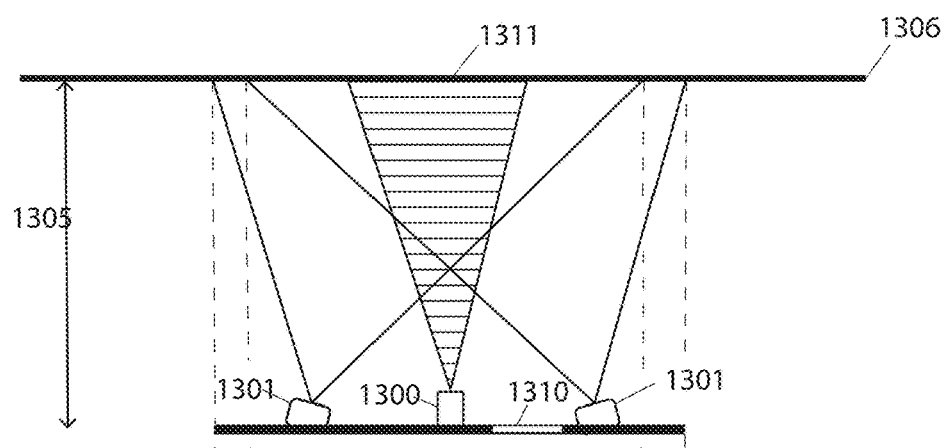
Figure 13C:
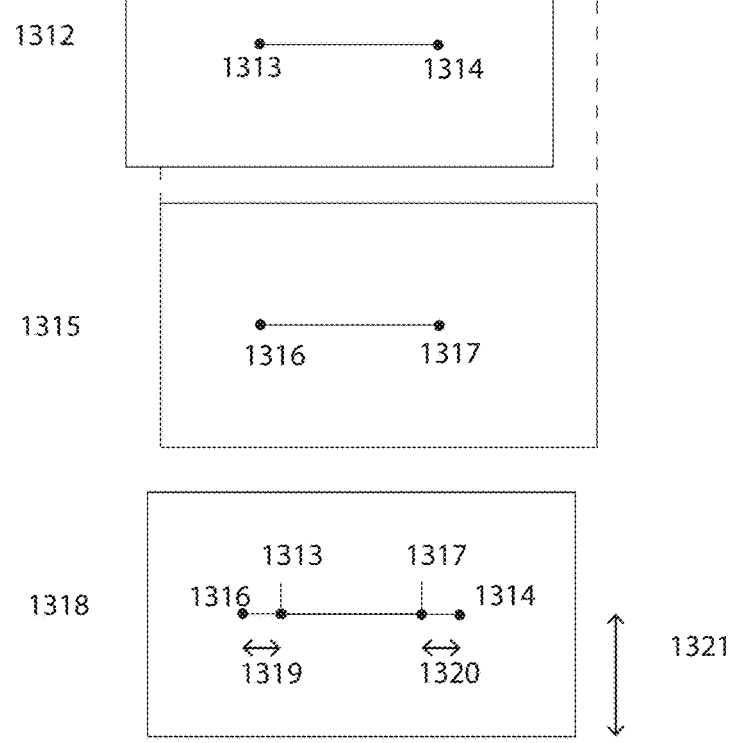

FIG. 13A illustrates an embodiment of a side view of a depth perceiving device including a laser light emitter and lens 1300, image sensors 1301, and image processor (not shown). The lens is used to project a horizontal laser line at a downwards angle 1302 with respect to line of emission of laser light emitter 1303 onto object surface 1304 located a distance 1305 from the depth perceiving device. The projected horizontal laser line appears at a height 1306 from the bottom surface. As shown, the projected horizontal line appears at a height 1307 on object surface 1308, at a closer distance 1309 to laser light emitter 1300, as compared to object 1304 located a further distance away. Accordingly, in some embodiments, in a captured image of the projected horizontal laser line, the position of the line from the bottom edge of the image would be higher for objects closer to the distance estimation system. Hence, the position of the project laser line relative to the bottom edge of a captured image may be related to the distance from the surface FIG. 13B illustrates a top view of the depth perceiving device including laser light emitter and lens 1300, image sensors 1301, and image processor 1310. Horizontal laser line 1311 is projected onto object surface 1306 located a distance 1305 from the baseplate of the distance measuring system. FIG. 13C illustrates images of the projected laser line captured by image sensors 1301. The horizontal laser line captured in image 1312 by the left image sensor has endpoints 1313 and 1314 while the horizontal laser line captured in image 1315 by the right image sensor has endpoints 1316 and 1317. FIG. 13C illustrates images of the projected laser line captured by image sensors 1301. The horizontal laser line captured in image 1312 by the left image sensor has endpoints 1313 and 1314 while the horizontal laser line captured in image 1315 by the right image sensor has endpoints 1316 and 1317. FIG. 13C also illustrates the superimposed image 1318 of images 1312 and 1315. On the superimposed image, distances 1319 and 1320 between coinciding endpoints 1316 and 1313 and 1317 and 1314, respectively, along the length of the laser line captured by each camera may be used to estimate distance from the baseplate to the object surface. In some embodiments, more than two points along the length of the horizontal line may be used to estimate the distance to the surface. In some embodiments, the position of the horizontal line 1321 from the bottom edge of the image may be simultaneously used to estimate the distance to the object surface as described above. In some configurations, the laser emitter and lens may be positioned below the image sensors, with the horizontal laser line projected at an upwards angle with respect to the line of emission of the laser light emitter. In one embodiment, a horizontal line laser is used rather than a laser beam with added lens. Other variations in the configuration are similarly possible. For example, the image sensors may both be positioned to the right or left of the laser light emitter as opposed to either side of the light emitter as illustrated in the examples.

In some embodiments, noise, such as sunlight, may cause interference causing the image processor to incorrectly identify light other than the laser as the projected laser line in the captured image. The expected width of the laser line at a particular distance may be used to eliminate sunlight noise. A preconfigured table of laser line width corresponding to a range of distances may be constructed, the width of the laser line increasing as the distance to the obstacle upon which the laser light is projected decreases. In cases where the image processor detects more than one laser line in an image, the corresponding distance of both laser lines is determined. To establish which of the two is the true laser line, the image processor compares the width of both laser lines and compares them to the expected laser line width corresponding to the distance to the object determined based on position of the laser line. In some embodiments, any hypothesized laser line that does not have correct corresponding laser line width, to within a threshold, is discarded, leaving only the true laser line. In some embodiments, the laser line width may be determined by the width of pixels with high brightness. The width may be based on the average of multiple measurements along the length of the laser line.

In some embodiments, noise, such as sunlight, which may be misconstrued as the projected laser line, may be eliminated by detecting discontinuities in the brightness of pixels corresponding to the hypothesized laser line. For example, if there are two hypothesized laser lines detected in an image, the hypothesized laser line with discontinuity in pixel brightness, where for instance pixels 1 to 10 have high brightness, pixels 11-15 have significantly lower brightness and pixels 16-25 have high brightness, is eliminated as the laser line projected is continuous and, as such, large change in pixel brightness along the length of the line are unexpected. These methods for eliminating sunlight noise may be used independently, in combination with each other, or in combination with other methods during processing.

Figure 14:
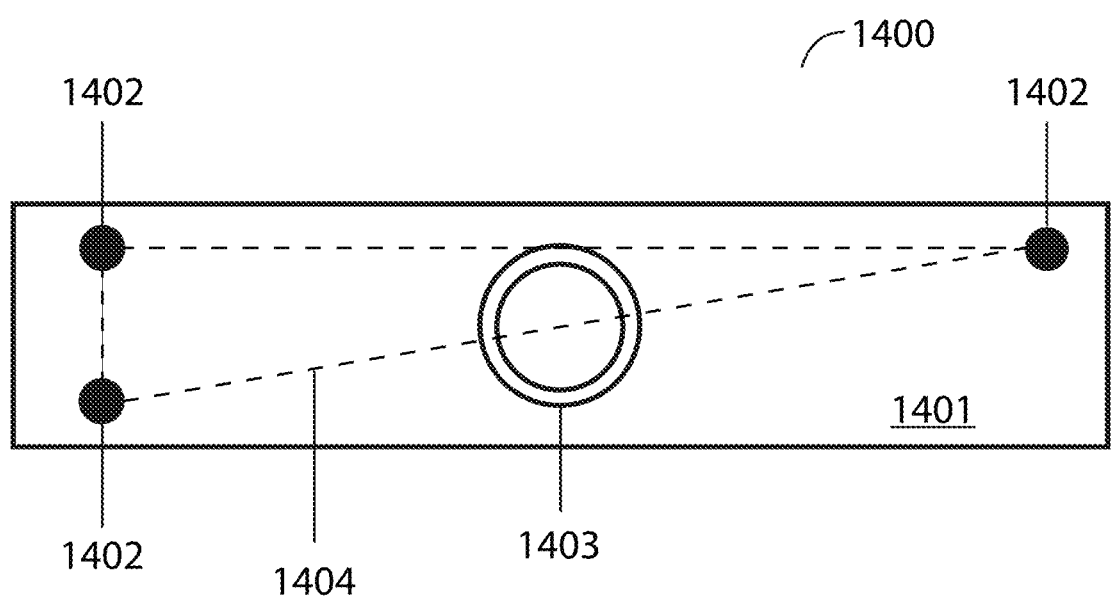
FIG. 14 illustrates an example of a depth perceiving device, according to some embodiments.
Figure 15:
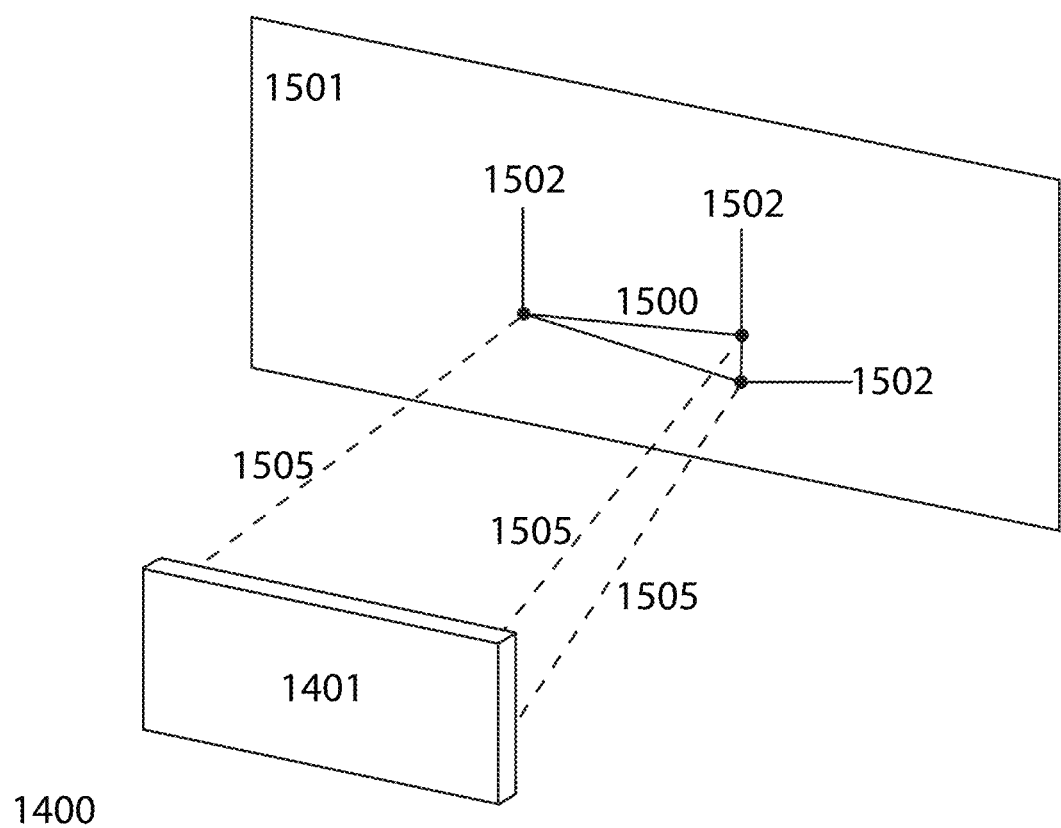
FIG. 15 illustrates a schematic view of a depth perceiving device and resulting triangle formed by connecting the light points illuminated by three laser light emitters, according to some embodiments.

In another example, a depth perceiving device includes an image sensor, an image processor, and at least two laser emitters positioned at an angle such that they converge. The laser emitters project light points onto an object, which is captured by the image sensor. The image processor may extract geometric measurements and compare the geometric measurement to a preconfigured table that relates the geometric measurements with depth to the object onto which the light points are projected. In cases where only two light emitters are used, they may be positioned on a planar line and for three or more laser emitters, the emitters are positioned at the vertices of a geometrical shape. For example, three emitters may be positioned at vertices of a triangle or four emitters at the vertices of a quadrilateral. This may be extended to any number of emitters. In these cases, emitters are angled such that they converge at a particular distance. For example, for two emitters, the distance between the two points may be used as the geometric measurement. For three of more emitters, the image processor measures the distance between the laser points (vertices of the polygon) in the captured image and calculates the area of the projected polygon. The distance between laser points and/or area may be used as the geometric measurement. The preconfigured table may be constructed from actual geometric measurements taken at incremental distances from the object onto which the light is projected within a specified range of distances. Regardless of the number of laser emitters used, they shall be positioned such that the emissions coincide at or before the maximum effective distance of the depth perceiving device, which is determined by the strength and type of laser emitters and the specifications of the image sensor used. Since the laser light emitters are angled toward one another such that they converge at some distance, the distance between projected laser points or the polygon area with projected laser points as vertices decrease as the distance from the surface onto which the light is projected increases. As the distance from the surface onto which the light is projected increases the collimated laser beams coincide and the distance between laser points or the area of the polygon becomes null. FIG. 14 illustrates a front elevation view of a depth perceiving device 1400 including a baseplate 1401 on which laser emitters 1402 and an image sensor 1403 are mounted. The laser emitters 1402 are positioned at the vertices of a polygon (or endpoints of a line, in cases of only two laser emitters). In this case, the laser emitters are positioned at the vertices of a triangle 1404. FIG. 15 illustrates the depth perceiving device 1400 projecting collimated laser beams 1505 of laser emitters 1402 (not shown) onto a surface 1501. The baseplate 1401 and laser emitters (not shown) are facing a surface 1501. The dotted lines 1505 represent the laser beams. The beams are projected onto surface 1501, creating the light points 1502, which, if connected by lines, form triangle 1500. The image sensor (not shown) captures an image of the projection and sends it to the image processing unit (not shown). The image processing unit extracts the triangle shape by connecting the vertices to form triangle 1500 using computer vision technology, finds the lengths of the sides of the triangle, and uses those lengths to calculate the area within the triangle. The image processor then consults a pre-configured area-to-distance table with the calculated area to find the corresponding distance.

Figure 16:
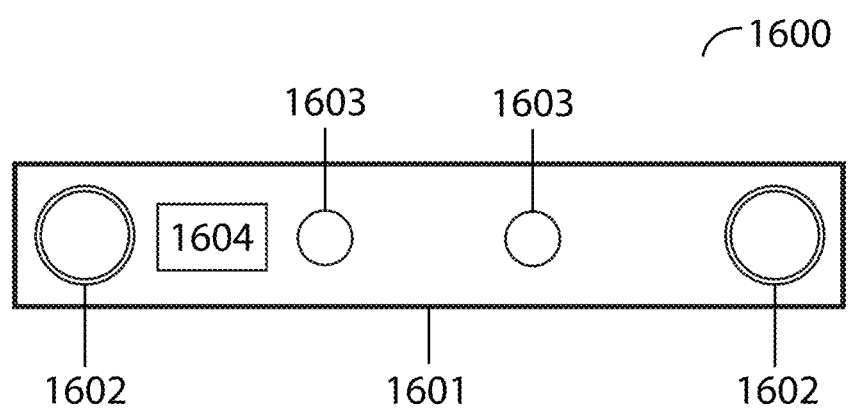
FIG. 16 illustrates an example of a depth perceiving device, according to some embodiments.
Figure 17:
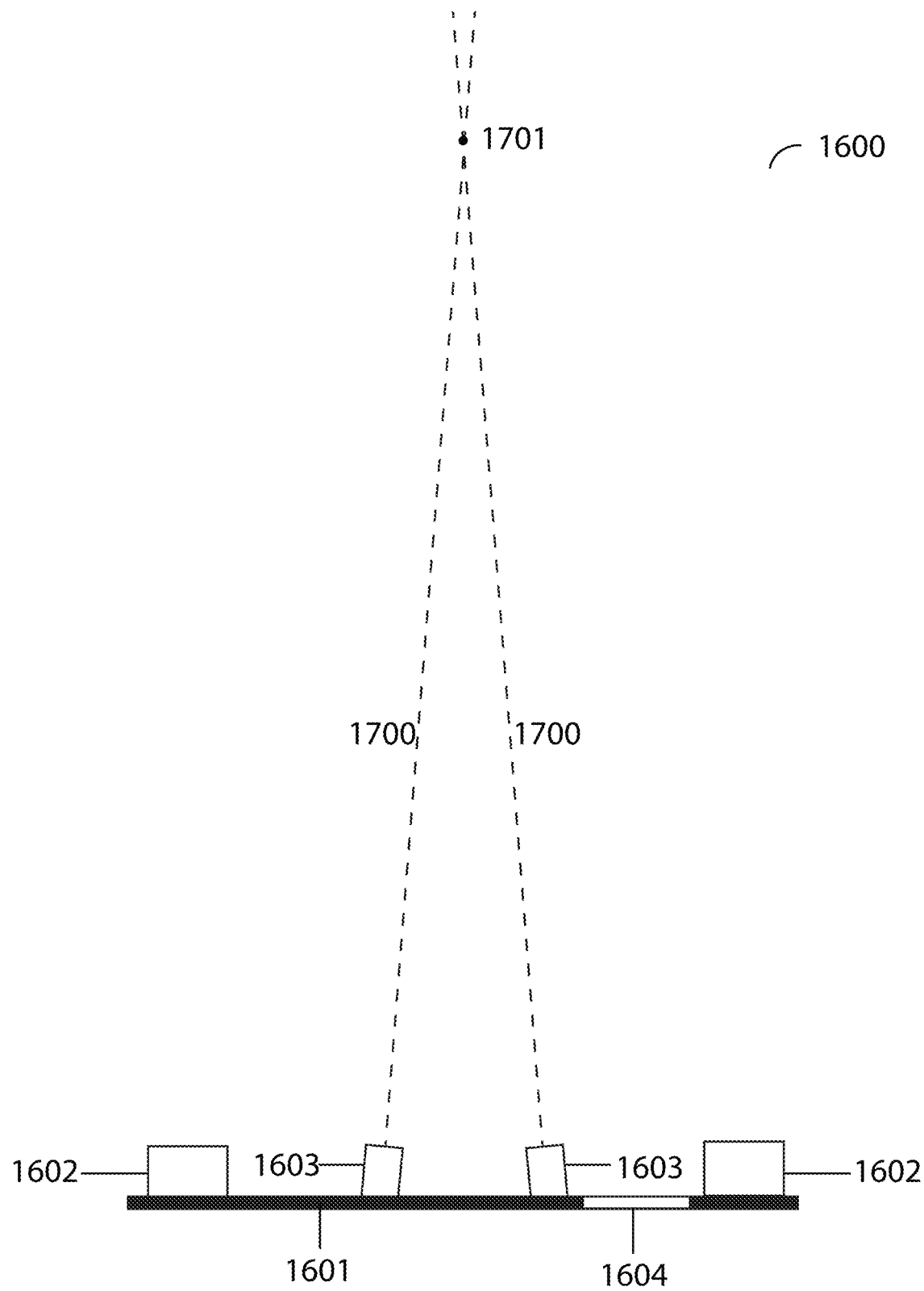
FIG. 17 illustrates an example of a depth perceiving device, according to some embodiments.

In some embodiments, a second image sensor is included to improve accuracy of the depth perceiving device. FIG. 16 illustrates a front elevation view of an example of a depth perceiving device 1600 including a baseplate 1601, image sensors 1602, laser light emitters 1603, and image processors 1604. The laser light emitters 1603 are positioned with a slight inward angle toward each other, with the point of convergence being a predetermined distance from the baseplate. The one or more image sensors shall be positioned such that the fields of view thereof will capture laser projections of the laser light emitters within a predetermined range of distances. FIG. 17 illustrates an overhead view of the depth perceiving device. Laser light emitters 1603 are disposed on baseplate 1601 and emit collimated laser light beams 1700, which converge at point 1701. Image sensors 1602 are located on either side of the laser light emitters. Image processor 1604 is located within baseplate 1601. In some embodiments, the maximum effective distance of the depth perceiving device is at the point where the laser beams coincide. In other embodiments, using different wavelengths in each laser light emitter will allow the image processor to recognize the distances between the light points after the point of convergence as being further from the baseplate than the identical distances between the light points that will occur before the point of convergence. In distances beyond point 1701, the laser beam from the right-most laser emitter will appear on the left side, and the laser beam from the left-most laser emitter will appear on the right side. Upon identifying the switch in locations of the laser beams, the image processor will determine that the extracted distance is occurring after the point of convergence.

Figure 18:
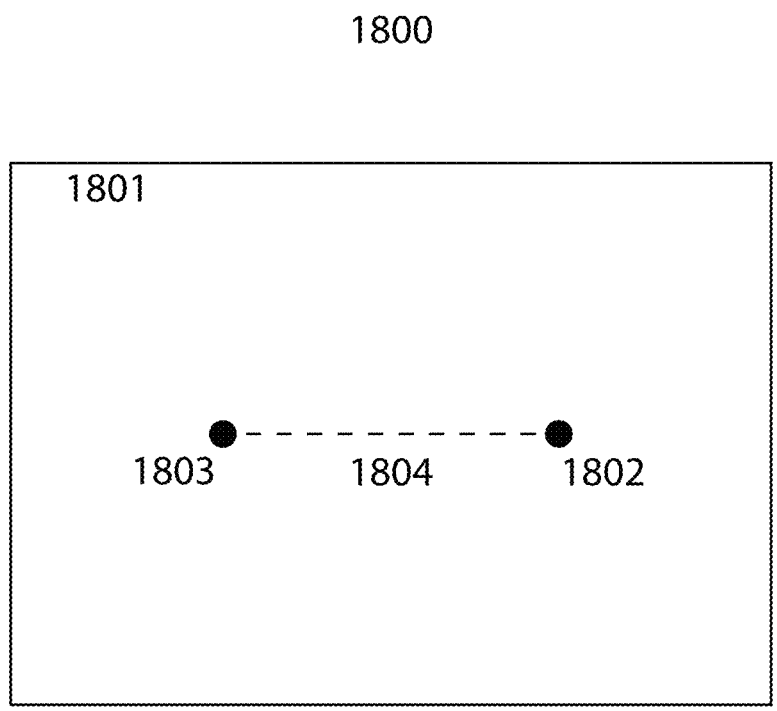
FIG. 18 illustrates an image captured by an image sensor, according to some embodiments.

In some embodiments, the one or more image sensors simultaneously and iteratively capture images at discrete time intervals. FIG. 18 illustrates an image 1800 captured by image sensor 1602. Rectangle 1801 represents the field of view of image sensor 1602. Points 1802 and 1803 represent the light points projected by the laser light emitters 1603. As the distance of the baseplate to projection surfaces increases, the light points 1802, 1803 will appear closer and closer together until the distance between them is null, after which point the light points will diverge from each other. Thus, the distance 1804 between the two points may be analyzed to determine the distance to the projection surface at the time that an image is captured. The image 1801 is sent to the image processor, which extracts the distance 1804 between the two points (if any). The distance 1804 is then compared to figures in a preconfigured table that co-relates distances between light points in the system with distances between the baseplate and projection surfaces to find an estimate of the actual distance from the baseplate to the projection surface at the time the image of the laser light projections was captured. In some embodiments, the process of capturing an image, sending it to an image processor, and extracting the distance between the light points is performed simultaneously using a second image sensor, and the data extracted from images from the first image sensor is combined with the data extracted from the second image sensor to obtain a more accurate aggregate reading before consulting the preconfigured table.

Figure 19A:
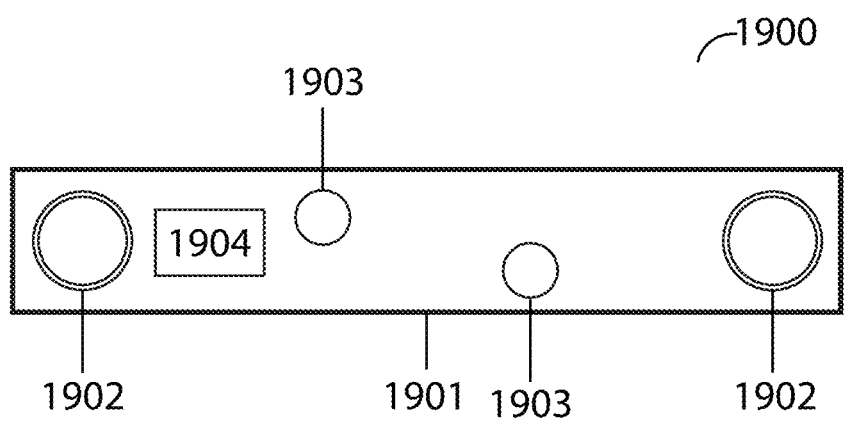
FIGS. 19A and 19B illustrate an example of a depth perceiving device, according to some embodiments.
Figure 19B:
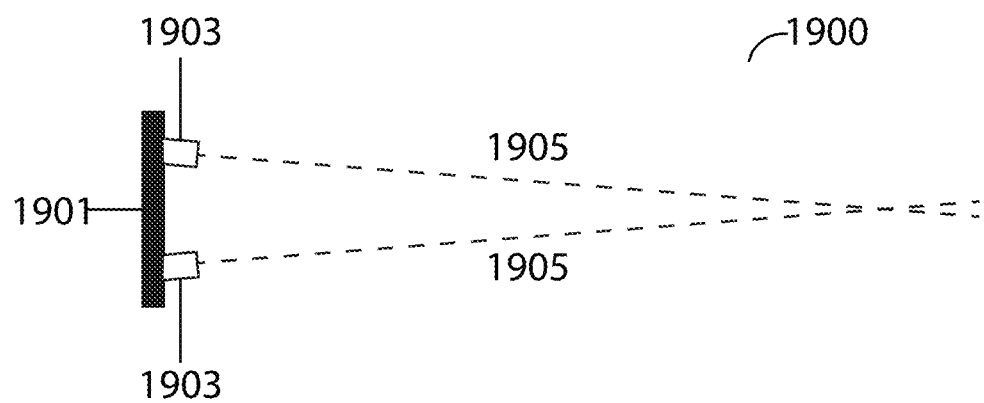
Figure 20A:
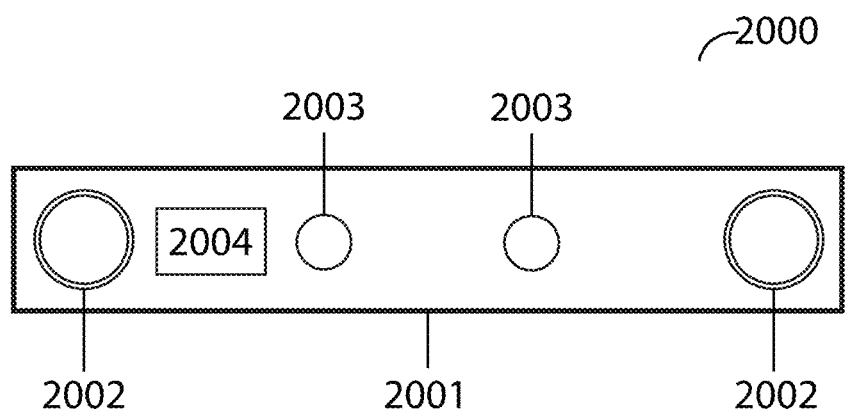
FIGS. 20A and 20B illustrate an example of a depth perceiving device, according to some embodiments.
Figure 20B:
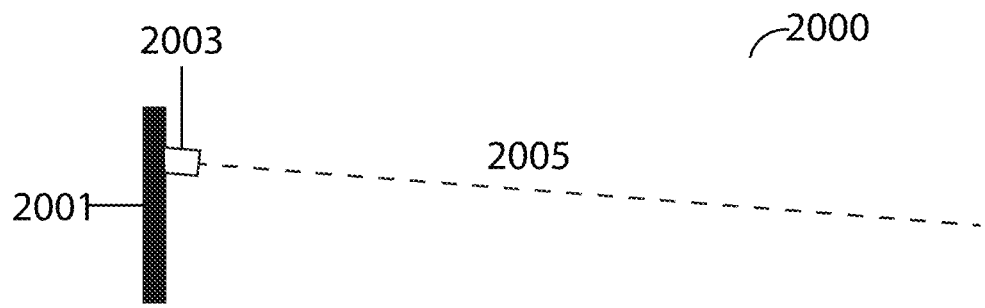

Other configurations of the laser light emitters are possible. For example, in FIG. 19A a depth perceiving device 1900 includes laser light emitters 1903 positioned at different heights on the baseplate 1901, image sensors 1902 and image processor 1904. The laser beams will still converge, but the light points will move in a vertical plane in addition to a horizontal plane of captured images as the distance to the projection surface changes. This additional data will serve to make the system more accurate. FIG. 19B illustrates a side view of the depth perceiving device 1900 wherein the laser beam emissions 1905 can be seen converging in a vertical plane. In another example, in FIG. 20A a depth perceiving device 2000 includes laser light emitters 2003 positioned on baseplate 2001 at a downward angle with respect to a horizontal plane, image sensors 2002, and image processor 2004. The laser beams will still converge, but, in a similar manner as previously described, the light points will move in a vertical plane in addition to a horizontal plane of the image as the distance to the projection surface changes. FIG. 20B illustrates a side view of the depth perceiving device 2000, wherein the laser beam emissions 2005 can be seen angled downward.

In some embodiments, the depth perceiving devices described herein may be used by the processor in adjusting the heading of the robotic device. In some embodiments, the processor of the robotic device may detect asymmetry in a captured image of light points forming a particular feature (e.g., a line, a curve, a polygon, one or more points, an edge, a corner, a wall, a floor, etc.) and may adjust the heading of the robot by an amount proportional to the degree of asymmetry of the feature in the image. For example, the robotic device may drive along a boustrophedon movement path, wherein rows are parallel to one wall and perpendicular to another. The laser emitted of the depth perceiving device may emit six light points that form a hexagon when connected onto the wall perpendicular to the direction of movement of the robot. The camera of the depth perceiving device may continuously capture images of the light points projected onto the wall. The processor processes the images to determine if the projected hexagon is symmetric or asymmetric. If the image of the projected hexagon is symmetric, the heading of the robot is along the movement path perpendicular to the wall on which the light points were projected, and hence does not require any adjustment. If the image of the projected hexagon is asymmetric, the heading of the robot is not along the movement path perpendicular to the wall on which the light points were projected, and hence requires an adjustment proportional the asymmetry of the projected hexagon in the captured image. In some embodiments, the processor receives a multidimensional array that includes at least one parameter describing the feature captured in the image. In some embodiments, values of the at least one parameter of the multidimensional array correspond with pixels of the image of the feature. In some embodiments, the processor determines an amount of asymmetry of the feature in the image based on at least a portion of the values of the at least one parameter. In embodiments, parameters may be qualitative (e.g., a classification) or quantitative (e.g., indicated by a numerical value). For example, a parameter may be pixel brightness given by a numerical value indicative of pixel brightness. Or in another example, a parameter may be pixel position given by the x and y coordinates of the position of the pixel in the captured image. In one example, the parameter may be feature type given by a classification of one of: line, curve, edge, corner, wall, floor, etc.

In some embodiments, the processor extracts natural features of the environment (e.g., edges and corners) from captured images and determines asymmetry of one or more of those features to determine the heading adjustment. An example of a method for extracting edges and corners is described below. In this case, the robotic device only requires the camera to capture images as one or more light emitters are not required to form the feature. For example, the robotic device may drive along a boustrophedon movement path, wherein rows are parallel to one wall and perpendicular to another. The camera may capture images of the wall perpendicular to the movement path of the robotic device and the processor may extract a line separating the wall from the floor. The processor processes the image to determine if the line is symmetric or asymmetric about a vertical line. If the extracted line in the image is symmetric, the heading of the robot is along the movement path perpendicular to the wall, and hence does not require any heading adjustment. If the extracted line in the image is asymmetric, the heading of the robot is not along the movement path perpendicular to the wall, and hence requires an adjustment proportional the asymmetry of the feature in the captured image. In some embodiments, the processor simply examines pixels of images captured in sequence. Given that images captured in sequence at least partially overlap, the processor may examine the overlap of pixels between two consecutive images to determine if the pixels have moved asymmetrically from a first image captured to a second image captured consecutively. For example, the robotic device may drive along a boustrophedon movement path, wherein rows are parallel to one wall and perpendicular to another. The camera may capture images of the wall perpendicular to the movement path of the robotic device and the processor may compare the overlap of the pixels in the two images. If the overlap of pixels between a first image captured and a second image captured consecutively is asymmetric (e.g., there is more overlap on one side of the image) then the pixels moved asymmetrically, and hence adjustment to heading is required. If the overlap of pixels between a first image captured and a second image captured consecutively is symmetric, then the heading does not require any adjustment.

In some embodiments, ambient light may be differentiated from illumination of a laser in captured images by using an illuminator which blinks at a set speed such that a known sequence of images with and without the illumination is produced. For example, if the illuminator is set to blink at half the speed of the frame rate of a camera to which it is synched, the images captured by the camera produce a sequence of images wherein only every other image contains the illumination. This technique allows the illumination to be identified as the ambient light would be present in each captured image or would not be contained in the images in a similar sequence as to that of the illumination. In embodiments, more complex sequences may be used. For example, a sequence wherein two images contain the illumination, followed by three images without the illumination and then one image with the illumination may be used. A sequence with greater complexity reduces the likelihood of confusing ambient light with the illumination. This method of eliminating ambient light may be used independently, or in combination with other methods for eliminating sunlight noise. For example, in some embodiments, the depth perceiving device further includes a band-pass filter to limit the allowable light.

Traditional spherical camera lenses are often affected by spherical aberration, an optical effect that causes light rays to focus at different points when forming an image, thereby degrading image quality. In cases where, for example, the distance is estimated based on the position of a projected laser point or line, image resolution is important. To compensate for this, in some embodiments, a camera lens with uneven curvature may be used to focus the light rays at a single point. Further, with traditional spherical camera lens, the frame will have variant resolution across it, the resolution being different for near and far objects. To compensate for this uneven resolution, in some embodiments, a lens with aspherical curvature may be positioned in front of the camera to achieve uniform focus and even resolution for near and far objects captured in the frame. In some embodiments both cameras (or otherwise imaging sensors of the depth perceiving device) are placed behind a single camera lens.

In some embodiments, two-dimensional imaging sensors may be used. In other embodiments, one-dimensional imaging sensors may be used. In some embodiments, one-dimensional imaging sensors may be combined to achieve readings in more dimensions. For example, to achieve similar results as two-dimensional imaging sensors, two one-dimensional imaging sensors may be positioned perpendicularly to one another. In some instances, one-dimensional and two-dimensional imaging sensors may be used together.

In some embodiments, two CMOS cameras combined into one special chip may be used. Alternatively, in some embodiments, a silicon based chip implementing a light (i.e., LED) transmitter and/or a camera or imager and/or a receiver may be used. In some embodiments, a camera implemented on a board or on a silicon chip or in combination with a silicon chip to provide RGB and depth information may be used. These embodiments may be implemented in a single independent frame such as a sensor module or system on a chip, or may be implemented into the body of a robot, using the chassis or body of the robot as a frame. The embodiments described herein may be implemented in a single chip or combined modules inside one chip. The embodiments described herein may be implemented in software and/or hardware. For example, methods and techniques for extracting 2D or 3D described may be implemented in various ways.

In some embodiments, a single laser diode with an optical lens arrangement may be used to generate two or more points. The arrangement of the lens may create a plurality of disconnected points instead of a line. The arrangement may control the distance and divergence or convergence of the points. In some embodiments, there may be a physical barrier with perforation arranged in front the lens or emitted laser line to create points. In some embodiments, mirrors may be used to generate two or more points. For example, a single LED with some optical arrangement may generate three light points, each a vertex of a triangle. In some embodiments, multiple laser diodes are used to create light points. In some embodiments, the single light source may be used to generate an arrangement of points using a mechanical filter. For example, a mechanical filter may be used to generate three light points from single light source. In some embodiments, lenses are used to diverge or converge light emitted by a light emitter.

In some embodiments, a second image sensor is provided on the baseplate. In some embodiments, the second image sensor may be positioned behind the same lens or may have its own lens. The process of iteratively capturing images of the two or more laser light points and analyzing the distance between light points (or the surface area within light points) is repeated with images captured by the second image sensor. The two image sensors (or more image sensors in other cases) are configured to capture images simultaneously such that the distance between the baseplate and projection surface is the same in the images captured by both image sensors. In some embodiments, the processor determines the mean of the distances between light points (or the mean surface area within light points) in the images of each image sensor and compares the value to figures in a preconfigured table that relates distances between light points with distances between the baseplate and projection surfaces to find an estimated distance between the baseplate and the projection surface at the time of the capture of the images. A second image sensor, therefore, serves to improve the accuracy of the estimation.

Depending on the arrangement and when done advantageously, in addition to providing accuracy, the second camera may increase the field of view of the distance readings. For example, the first camera may be a blind to a range of short distances when the projected light does not fall within the field of view (FOV) of the first camera, however, the projected light may be seen with the field of view of the second camera because of difference in the position between the two cameras. Also, when implemented advantageously, the FOV of the cameras may combined to provide double the FOV or provide less than double FOV with some overlap which serves for high accuracy. The arrangement of cameras (e.g., CMOS), image sensors, laser diodes, LEDs used in a distance measurement device do not have to be in any particular arrangement so long as the arrangement of each component and geometry of the arrangement of the components are known in the software estimating the distance. Based on knowing the physical arrangement of components, the software may estimate depth of objects as described above. In some embodiments, the movement of the camera may be used to increase the FOV. An increased FOV may similarly be achieved by movement of the camera. In some embodiments, the camera or a separate software increases the FOV.

Figure 21A:
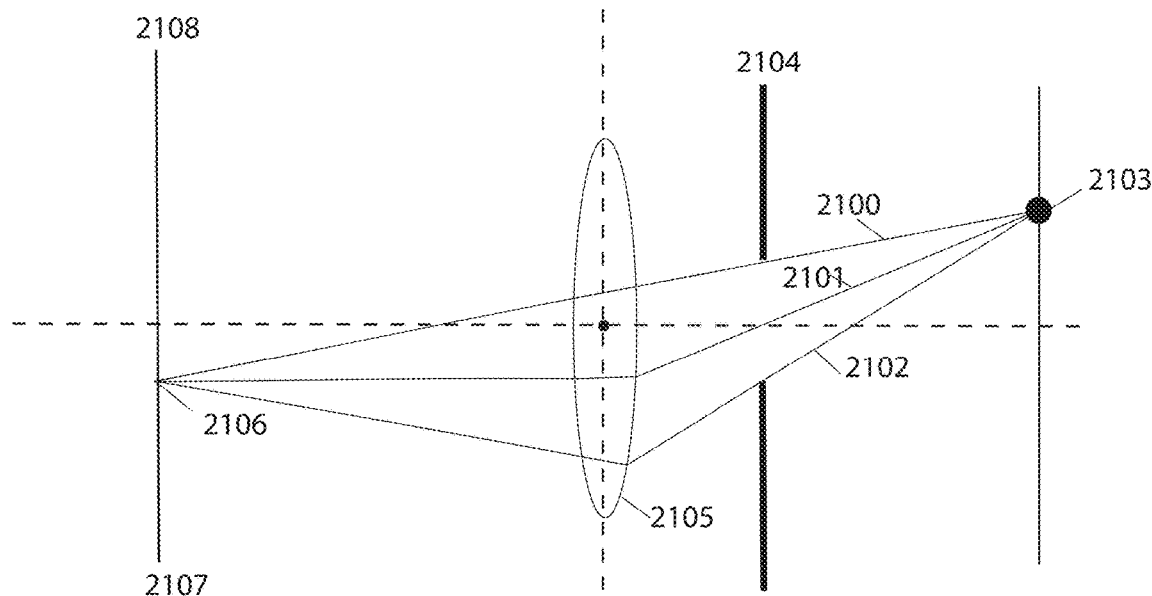
FIGS. 21A and 21B illustrate depth from de-focus technique, according to some embodiments.
Figure 21B:
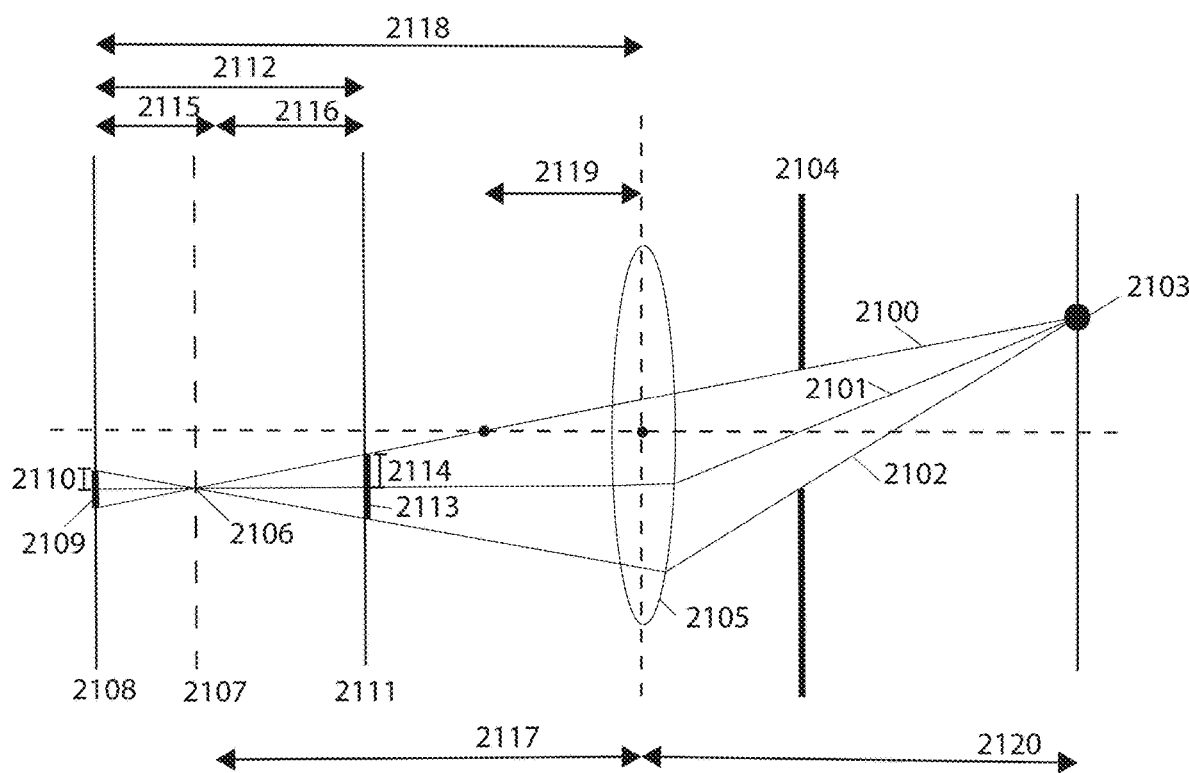

In some embodiments, depth from de-focus technique may be used to estimate the depths of objects captured in images. FIGS. 21A and 21B illustrate an embodiment using this technique. In FIG. 21A, light rays 2100, 2101, and 2102 are radiated by object point 2103. As light rays 2100, 2101 and 2102 pass aperture 2104, they are refracted by lens 2105 and converge at point 2106 on image plane 2107. Since image sensor plane 2108 coincides with image plane 2107, a clear focused image is formed on image plane 2107 as each point on the object is clearly projected onto image plane 2107. However, if image sensor plane 2108 does not coincide with image plane 2107 as is shown in FIG. 21B, the radiated energy from object point 2103 is not concentrated at a single point, as is shown at point 2106 in FIG. 21A, but is rather distributed over area 2109 thereby creating a blur of object point 2103 with radius 2110 on displaced image sensor plane 2108. In some embodiments, two de-focused image sensors may use the generated blur to estimate depth of an object, known as depth from de-focus technique. For example, with two image sensor planes 2108 and 2111 separated by known physical distance 2112 and with blurred areas 2109 having radii 2110 and 2113 having radii 2114, distances 2115 and 2116 from image sensor planes 2108 and 2111, respectively, to image plane 2107 may be determined using $$R_1 = \frac{L\delta_1}{2v}, R_2 = \frac{L\delta_2}{2v},$$

and $\beta=\delta_1+\delta_2$. $R_1$ and $R_2$ are blur radii 2110 and 2114 determined from formed images on sensor planes 2108 and 2111, respectively. $\delta_1$ and $\delta_2$ are distances 2115 and 2116 from image sensor planes 2108 and 2111, respectively, to image plane 2107. L is the known diameter of aperture 2104, v is distance 2117 from lens 2105 to image plane 2107 and $\beta$ is known physical distance 2112 separating image sensor planes 2108 and 2111. Since the value of v is the same in both radii equations ($R_1$ and $R_2$), the two equations may be rearranged and equated and using $\beta=\delta_1+\delta_2$, both $\delta_1$ and $\delta_2$ may be determined. Given $\gamma$, known distance 2118 from image sensor plane 2108 to lens 2105, v may be determined using $v=\gamma-\delta_1$. For a thin lens, v may be related to $f$, focal length 2119 of lens 2105 and u, distance 2120 from lens 2105 to object point 2103 using $$\frac{1}{f} = \frac{1}{v} + \frac{1}{u}.$$

Given that $f$ and v are known, the depth of the object u may be determined.

Other depth perceiving devices that may be used to collect data from which depth may be inferred are described in U.S. patent application Ser. Nos. 15/243,783, 15/954,335, 15/954,410, 15/257,798, 15/674,310, 15/224,442, and 15/683,255, the entire contents of which are hereby incorporated by reference.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, the camera continues to capture images of the environment after the map is created such that any changes to the environment are integrated into an updated map (e.g., a new piece of furniture being placed in a room). In some embodiments, the processor applies one or more filters to the images captured. In some embodiments, the processor may apply a filter to images to identify and extract the driving surface plane from the image based on the texture, color, shape and other distinguishable features of the floor that separate it from other objects (e.g., walls, furniture, buildings, cars, etc.). For example, the processor extracts a floor based on the assumption that the floor is homogenous in color and texture. The processor extracts the floor by examining pixel color of the pixels in the captured image, the color of each pixel given by (r, g, b) coordinate (red, green, blue) in an (r, g, b) coordinate system. Pixels with similar (r, g, b) coordinates form groups in the (r, g, b) coordinate system and may be identified by the processor as corresponding to the floor (or in other cases, as corresponding to some other object). For example, all pixels with one same pixel color will form a plane in the (r, g, b) coordinate system (e.g., a group of pixels with r=5 but different values for g and p, will form the plane r=5). All pixels with two same pixel colors form a line, while all pixels with all the same pixel colors will lie on a single point. Further details of a similar method are described in U.S. patent application Ser. Nos. 15/447,122 and 16/393,921, the entire contents of which are hereby incorporated by reference.

Figure 22A:
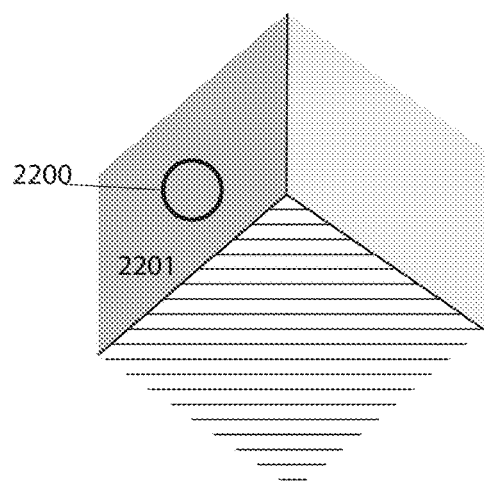
FIGS. 22A-22F illustrate an example of a corner detection method, according to some embodiments.
Figure 22B:
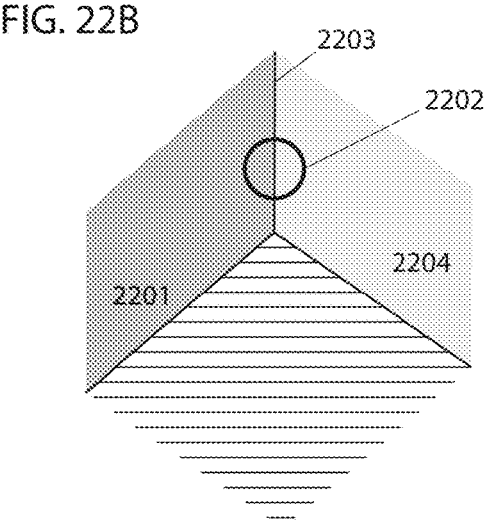
Figure 22C:
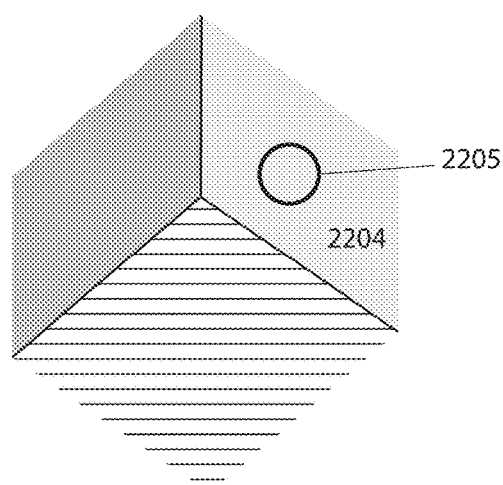
Figure 22D:
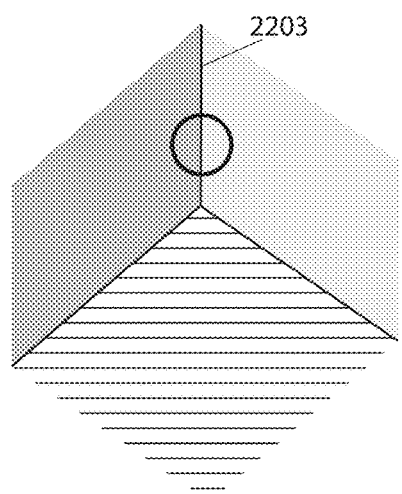
Figure 22E:
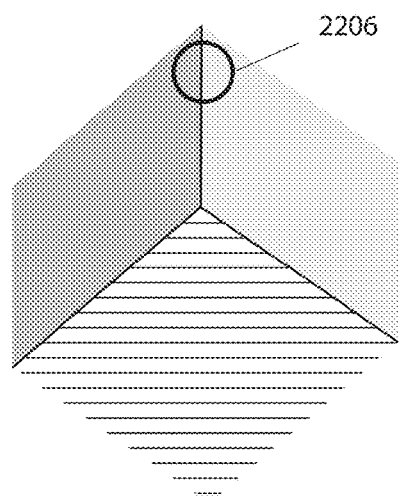
Figure 22F:
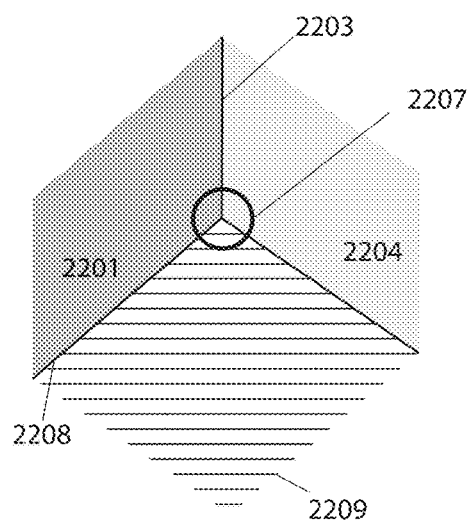

In some embodiments, the processor identifies a transition between the wall and floor (e.g., an edge) and marks it as the perimeter. In some embodiments, the processor may detect an edge and a corner using pixel intensity as changes in intensity are usually observable at edges and corners. FIGS. 22A-22F illustrate an example of how a corner may be detected by a processor by a sliding window that moves across an image. The process begins with the processor considering area 2200 on wall 2201 and observing the changes in color intensity as shown in FIG. 22A. After observing insignificant changes in color intensity, the processor moves on and considers area 2202 with edge 2203 joining walls 2201 and 2204 and observes large changes in color intensity along edge 2203 as illustrated in FIG. 22B. In FIG. 22C the processor moves to the right to consider another area 2205 on wall 2204 and observes no changes in color intensity. In FIG. 22D it returns back to edge 2203 then moves upward to consider area 2206 as shown in FIG. 22E and observes changes in color intensity along edge 2203. Finally, in FIG. 22F the processor moves down to consider area 2207 with edges 2203 and 2208 joining walls 2201 and 2204 and floor 2209. Changes in color intensity are observed along edge 2203 and along edge 2207. Upon discovering changes in color intensity in two directions by the processor, a corner is identified. Upon discovering changes in color intensity in one direction by the processor, an edge is identified. In other instances, changes in pixel intensities may be identified by a processor of a camera. These large changes in intensity may be mathematically represented by entropy where high entropy signifies large changes in pixel intensity within a particular area. The processor may determine the entropy using $$H(X) = -\sum_{i=1}^{n} P(x_i) \log P(x_i),$$

wherein $X=(x_1, x_2, \ldots, x_n)$ is a collection of possible pixel intensities, each pixel intensity represented by a digital number. $P(x_i)$ is the probability of a pixel having pixel intensity value $x_i$. $P(x_i)$ may be determined by counting the number of pixels within a specified area of interest with pixel intensity value $x_i$ and dividing that number by the total number of pixels within the area considered. If there are no changes or very small changes in pixel intensity in an area then H(X) will be very close to a value of zero. Alternatively, the pixel values of one reading (such as those with 90 numbers) may be mapped to a continuous function and the derivative of that function considered to find areas with large changes in pixel values. With the derivative being the slope, a derivative of zero would be indicative of no change in pixel value while a derivative approaching unity would be indicative of a large change in pixel values. Other methods for edge or corner detection may be used by the processor. In some embodiments, other features can be identified to further capture the identity of the environment or objects within the environment. In some instances, features are compared with a previously created map.

The robotic device may, for example, use the map to autonomously navigate the environment during operation, e.g., accessing the map to determine that a candidate route is blocked by an obstacle denoted in the map, to select a route with a route-finding algorithm from a current point to a target point, or the like. To avoid incorrect detection of an obstacle, in some embodiments, each location within the map is assigned an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, and 15/619,449, the entire contents of which are hereby incorporated by reference. In some embodiments, a new map is constructed at each use, or an extant map is updated based on newly acquired data.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

Some embodiments may reference previous maps during subsequent mapping operations. For example, embodiments may apply Bayesian techniques to simultaneous localization and mapping (SLAM) and update priors in existing maps based on mapping measurements taken in subsequent sessions. In some embodiments, the processor localizes itself during mapping or during operation. In some embodiments, methods of localization are inherently independent from mapping and path planning but may be used in tandem with any mapping or path planning method or may be used independently to localize the robotic device irrespective of the path or map of the environment. In some embodiments, the processor uses quantum SLAM. In some embodiments, the processor may determine the motion of the robotic device using Newton's motion equation $$F = m\frac{d^2 x}{dt^2},$$

wherein F is the force causing the robotic device to move, m is the mass of the robotic device, x is the position of the robotic device, t is time, and d signifies the derivative. In some embodiments, the processor may determine the motion of the robotic device using $$F = -\frac{\partial V}{\partial x},$$

wherein V is potential energy causing motion of the robotic device and $\partial$ signifies a partial derivative. In some embodiments, the processor combines the two motion equations to form a motion function $$m\frac{d^2 x}{dt^2} = -\frac{\partial V}{\partial x}$$

used by the processor to determine the position of the robotic device at a given time, the equation in accordance with Newton's Second Law. Given the position of the mass (i.e., the robot) at any given time x(t), the processor may determine the velocity $$\left(v = \frac{dx}{dt}\right),$$

momentum (p=mv), and kinetic energy $$\left(T = \frac{1}{2}mv^2\right),$$

among other dynamic variables of the robot. Given the initial state variables, i.e. the position $x(t_0)$ and velocity $x'(t_0)$ of a particle (i.e., the robot), the processor may determine the trajectory of the particle. Using the initial position and velocity of the robotic device, the processor determines the position x of the robot at a later time $(t_0+\Delta t)$ using $x(t_0+\Delta t) = x(t_0) + x'(t_0)\Delta t$. The equation holds true if the velocity is constant in the time interval $[t_0, t_0+\Delta t]$, otherwise it is an approximation. In some embodiments, the processor iteratively repeats the process to determine the trajectory at time $(t_0+2\Delta t)$ and so on. With the motion function being second order in time, $x(t_0)$ and $x'(t_0)$, are required to specify a trajectory. This is equivalent to identifying two space-time points $(x_i, t_i)$ and $(x_f, t_f)$.

Rather than consider a single position x, the processor generalizes to n-dimensions $(x_1, x_2, \ldots, x_n)$ such that the spatial configuration of the robotic device is represented as a point in an n-dimensional configuration space, otherwise known as a Hilbert Space. In some embodiments, the configuration space is a subset of the Hilbert Space. In some embodiments, the processor generalizes the motion equation $$m_j \frac{d^2 x_j}{dt^2} = -\frac{\partial V}{\partial x_j}.$$

In some embodiments, the processor integrates the motion equation to determine the trajectory of the robotic device. Since the trajectory equation applies for all possible paths, a function dependent on not only the position x at time t but also on the path is required. In practice, the robotic device may take any possible path. In some embodiments, the processor uses the Lagrangian function to predict such trajectory as it is a function of position, velocity, and time, and equal to the difference in kinetic energy and potential energy. In some embodiments, the processor determines an action $S[x(t)]$ for each path from $(x_i, t_i)$ to $(x_f, t_f)$ using $$S[x(t)] = \int_{t_i}^{t_f} L(x_i, x_f) dt.$$

Figure 23A:
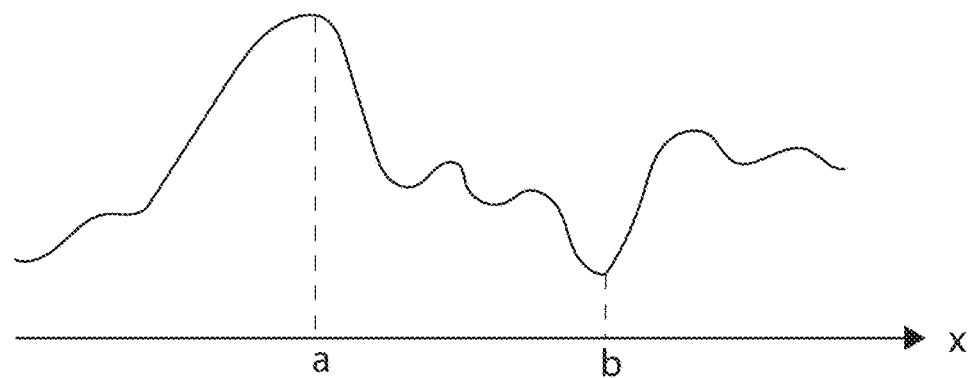
FIGS. 23A-23C illustrate an embodiment of a localization process of a robot, according to some embodiments.

In some embodiments, the processor represents all possible locations resulting from possible actions S (or paths) or the action space by a field $|\Psi(x, t)|^2$. By definition, a field is a physical quantity represented by a number or tensor that has a value for each point in space and time. For example, the surface wind velocity on a weather map can be considered a field since a vector describing the speed and direction of the movement of air is assigned to each point on the map for each time point t. In another example, surface temperature on the planet can be considered a field as a surface temperature exists for each point on the planet at a given time. In the case of the robotic device, the field $|\Psi(x,t)|^2$ describes the likelihood of possible locations of the robotic device at time t in some embodiments. This is shown in FIG. 23A, where possible locations of the robotic device in a one-dimensional space are illustrated. As can be seen in this example, the robotic device is more likely to be at a location x=a with a higher peak than at a location x=b. The illustration provided is one-dimensional for simplicity.

Figure 23B:
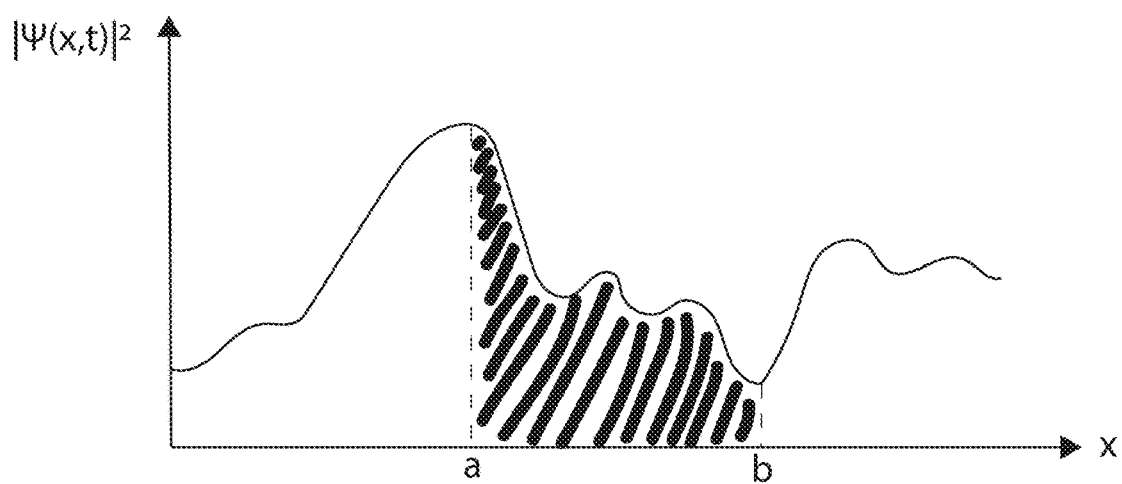

Given that the field $|\Psi(x,t)|^2$ describes the likelihood of possible locations of the robotic device at time t, in some embodiments, the processor determines the likelihood of the location of the robotic device being between two points a and b at a time t using $$\int_a^b |\Psi(x, t)|^2 dx,$$

the area under the curve $|\Psi(x,t)|^2$, as shown in FIG. 23B. In some embodiments, the processor normalizes the function $|\Psi(x,t)|^2$ by multiplying by a value $c=1/\sqrt{A}$, where A is a potential value other than 1. By normalizing, the above integral becomes equal to unity, $$\int_a^b |\Psi(x, t)|^2 dx = 1.$$

In some embodiments, the integral provides the probability of x having a value between a and b at a given time t since the area bound in the integral summates to unity. In some embodiments, the normalized function $|\Psi(x,t)|^2$ may be a probability density function (PDF) and the processor determines the probability of the robotic device being located at a particular location by determining the integral of the PDF, i.e., $$\int_a^b |\Psi(x, t)|^2 dx = P(a < x < b, t).$$

Since $|\Psi(x,t)|^2$ is a linear differential equation that may be normalized, the processor may determine the expectation of the location x of the robotic device in some embodiments using $$\langle x \rangle = \int_{-\infty}^{\infty} x |\Psi(x, t)|^2 dx.$$

Additionally, given the velocity $$v = \frac{dx}{dt},$$

the processor may determine the expected value of velocity of the robotic device in some embodiments using $$\langle v \rangle = \frac{d\langle x \rangle}{dt} = \frac{d}{dt}\int_{-\infty}^{\infty} x|\Psi(x,t)|^2 dx.$$

In some embodiments, the processor obtains readings of the surroundings from one or more sensors internal or external to the robotic device. Readings may be of various forms. For example, readings may be visual readings captured by an image sensor, distance readings taken by a distance sensor, time-of-flight readings taken by a time-of-flight camera, WI-FI signal strength readings taken by a WI-FI module or decibel readings observed by an acoustic sensor. Different types of readings may be used independently or simultaneously for quantum SLAM. In some embodiments, the processor infers a position x of the robotic device in a global coordinate system at time t of the reading, thereby localizing the robotic device. In some embodiments, the location is given by x=(x, y, θ) in two dimensions and x=(x, y, z), θ=($R_x$, $R_y$, $R_z$) in three dimensions, wherein R is a rotation matrix.

Figure 23C:
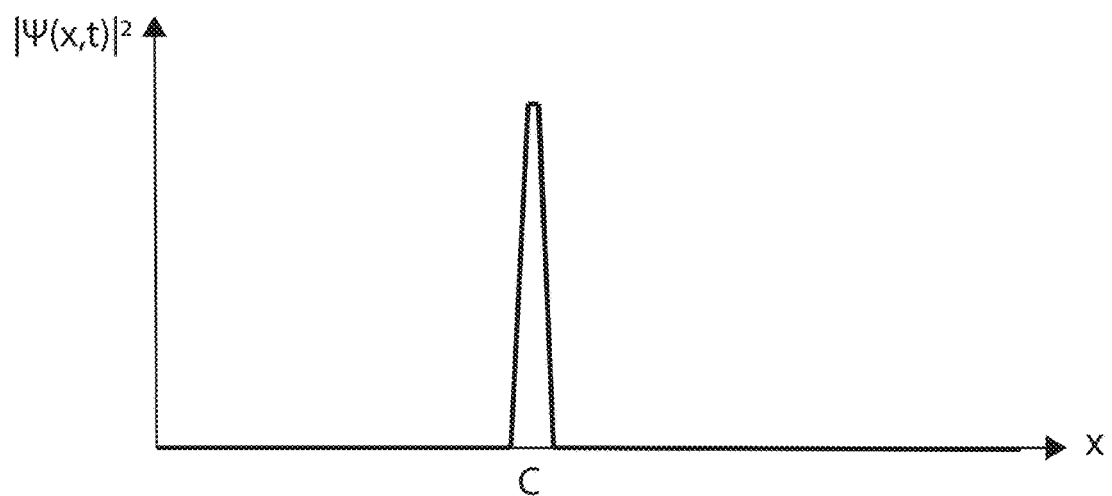

In some embodiments, localization of the robotic device occurs at the time a reading is taken and is represented by a position x with respect to the surroundings, such as objects, obstacles or perimeters, regardless of the method used for localization and the type of sensor or measurement device. For example, if a measurement device of the robotic device measures distance to an object, the instant the measurement is taken the processor localizes the robotic device to be at some position x with respect to the object measured; if the measurement device measures noise in decibels, the processor localizes the robotic device as being at some position x from the originator of the noise; and if the measurement device measures WI-FI strength, the processor localizes the robotic device as being at some position x from the originating point of the WI-FI signal. In some embodiments, the measurement process for localization is similar to a wave propagation. The immediate surroundings of the robotic device are initially observed using at least one sensor followed by further distances into the surroundings as waves propagate, expanding the radius of observation. In some embodiments, the radius r of each propagating wave increases may by a value λ. When the processor obtains a reading that can be used to account for localization, at that instant, the processor collapses the PDF to a Dirac Delta function with a spike at some value C for the location x of the robotic device, as shown in FIG. 23C. The spike at some value C localizes the robotic device as being at location C at that instant. If other readings are taken at that instant, the spike at some value C for the location x is confirmed but after that instant and with movement of the robotic device, the processor reverts the function back to being spread over possible values of x, as shown in FIGS. 23A and 23B for example. In some embodiments, λ is the localization resolution. For example, the processor uses multiples of λ to describe the placement of the sensor against the surroundings. In some embodiments, the resolution of the reading is not the same as the localization resolution; therefore, the processor casts the reading into a possible location of the robotic device in multiples of λ. In some embodiments, the processor uses a probabilistic value to describe the likelihood of what multiple of λ to interpret the reading to. In some embodiments, the processor determines the probabilistic value as $$logit\ (P(x)) = \log\frac{P(x)}{1-P(x)},$$

wherein P(x) is the probability of x and $$\frac{P(x)}{1-P(x)}$$

is the odds of x being true. In this case x is a multiple of lambda.

Figure 24:
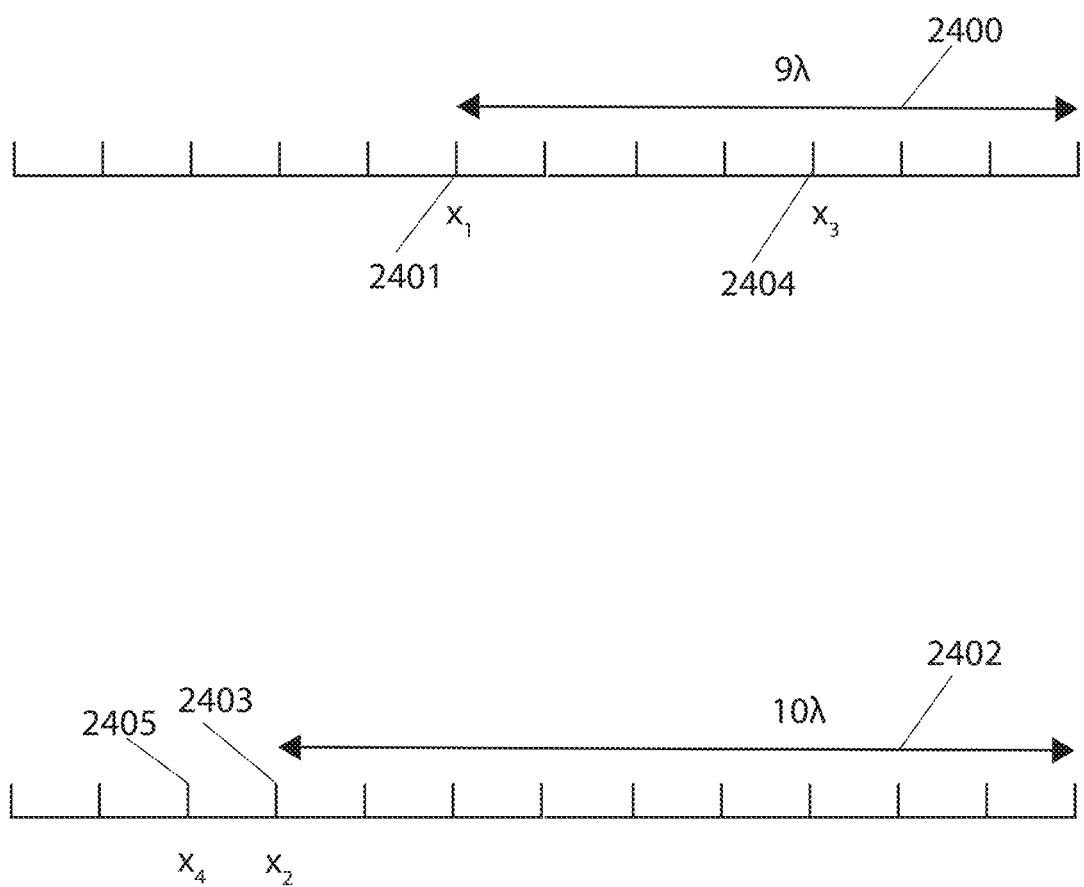
FIG. 24 illustrates an example of alternative localization scenarios wherein localization is given in multiples of $\lambda$, according to some embodiments.

In some embodiments, the processor generates a simulated representation of the environment for each considered possible position of the robot. In some embodiments, the processor compares the measurement against each simulated representation of the environment (e.g., a map) corresponding with a perspective of each of the considered possible positions of the robot. In some embodiments, the processor chooses the position of the robot that makes the most sense as the most feasible position of the robot. In some embodiments, the processor selects additional considered possible positions of the robot as a backup to the most feasible position of the robot. With each measurement, the certainty in the most feasible position of the robot chosen increases or decreases. In some embodiments, the processor retains interpretations of the localization of the robotic device having lower probabilistic values, despite higher probabilistic values being indicative of a better interpretation of the localization of the robotic device. This is important as the robotic device may be localized differently for different multiples of λ. and different localization results in a different map. For example, in FIG. 24 the processor uses a one-dimensional camera reading 2400 of 9λ to localize the robotic device at location 2401 with value $x_1$ while a camera reading 2402 of 10λ is used to localize the robotic device at location 2403 with value $x_2$. Since both readings localize the robotic device to different locations, each reading may result in a different map. In some embodiments, each location may be possible and alternative scenarios may be evaluated by the processor. In some embodiments, the number of alternative scenarios to evaluate may be predetermined or the processor selects the alternative scenarios to evaluate in real-time. For example, the processor evaluates two possible scenarios, one where the robotic device is localized at location 2401 with value $x_1$ and another where the robotic device is localized at location 2403 with value $x_2$. However, other scenarios, such as localization of the robotic device at locations 2404 and 2405 with values $x_3$ and $x_4$, respectively, may be evaluated by the processor as well. In some embodiments, the processor uses more than one dimension for localization. However, as the number of dimensions used increases, the number of alternative scenarios does as well, and localization may become computationally expensive. In some embodiments with low resolution and low dimensionality, the processor monitors 4 to 30 alternatives for example. In some embodiments where the resolution is higher, a higher number of alternative scenarios may be required. In some embodiments, the processor monitors, for example, between 35 to 200 alternative scenarios. In some embodiments, the processor uses an adaptive algorithm to increase and decrease the number of alternative scenarios as needed. In some embodiments, the processor replaces alternative scenarios monitored by other alternatives through a process of fitness proportionate selection wherein the processor uses a fitness function to assign a fitness to possible alternative scenarios. In some embodiments, the fitness level is used to associate a probability of selection with each alternative scenario. In some embodiments, the processor determines the fitness function using $$p_i = \frac{f_i}{\sum_{j=1}^{N} f_j},$$

wherein $f_i$ is the fitness of alternative scenario i of N possible scenarios and $p_i$ is the probability of selection of alternative scenario i. In some embodiments, the processor is less likely to eliminate alternative scenarios with higher fitness level from the alternative scenarios currently monitored.

In some embodiments, wherein more than one reading is used for localization of the robotic device, the location inferred by the processor has a higher certainty of being correct when readings are in-phase and agree with one another. In some embodiments, readings or measurements are a combination of readings or measurements from multiple sensors once processed by the processor. In some embodiments, readings from multiple sensors may disagree and produce imprecise localization by the processor as disagreeing readings place the robotic device at different locations. For example, a spike at some position x of the robotic device results when readings from multiple sensors are in agreement. The agreement of readings from multiple sensors results in a sharp maximum at some position x as the certainty of the localization increases from validation of readings from multiple sensors. However, in some embodiments it is possible that multiple readings from multiple sensors disagree resulting in the processor inferring different locations of the robotic device. For example, the probability distribution may include two spikes, one being sharper than the other. Most readings from various sensors are in agreement forming the sharper spike corresponding with some position x, however, some readings from other sensors are in disagreement, resulting in the second dull spike corresponding with some position y of the robotic device. Values for the position x of the robotic device have higher probability of being the position of the robotic device that values for the position y, as the majority of readings in agreement correspond to values for the position x.

Figure 25:
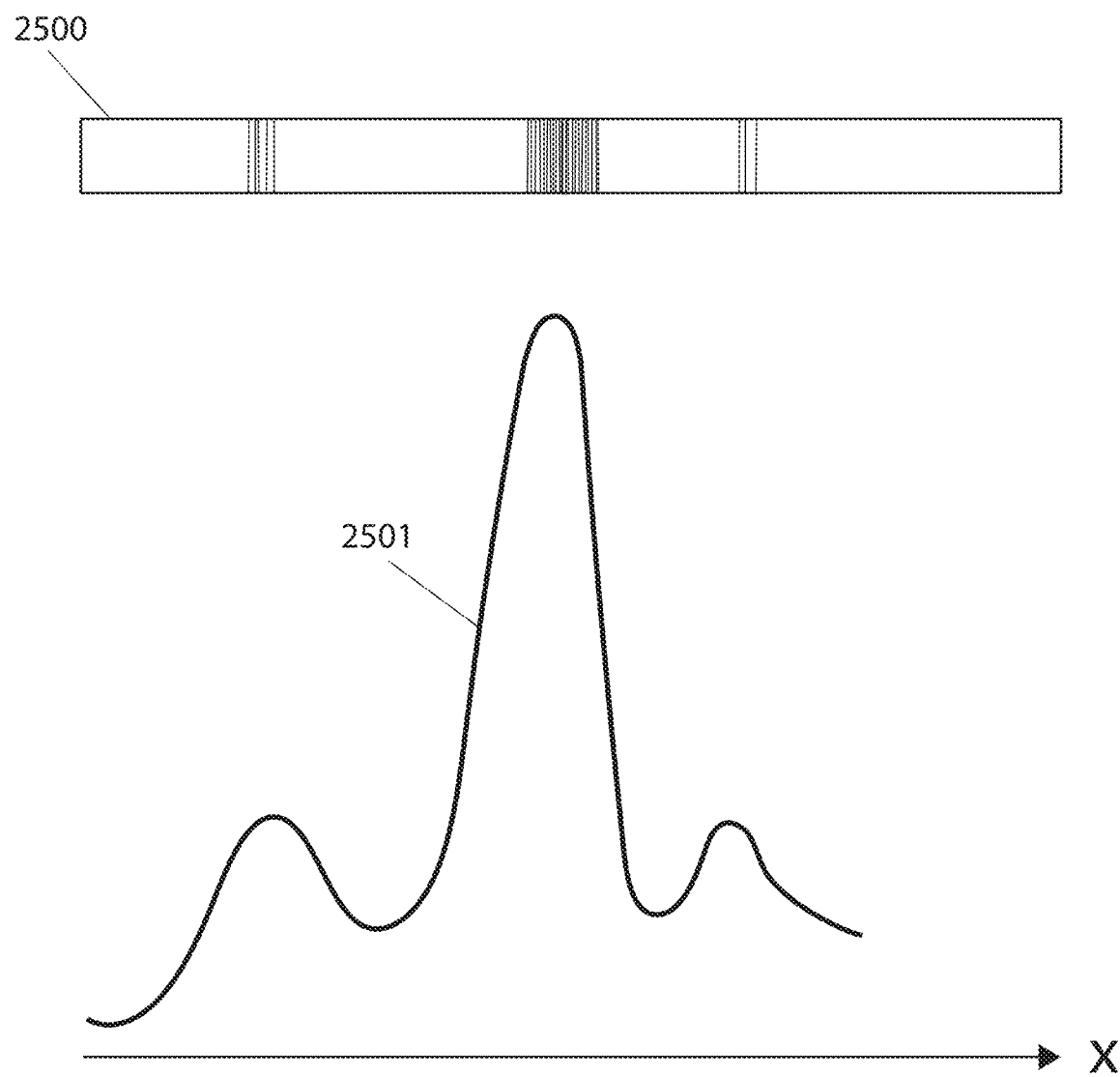
FIG. 25 illustrates an example of discretization of measurements, according to some embodiments.

In some embodiments, with some processing, the processor eliminates possible locations of the robotic device such that the probability distribution function collapses to a Dirac Delta function, such as that shown in FIG. 23C. For example, in certain environments readings of some sensors may be considered less accurate than others and may therefore not considered or if the majority of readings from different sensors are in agreement the minority readings in disagreement are not considered or unrealistic readings are eliminated. In some embodiments, the processor discretizes measurements, as shown in FIG. 25 with discrete representation 2500 of possible positions x of the robotic device in graph 2501. In some embodiments, the processor compares discrete values against a preprogrammed bias function. In some embodiments, the discretized values that are well matched with the noise and bias that are previously given to the robotic device are given more importance by the processor. In some embodiments, a second reading is taken by the same or another sensor and values of the first and the second readings are compared and combined by the processor to form a more reliable reading. In some embodiments, the first reading and second reading are not of the same kind. For example, a first reading is from an odometer and a second reading is from a depth camera. In some embodiments, the processor compares the discretized values that are matched against a bias function to determine how they fit with a second discretized function. In processing of the information, as explained in the above embodiments, the reading that is used is assumed to be accurate enough to localize the robotic device to some location C with a certain resolution.

In between readings, the robotic device is in a state of superposition as it may only be localized by the processor when a reading is taken. Therefore, if the system is interpreted as a Copenhagen Interpretation wherein the physical system does not have definite properties prior to being measured and only the probabilities that readings will produce certain results may be predicted, it may be thought that measurement is what causes the robotic device to be perceived at some location C at a given time or that measurement, in effect, localizes the robotic device. For this reason, preparation and measurement are independent in some embodiments described herein. In some embodiments, preparation includes any action or control that causes the robotic device to take a particular measurement. For example, preparation includes the robotic device driving to a location wherein a particular reading is taken or includes a user placing the robotic device or pushing the robotic device to a location wherein a particular reading is taken. In some embodiments, the robotic device is assumed to be in an eigenstate, the state where the limit of repeated readings converges to a specific value, when a sensor takes a reading of the surroundings. Thus, in some embodiments, preparation puts the system in an eigenstate.

Figure 26:
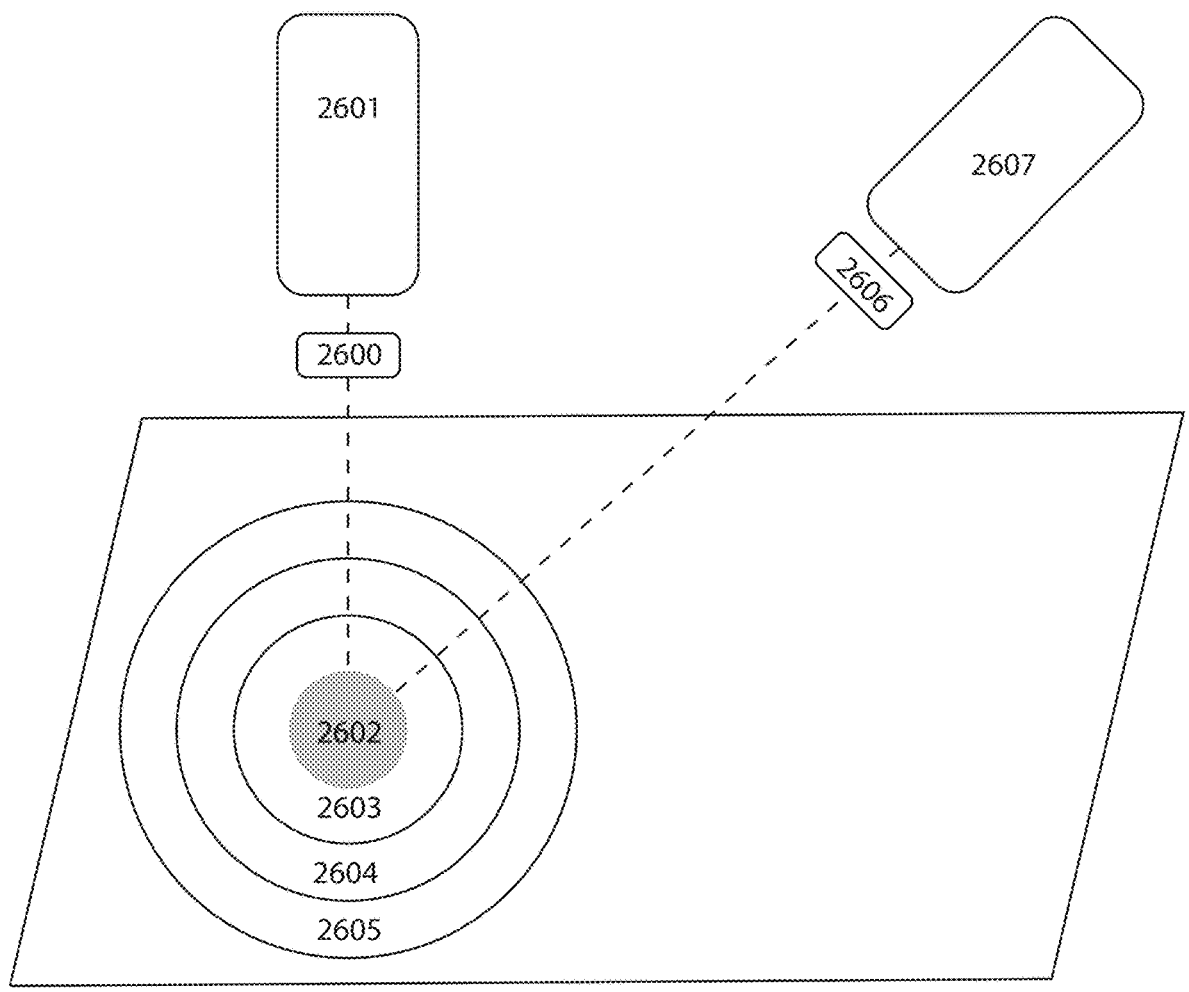
FIG. 26 illustrates an example of preparation of a state, according to some embodiments.

In some embodiments, the collection of actions and/or controls that cause the robotic device to take the same particular reading are said to prepare the same state and are referred to as preparation operators. For example, FIG. 26 illustrates robotic device 2600 being dropped by a machine or other device through a vertically oriented tube 2601 positioned directly above area 2602 on driving surface 2603. There is a high likelihood that this action will result in the robotic device landing directly below tube 2601 in area 2602. It is also possible it may land in areas 2603, 2604 or 2605, though with less likelihood the further away the area is from area 2602 located directly beneath tube 2601. If the action were repeated n times, as n approaches infinity, the limit of the robotic device landing at some area A converges to $$\frac{m}{n},$$

where m is the number of times the robotic device lands in area A. The processor determines this convergence for areas 2602, 2603, 2604 and 2605. Based on the results, the area within which the robotic device is most likely located in reality converges to a specific area, the area A with greatest value m. Convergence usually occurs after many repetitions of the same action or experiment. At the beginning of experimentation, observations may not converge. At the beginning of the experiment, results may seem divergent or it may appear that the possibility of the robotic device landing in multiple areas is similar. However, as n increases, the area in which the robotic device is most likely located converges to 2602. The processor determines convergence using $$P(A|C) \lim_{n \to \infty} \frac{m}{n}.$$

This can be thought of as the propensity of the robotic device landing in area A given condition C, which in this case is the action of the robotic device being released through tube 2601, or otherwise the preparation operator. There may exist other preparation operators for the same state. For example, the action of robotic device 2606 in FIG. 42 being released through tube 2607 angled at 45 degrees with the same set of probabilities of landing in areas 2602 through to 2605 is said to prepare the same state. In some embodiments, a mathematically equivalent experiment comprising n robotic devices dropped at once producing the same results is said to prepare the same state. With the same logic, the limit of the robotic device landing at some area A converges to $$\frac{m}{n},$$

with a greater number of robotic devices landing in area 2602 as compared to areas 2603, 2604 and 2605. For a robotic device in operation, the processor assumes any actions and/or controls that produce the same results prepare the same state. As an alternative to counting the number of times the robotic device lands in an area A, the processor can apply the convergence in other ways. For example, if the mass of all robotic devices were equivalent and each separate area was a weighing scale, the limit of the weight in area A converges as well, where m in this case is the total weight in area A and n is the total weight of all areas combined. The processor determines the number of robotic devices in each area by dividing the total weight of an area by the weight of a single robotic device. Given the results of the experiment the processor deduces, for example, that the robotic device lands in area 2602. With the different preparations being mathematically equivalent, as n→∞, preparations are considered interchangeable. To visualize n→~, repeatedly dropping a large number of robotic devices a large number of times is envisioned wherein n×n=∞. Given the different possible preparations, the reading taken remains independent of the preparation or the method by which the robotic device gets to areas 2602 through to 2605, for example. In operation, the processor determines convergence or propensity of landing in an area A over time. While only the probability of the robotic device landing in areas 2602 to 2605 is discussed, the probability of the robotic device being located at very remote areas is not zero as there is always a possibility that the robotic device is located anywhere. However, in some embodiments, the processor compares all possible areas and their corresponding convergence results and eliminates areas with low probabilities, leaving only most intuitive and realistic areas for evaluation.

In some embodiments, having separated measurement and preparation, the processor interprets Ψ discretely. For example, in the case of a vector ket $|X\rangle$ of n linearly independent elements $(x_1, x_2, \ldots, x_n)$ in a subset of a Hilbert Space, a preparation vector ket $|P\rangle$ acts on each element of vector ket $|X\rangle$ such that a measurement produces an element in ket $|\Psi\rangle$, an eigenvector describing all possible eigenstates of the robotic device. Therefore, ket $|\Psi\rangle$ is broken down by the processor to vectors acting on the space vector. Using Bra-Ket notation, the processor uses $|\Psi\rangle = C_1|X\rangle + C_2|P\rangle + C_3|P\rangle + \ldots$, wherein C is an eigenvalue of scalar coefficient stretching the vector in the space. The processor uses this discrete approach to filter out states of the robotic device with low possibility or without any possibility of being true. By describing localization in a subset of a Hilbert Space, localization of the robotic device is not confined to a Cartesian coordinate system. Different sets of vectors are used by the processor in localization of the robotic device whereby each set of vectors that cannot be represented as multiplication of other vectors increases the dimensionality of the system. For example, in some embodiments, the processor localizes the robotic device against a certain type of floor assuming sensors are capable of processing and distinguishing floor types based on the reflection from the emitted light; against a room in which the robotic device may be working wherein the room is represented as a graph of connected nodes; against a certain height measured relative to the driving surface given different heights are defined in the space; against a certain Wi-Fi strength; against presence or strength of light, sound, people, objects, or any other substance or material; against the slope of the environment; against the amount of power required by the system assuming different locations require different power, as in case of requiring more power for driving up a slope or requiring more power to rotate a wheel or main brush when on carpet; and against amp withdrawal. As a further example, the processor localizes the robotic device against an edge at which two walls meet or a corner where multiple walls meet. In some cases, the readings taken provide less information of the observed surroundings than others but do provide, to some degree, a sense of the surroundings of the robotic device. For example, a sensor captures a reading for which no objects, obstacles, or perimeters exist within the measurement range. Although the sensor does not measure any objects, obstacles, or perimeters, the processor still gains useful information about its surroundings. It can conclude that there are no objects, obstacles, or perimeters between the robotic device and the maximum measurement range, thereby gaining a sense of the surroundings.

In some embodiments, the processor localizes the robotic device within a phase space. In some embodiments, the phase space includes all possible states of the robotic device. In some embodiments, a probability distribution may be used by the processor to approximate the likelihood of the state of the robotic device being within a specific region of the phase space. In some embodiments, the processor determines a phase space probability distribution over all possible states of the robotic device within the phase space using a statistical ensemble including a large collection of virtual, independent copies of the robotic device in various states of the phase space. In some embodiments, the phase space consists of all possible values of position and momentum variables. In some embodiments, the processor chooses samples from the phase space for evaluation. In some embodiments, the phase space is discretized. In some embodiments, the discretized samples are filtered to only include classical mechanical attributes of the system (i.e., the robotic device) into the data structure. In some embodiments, the processor represents the statistical ensemble by a phase space probability density function ρ(p, q, t), q and p denoting position and velocity vectors. In some embodiments, the processor uses the phase space probability density function ρ(p, q, t) to determine the probability ρ(p, q, t)dq dp that the robotic device at time t will be found in the infinitesimal phase space volume dq dp. In some embodiments, the phase space probability density function ρ(p, q, t) has the properties ρ(p, q, t)≤0 and ∫ρ(p, q, t)d(p, q)=1, ∀t≥0, and the probability of the position q lying within a position interval a, b is $$P[a \leq q \leq b] = \int_a^b \int \rho(p, q, t) dp dq.$$

Similarly, the probability of the velocity p lying within a velocity interval c, d is $$P[c \leq q \leq d] = \int_c^d \int \rho(p, q, t) dq dp.$$

In some embodiments, the processor determines values by integration over the phase space. For example, the processor determines the expectation value of the position q by $\langle q \rangle$ =∫qρ(p, q, t)d(p, q).

In some embodiments, the processor evolves each state within the ensemble over time t according to an equation of motion. In some embodiments, the processor models the motion of the robotic device using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of phase space density function ρ(p, q, t) under a Hamiltonian H using the Liouville equation $$\frac{\partial \rho}{\partial t} = -\{\rho, H\},$$

wherein {·,·} denotes the Poisson bracket and H is the Hamiltonian of the system. For two functions ƒ, g on the phase space, the Poisson bracket is given by $$\{f, g\} = \sum_{i=1}^{N} \left( \frac{\partial f}{\partial q_i} \frac{\partial g}{\partial p_i} - \frac{\partial f}{\partial p_i} \frac{\partial g}{\partial q_i} \right).$$

In this approach, the processor evolves each possible state in the phase space over time instead of keeping the phase space density constant over time, which is particularly advantageous if sensor readings are sparse in time.

In some embodiments, the processor evolves the phase space probability density function ρ(p, q, t) over time using the Fokker-Plank equation which describes the time evolution of a probability density function of a particle under drag and random forces. In comparison to the behavior of the robotic device modeled by both the Hamiltonian and Liouville equations, which are purely deterministic, the Fokker-Planck equation includes stochastic behaviour. Given a stochastic process with $dX_t = \mu(X_t, t)dt + \sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density ρ(x, t) for $X_t$ satisfies the Fokker-Planck equation $$\frac{\partial \rho(x, t)}{\partial t} = -\sum_{i=1}^{M} \frac{\partial}{\partial x_i} [\mu_i(x, t) \rho(x, t)] + \sum_{i=1}^{M} \sum_{j=1}^{M} \frac{\partial^2}{\partial x_i \partial x_j} [D_{ij}(x, t) \rho(x, t)]$$

with drift vector $\mu = (\mu_1, \ldots, \mu_m)$ and diffusion tensor $$D = \frac{1}{2} \sigma \sigma^T.$$

In some embodiments, the processor adds stochastic forces to the motion of the robotic device governed by the Hamiltonian H and the motion of the robotic device is then given by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D \nabla_p \rho),$$

wherein $\nabla_p$ denotes the gradient with respect to position p, $\nabla \cdot$ denotes divergence, and $$D = \frac{1}{2} \sigma_N \sigma_N^T$$

is the diffusion tensor.

In other embodiments, the processor incorporates stochastic behaviour by modeling the dynamics of the robotic device using Langevin dynamics, which models friction forces and perturbation to the system, instead of Hamiltonian dynamics. The Langevian equations are given by $M\ddot{q} = \nabla_q U(q) - \gamma p + \sqrt{2\gamma k_B T M} R(t)$, wherein (-γp) are friction forces, R(t) are random forces with zero-mean and delta-correlated stationary Gaussian process, T is the temperature, $k_B$ is Boltzmann's constant, y is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor using, for example, finite difference and/or finite element methods.

Figure 27A:
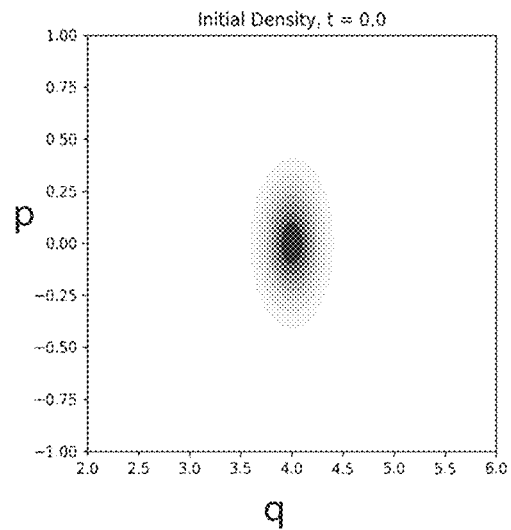
FIG. 27A illustrates an example of an initial phase space probability density of a robotic device, according to some embodiments.
Figure 27B:
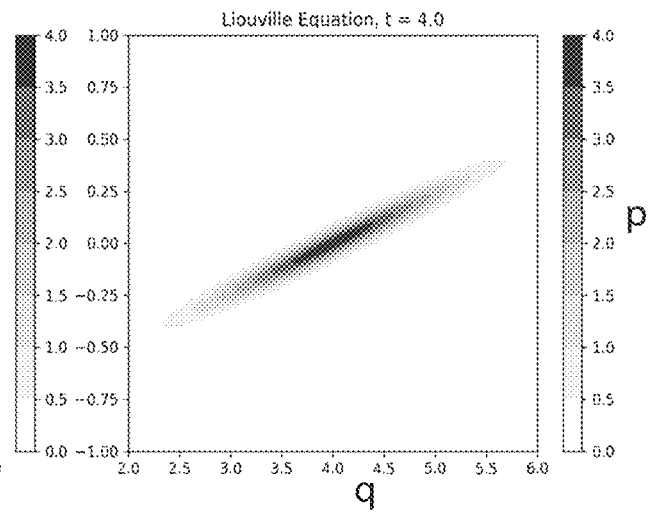
FIGS. 27B-27D illustrates examples of the time evolution of the phase space probability density, according to some embodiments.

FIG. 27A illustrates an example of an initial phase space probability density of a robotic device, a Gaussian in (q, p)

space. FIG. 27B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2}p^2.$$

Figure 27C:
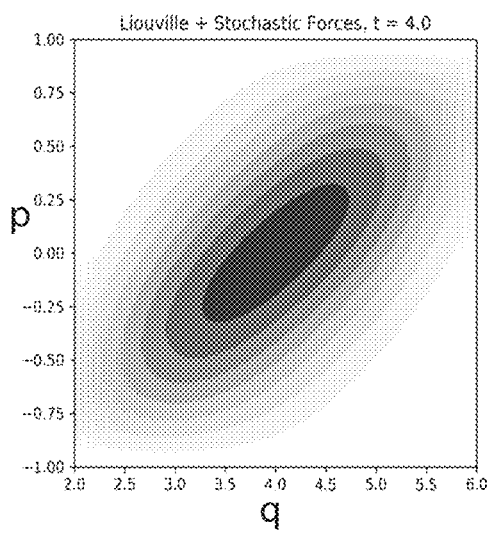
Figure 27D:
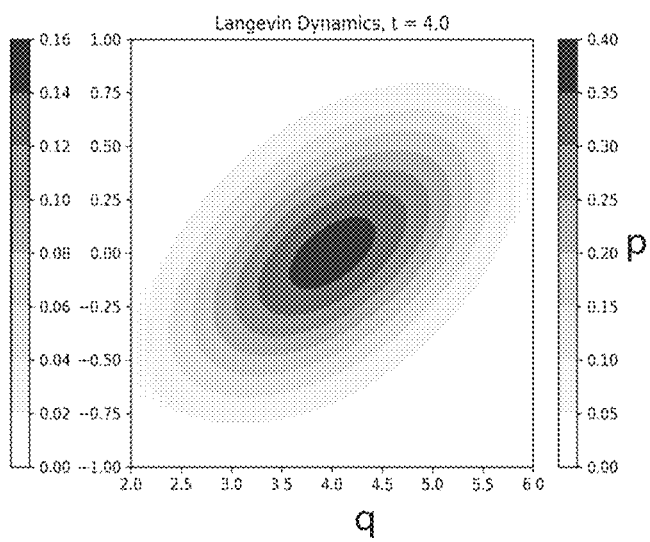

FIG. 27C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D\nabla_p \rho)$$

with D=0.1. FIG. 27D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (\gamma M \nabla_p \rho)$$

with γ=0.5, T=0.2, and $k_B$=1. FIG. 27B illustrates that the Liouville equation incorporating Hamiltonian dynamics conserves momentum over time, as the initial density in FIG. 27A was only distorted in the q-axis (position). In comparison, FIGS. 27C and 27D illustrate diffusion along the p-axis (velocity) as well, as both evolution equations account for stochastic forces. With the Fokker-Planck equation incorporating Hamiltonian dynamics the density spread more equally (FIG. 27C) as compared to the Fokker-Planck equation incorporating Langevin dynamics where the density remained more confined (FIG. 27D) due to the additional friction forces.

In some embodiments, the processor may update the phase space probability distribution when the processor receives readings (or measurements or observations). Any type of reading that may be represented as a probability distribution that describes the likelihood of the state of the robotic device being in a particular region of the phase space may be used. Readings may include measurements or observations acquired by sensors of the robotic device or external devices such as a Wi-Fi™ camera. Each reading may provide partial information on the likely region of the state of the robotic device within the phase space and/or may exclude the state of the robotic device from being within some region of the phase space. For example, a depth sensor of the robotic device may detect an obstacle in close proximity to the robotic device. Based on this reading and using a map of the phase space, the processor may reduce the likelihood of the state of the robotic device being any state of the phase space at a great distance from an obstacle. In another example, a reading of a floor sensor of the robotic device and a floor map may be used by the processor to adjust the likelihood of the state of the robotic device being within the particular region of the phase space coinciding with the type of floor sensed. In an additional example, a measured Wi-Fi™ signal strength and a map of the expected Wi-Fi™ signal strength within the phase space may be used by the processor to adjust the phase space probability distribution. As a further example, a Wi-Fi™ camera may observe the absence of the robotic device within a particular room. Based on this observation the processor may reduce the likelihood of the state of the robotic device being any state of the phase space that places the robotic device within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor may update the current phase space probability distribution $\rho(p, q, t_1)$ by re-calculating the phase space probability distribution based on an observation probability distribution $m(p, q, t_1)$ using $$p(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor for a reading at time $t_1$ using an inverse sensor model. In some embodiments, wherein the observation probability distribution does not incorporate the confidence or uncertainty of the reading taken, the processor may incorporate the uncertainty into the observation probability distribution by determining an updated observation probability distribution $$\hat{m} = \frac{1-\alpha}{c} + \alpha m$$

that may be used in re-calculating the current phase space probability distribution, wherein a is the confidence in the reading with a value of 0≤α≤1 and c=∬ dpdq. At any given time, the processor may estimate a region of the phase space within which the state of the robotic device is likely to be given the phase space probability distribution at the particular time.

Figure 28A:
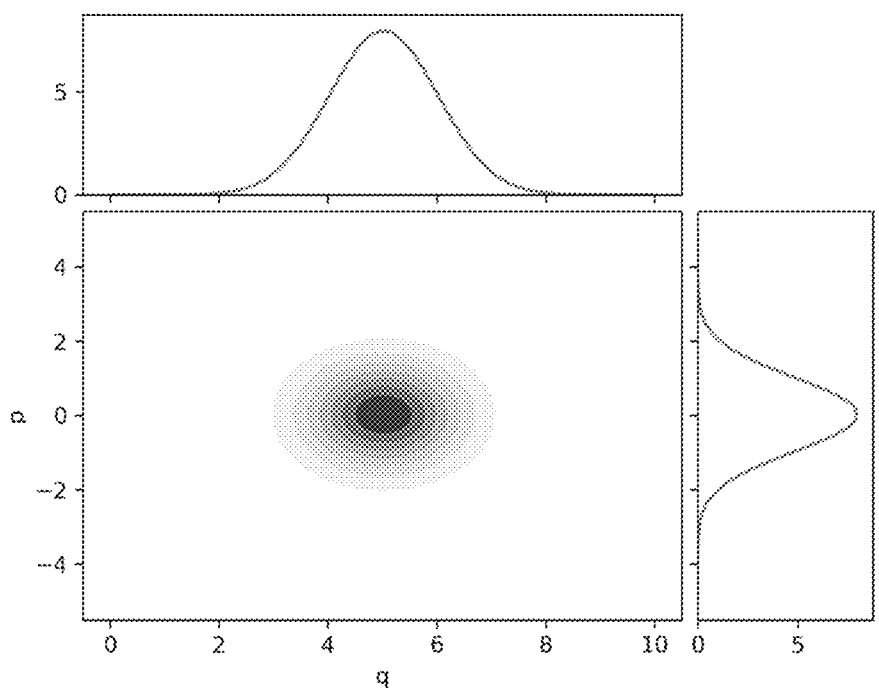
FIGS. 28A-28D illustrate examples of initial phase space probability distributions, according to some embodiments.
Figure 28B:
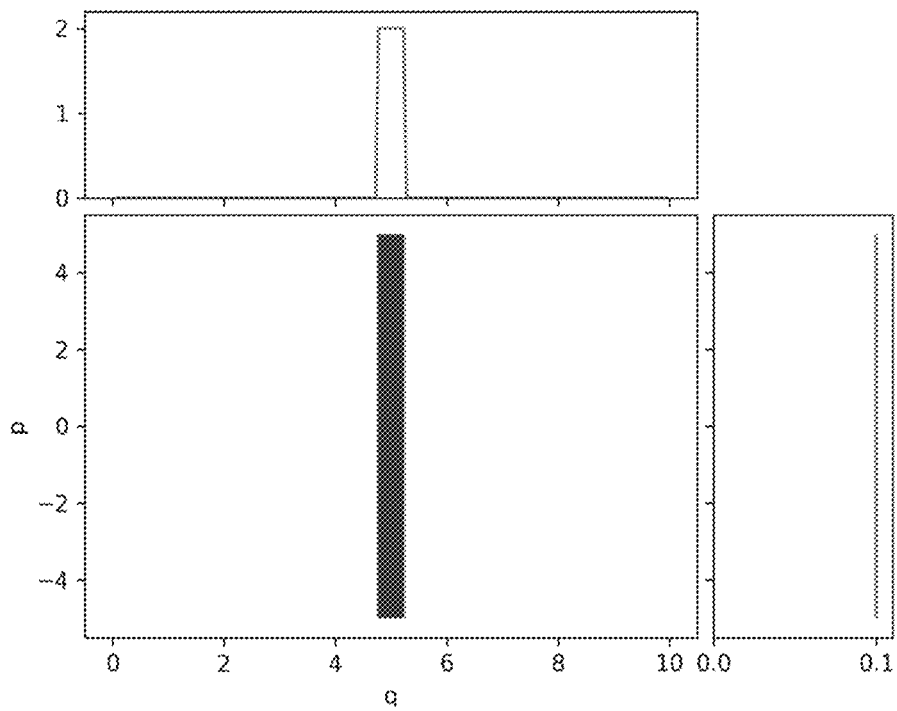
Figure 28C:
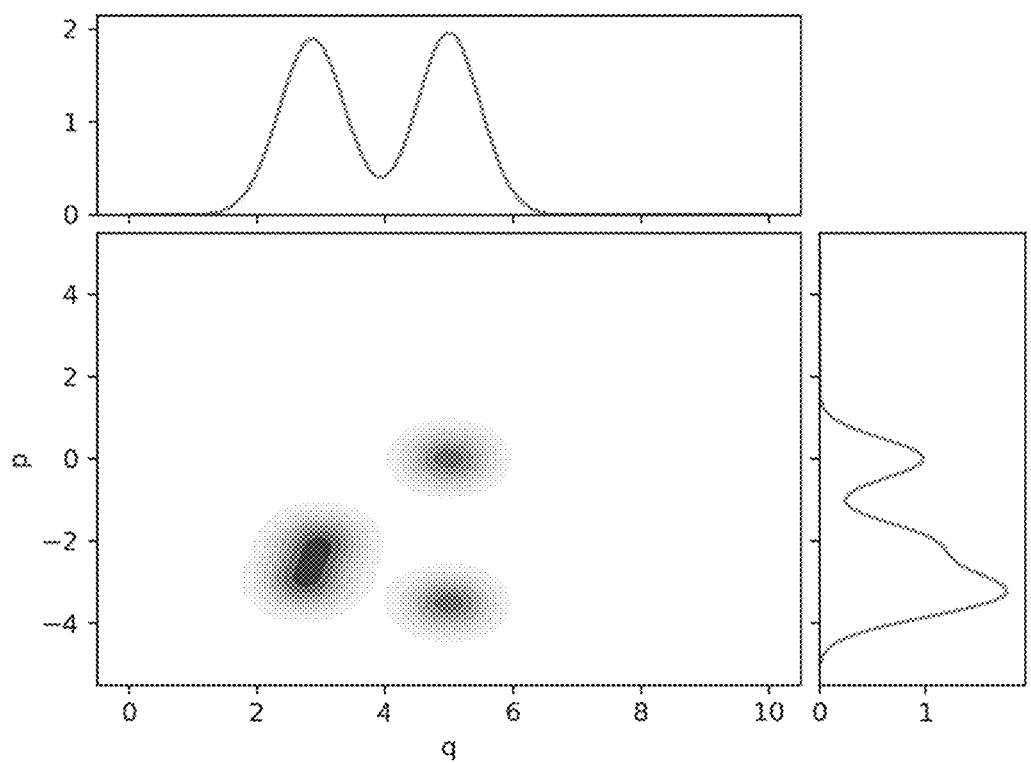
Figure 28D:
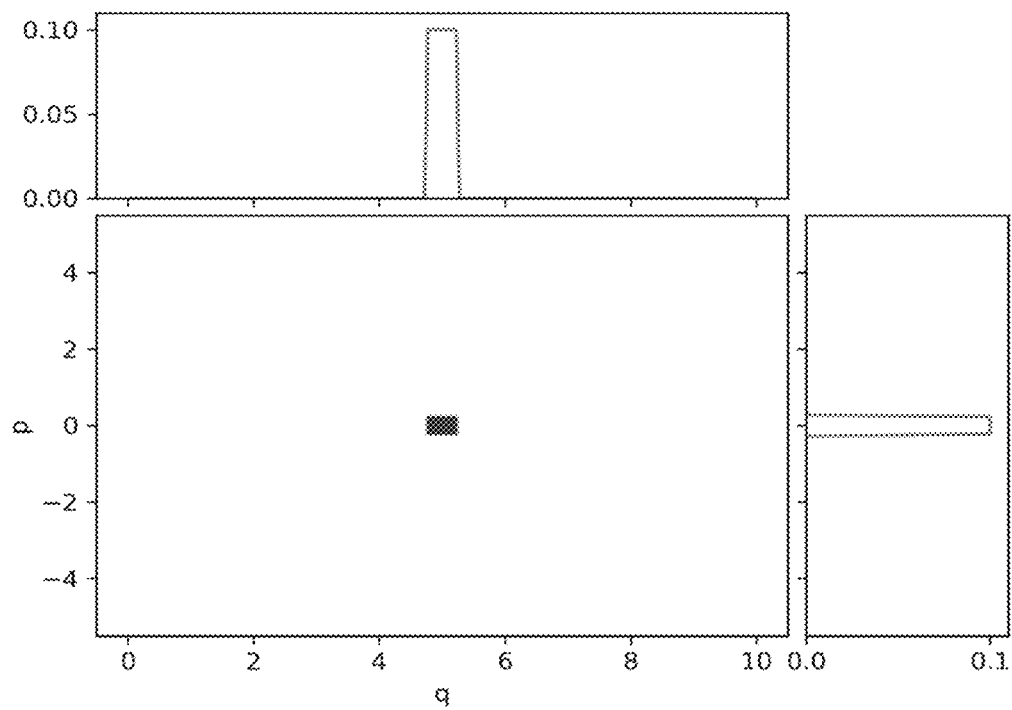

In one example, the processor uses a two-dimensional phase space of the robotic device, including position q and velocity p. The processor confines the position of the robotic device q to an interval [0, 10] and the velocity p to an interval [−5, +5], limited by the top speed of the robotic device, therefore the phase space (p, q) is the rectangle D=[−5, 5] x [0, 10]. The processor uses a Hamiltonian function $$H = \frac{p^2}{2m},$$

with mass m and resulting equations of motion $\dot{p}=0$ and $$\dot{q} = \frac{p}{m}$$

to delineate the motion of the robotic device. The processor adds Langevin-style stochastic forces to obtain motion equations $\dot{p}=-\gamma p+\sqrt{2\gamma m k_B T}R(t)$ and $$\dot{q} = \frac{p}{m},$$

wherein R(t) denotes random forces and m=1. The processor initially generates a uniform phase space probability distribution over the phase space D. FIGS. 28A-28D illustrate examples of initial phase space probability distributions the processor may use. FIG. 28A illustrates a Gaussian distribution over the phase space, centered at q=5, p=0. The robotic device is estimated to be in close proximity to the center point with high probability, the probability decreasing exponentially as the distance of the point from the center point increases. FIG. 28B illustrates uniform distribution for q∈[4.75, 5.25], p∈[−5, 5] over the phase space, wherein there is no assumption on p and q is equally likely to be in [4.75, 5.25]. FIG. 28C illustrates multiple Gaussian distributions and FIG. 28D illustrates a confined spike at q=5, p=0, indicating that the processor is certain of the state of the robotic device.

Figure 29A:
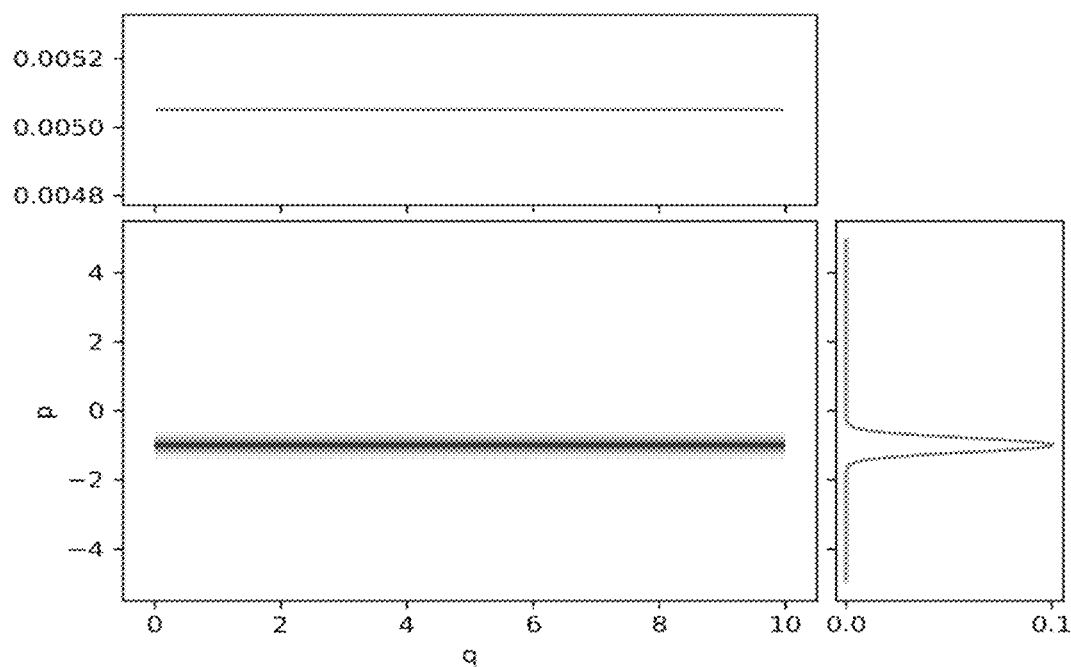
FIGS. 29A and 29B illustrate examples of observation probability distributions, according to some embodiments.
Figure 29B:
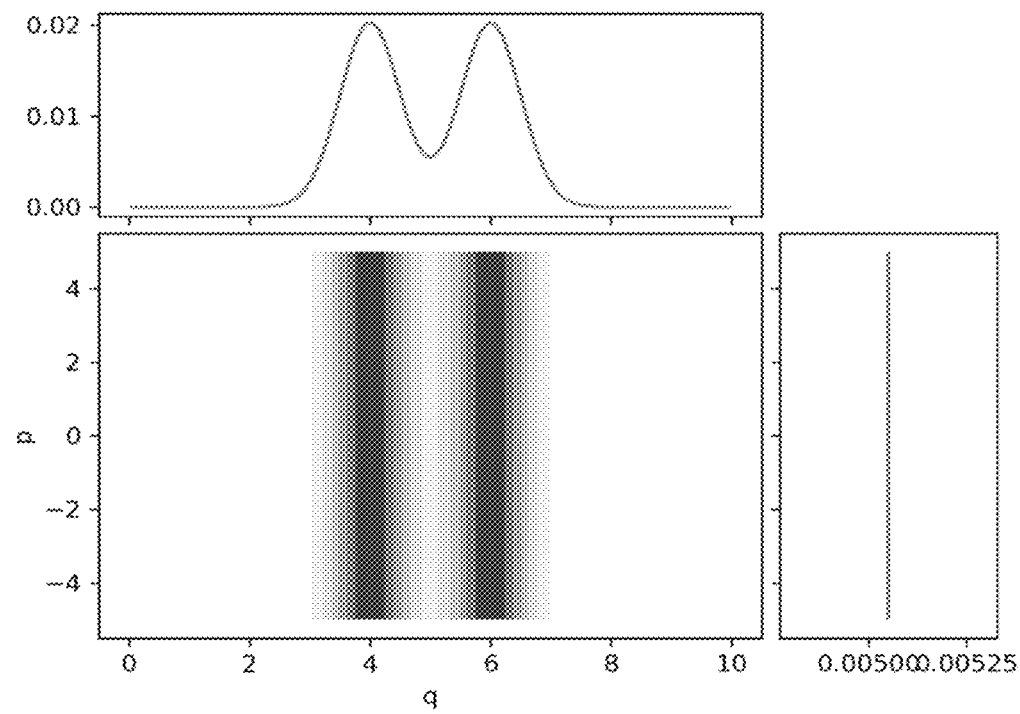

In this example, the processor evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $$\{\rho, H\} = p \frac{\partial \rho}{\partial q}$$

and m=1. Thus, the processor solves $$\frac{\partial \rho}{\partial t} = -p \frac{\partial \rho}{\partial q} + \gamma \left(\rho + p \frac{\partial \rho}{\partial p}\right) + \gamma k_B T \frac{\partial^2 \rho}{\partial p^2}$$

for t>0 with initial condition $\rho(p, q, 0)=\rho_0$ and homogenous Neumann boundary conditions. The boundary conditions govern what happens when the robotic device reaches an extreme state. In the position state, this may correspond to the robotic device reaching a wall, and in the velocity state, it may correspond to the motor limit. The processor updates the phase space probability distribution each time a new reading is received by the processor. FIGS. 29A and 29B illustrate examples of observation probability distributions for odometry measurements and distance measurements, respectively. FIG. 29A illustrates a narrow Gaussian observation probability distribution for velocity p, reflecting an accurate odometry sensor. Position q is uniform as odometry data does not indicate position. FIG. 29B illustrates a bimodal observation probability distribution for position q including uncertainty for an environment with a wall at q=0 and q=10. Therefore, for a distance measurement of four, the robotic device is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor may determine an observation probability distribution of a reading using an inverse sensor model and the phase space probability distribution may be updated by the processor by re-calculating it using the observation probability distribution of the reading.

Figure 30:
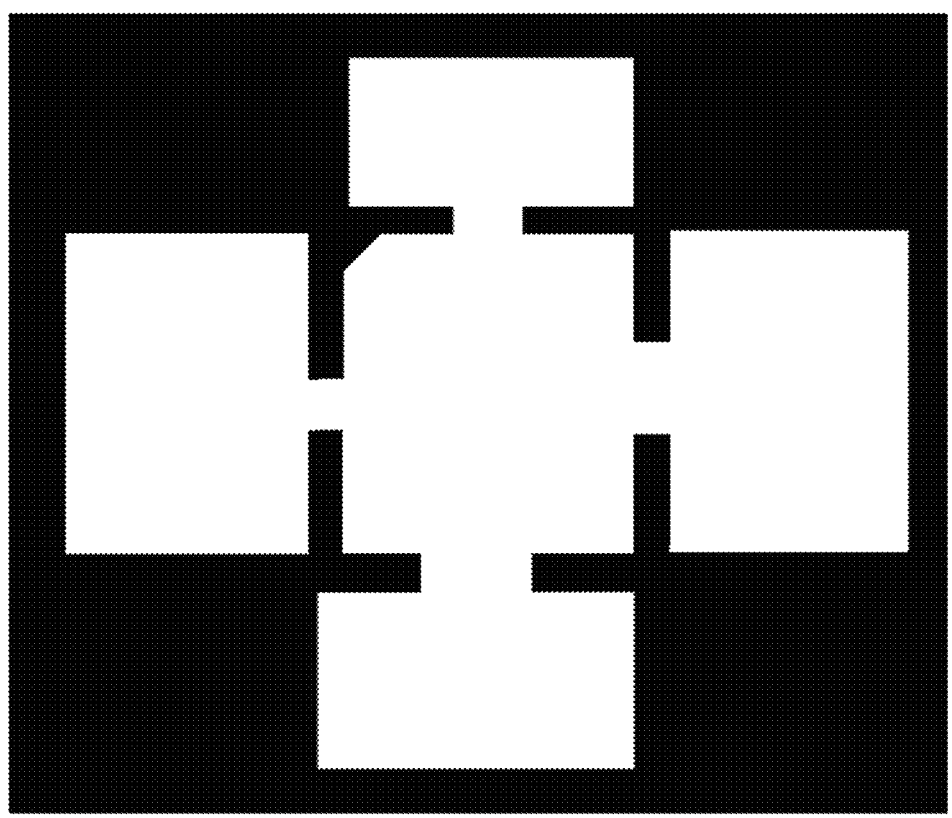
FIG. 30 illustrates an example of a map of an environment, according to some embodiments.
Figure 31A:
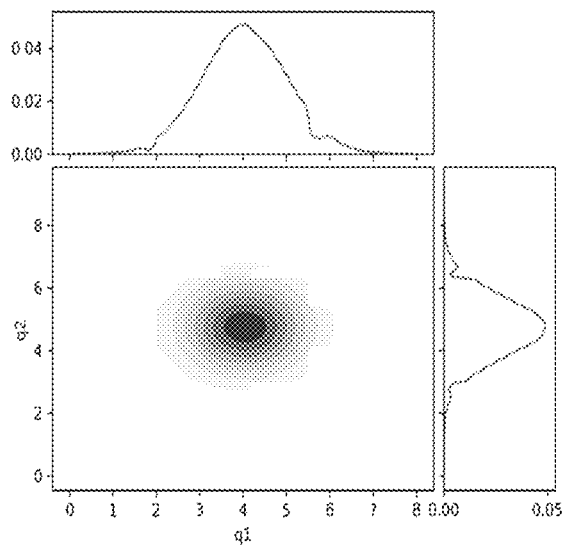
FIGS. 31A-31C illustrate an example of an evolution of a probability density reduced to the $q_1$, $q_2$ space at three different time points, according to some embodiments.
Figure 31B:
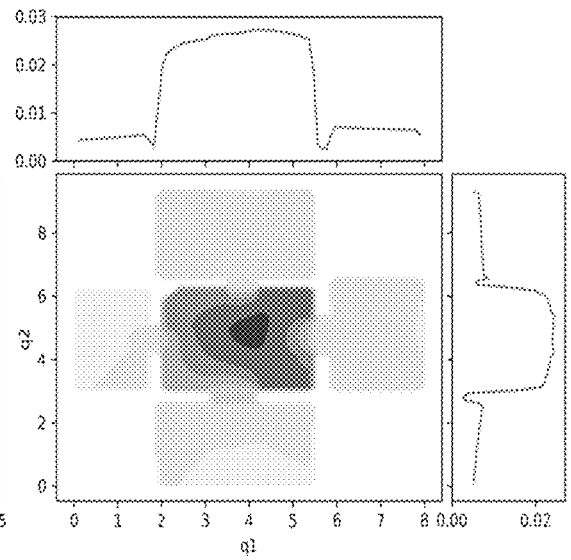
Figure 31C:
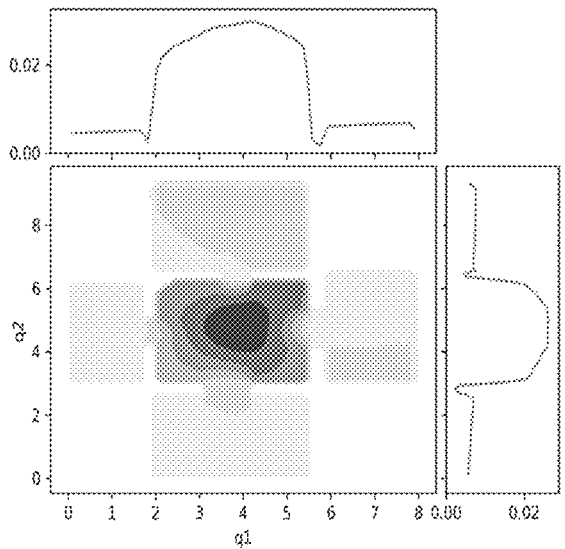
Figure 32A:
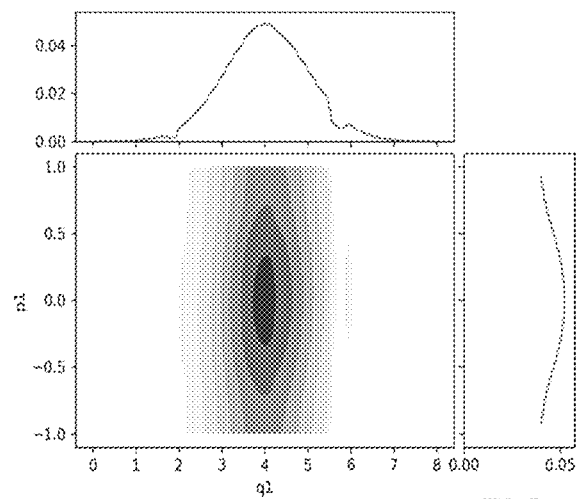
FIGS. 32A-32C illustrate an example of an evolution of a probability density reduced to the $p_1$, $q_1$ space at three different time points, according to some embodiments.
Figure 32B:
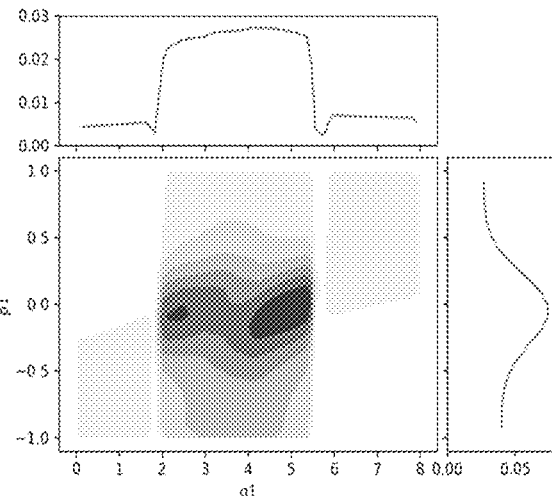
Figure 32C:
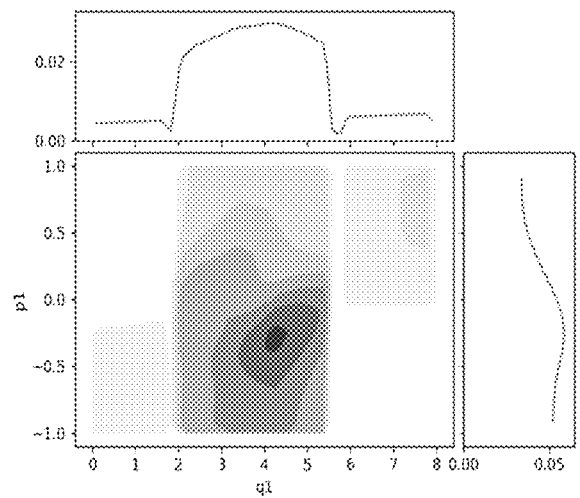
Figure 33A:
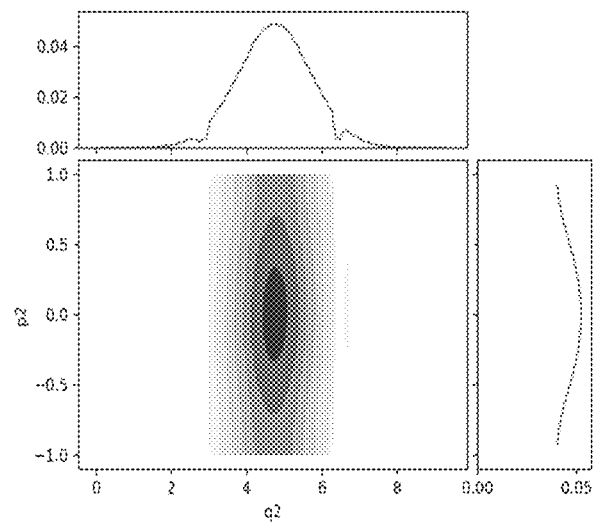
FIGS. 33A-33C illustrate an example of an evolution of a probability density reduced to the $p_2$, $q_2$ space at three different time points, according to some embodiments.
Figure 33B:
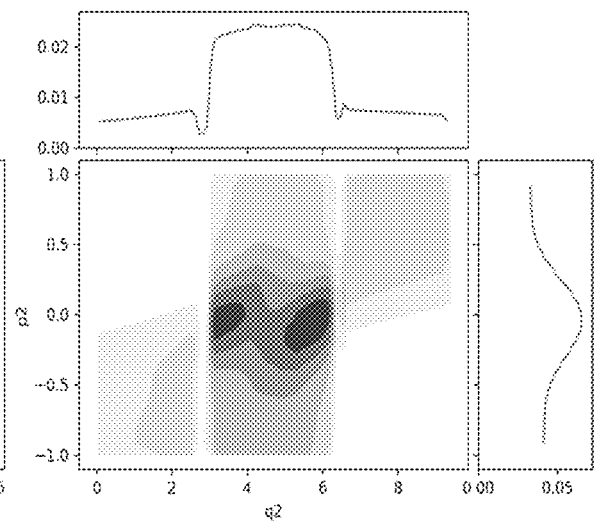
Figure 33C:
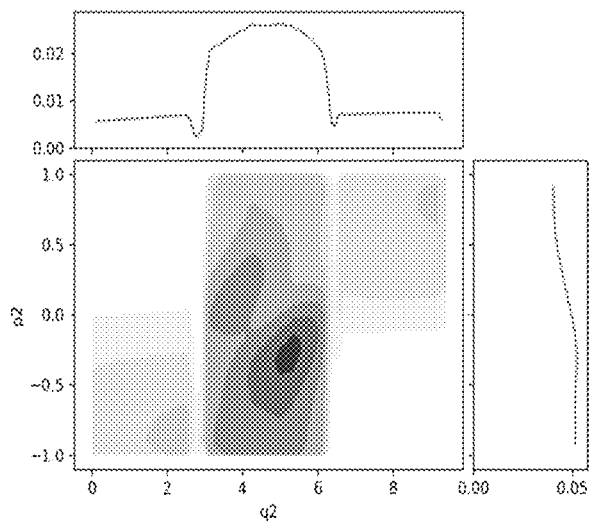
Figure 34:
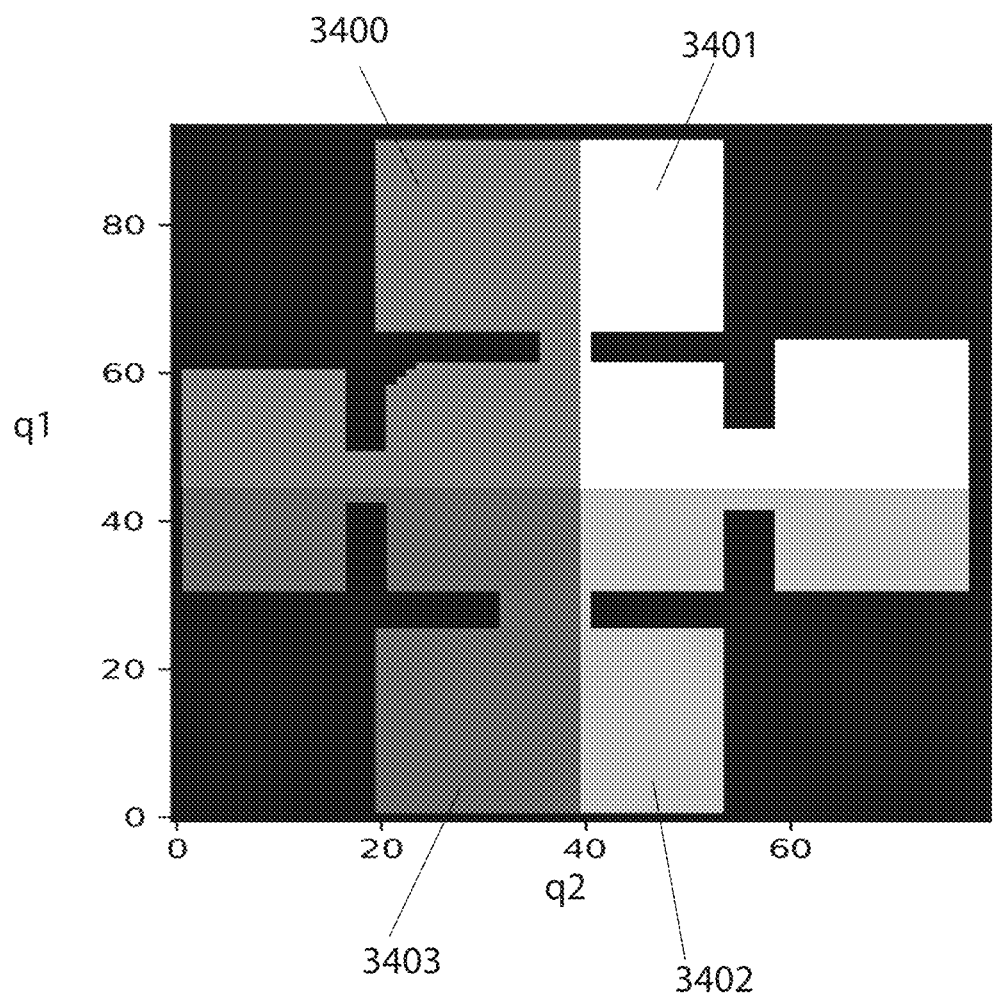
FIG. 34 illustrates an example of a map indicating floor types, according to some embodiments.

The example described may be extended to a four-dimensional phase space with position q=(x, y) and velocity $p=p_y$). The processor solves this four dimensional example using the Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

with $M=I_2$ (2D identity matrix), T=0.1, y=0.1, and $k_B$=1. In alternative embodiments, the processor uses the Fokker-Planck equation without Hamiltonian and velocity and applies velocity drift field directly through odometry which reduces the dimension by a factor of two. The map of the environment for this example is given in FIG. 30, wherein the white space is the area accessible to the robotic device. The map describes the domain for $q_1$, $q_2$∈D. In this example, the velocity is limited to $p_1$, $p_2$∈[−1, 1]. The processor models the initial probability density ρ(p, q, 0) as Gaussian, wherein ρ is a four-dimensional function. FIGS. 31A-31C illustrate the evolution of p reduced to the $q_1$, $q_2$ space at three different time points (i.e., the density integrated over $p_1$, $p_2$, $\rho_{red}=\iint\rho(p_1, p_2, q_1, q_2)dp_1 dp_2$). It can be seen that with increased time, the initial density focused in the middle of the map starts to flow into other rooms. FIGS. 32A-32C illustrate the evolution of ρ reduced to the $p_1$, $q_1$ space and FIGS. 33A-33C illustrate the evolution of ρ reduced to the $p_2$, $q_2$ space at the same three different time points to show how velocity evolves over time with position. The four-dimensional example is repeated but with the addition of floor sensor data observations. FIG. 34 illustrates a map of the environment indicating different floor types 3400, 3401, 3402, and 3403 with respect to $q_1$, $q_2$. Given that the sensor has no error, the processor may strongly predict the area within which the robotic device is located based on the measured floor type, at which point all other hypothesized locations of the robotic device become invalid. For example, the processor may use the distribution $$m(p_1, p_2, q_1, q_2) = \begin{cases} const > 0, & q_1, q_2 \text{ with the observed floor type} \\ 0, & \text{else} \end{cases}.$$

Figure 35:
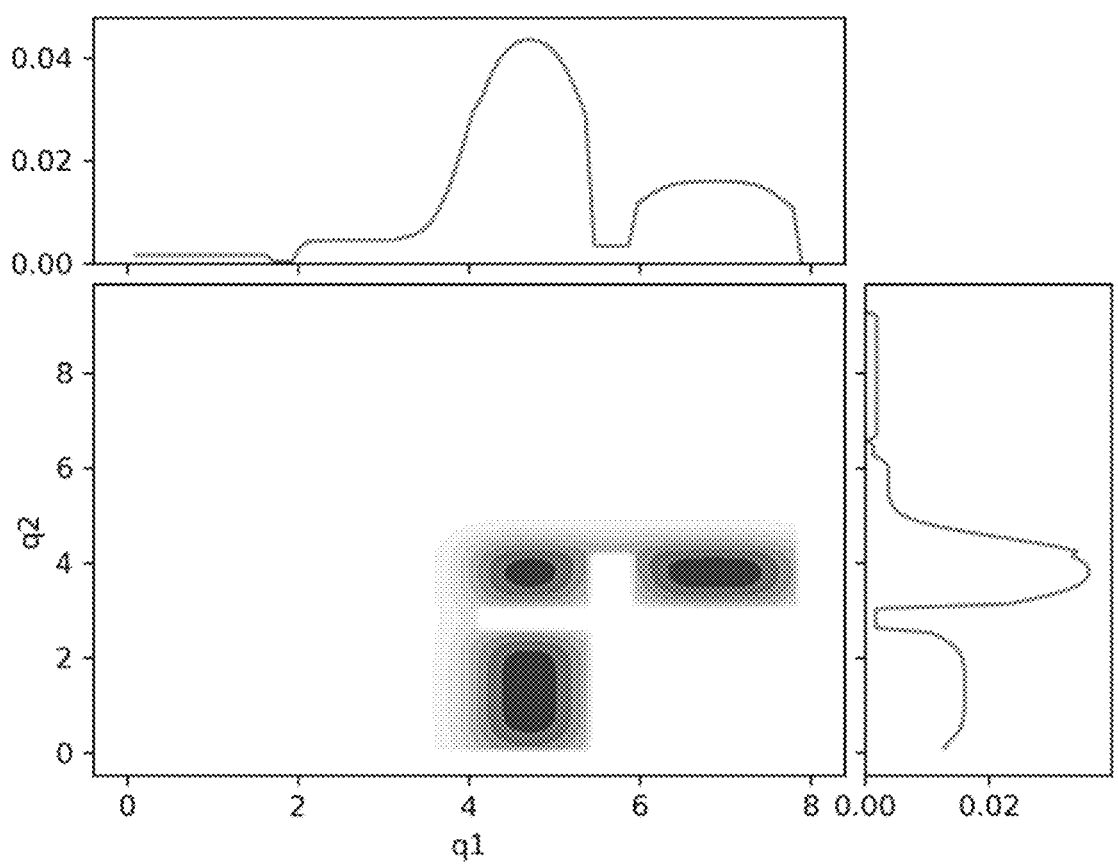
FIG. 35 illustrates an example of an updated probability density after observing floor type, according to some embodiments.
Figure 36:
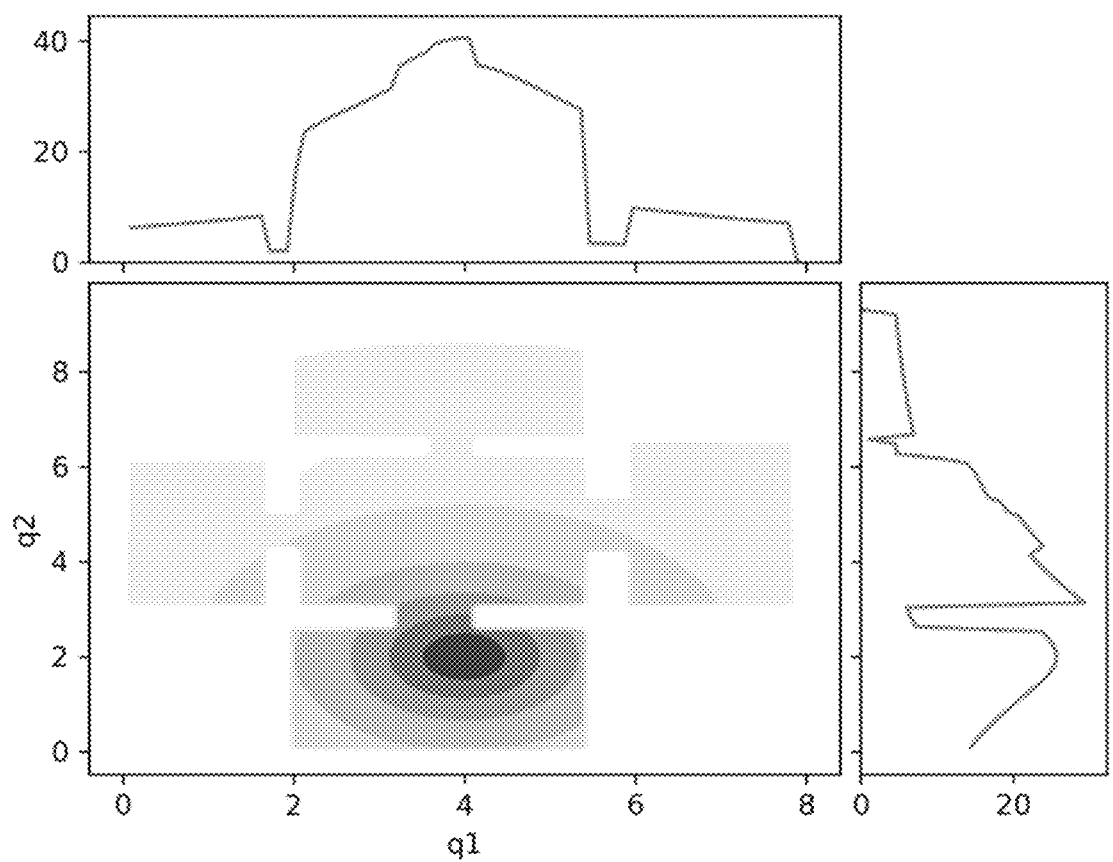
FIG. 36 illustrates an example of a Wi-Fi map, according to some embodiments.
Figure 37:
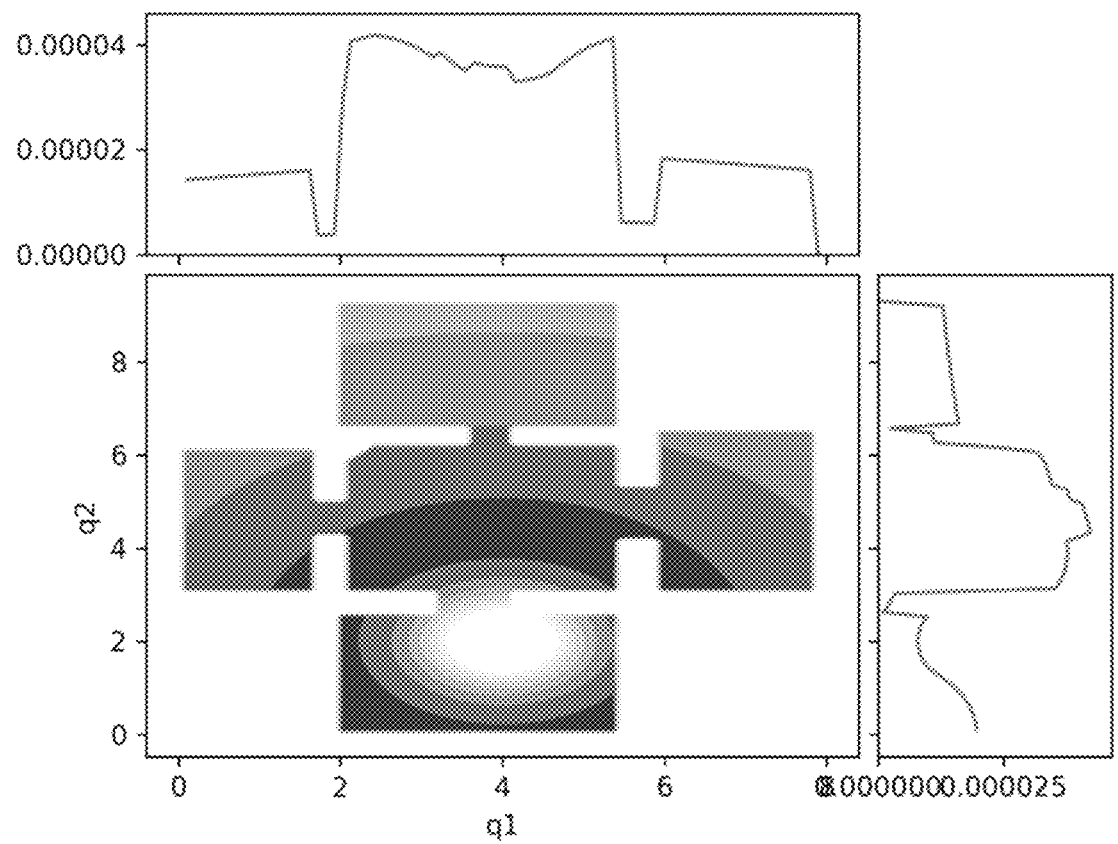
FIG. 37 illustrates an example of an updated probability density after observing Wi-Fi strength, according to some embodiments.
Figure 38:
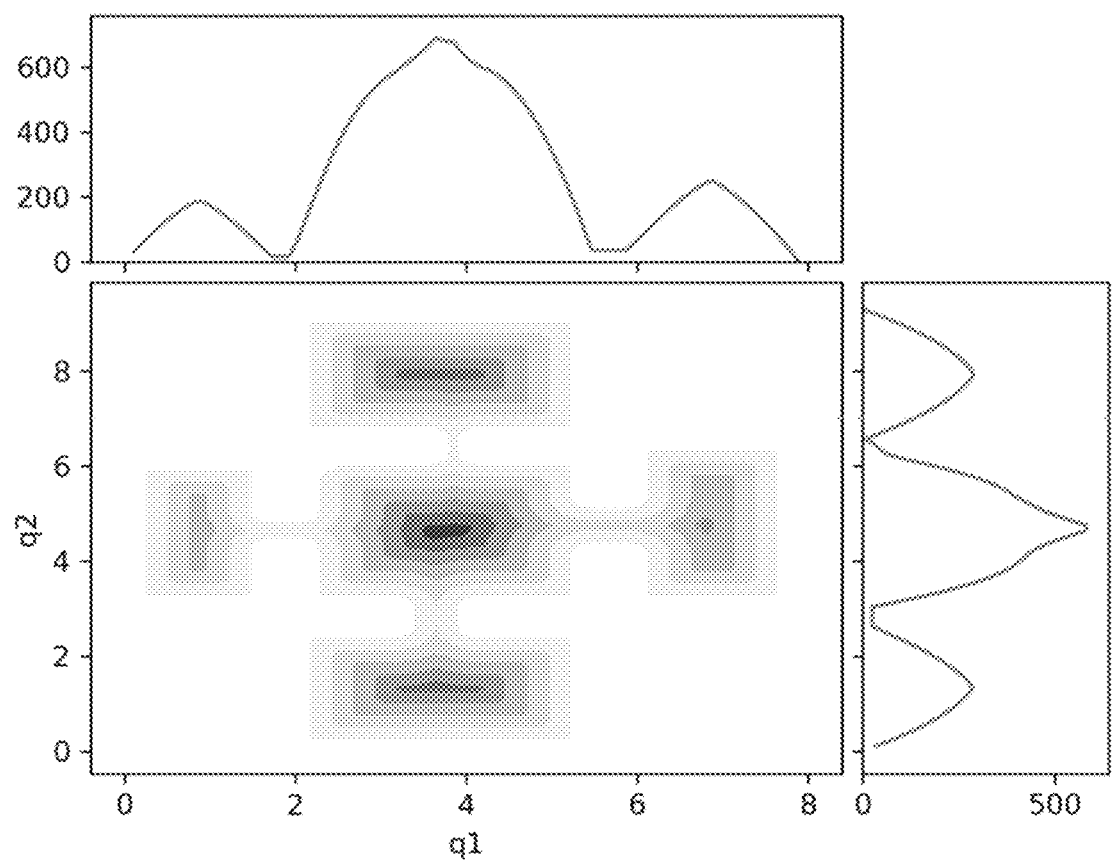
FIG. 38 illustrates an example of a wall distance map, according to some embodiments.
Figure 39:
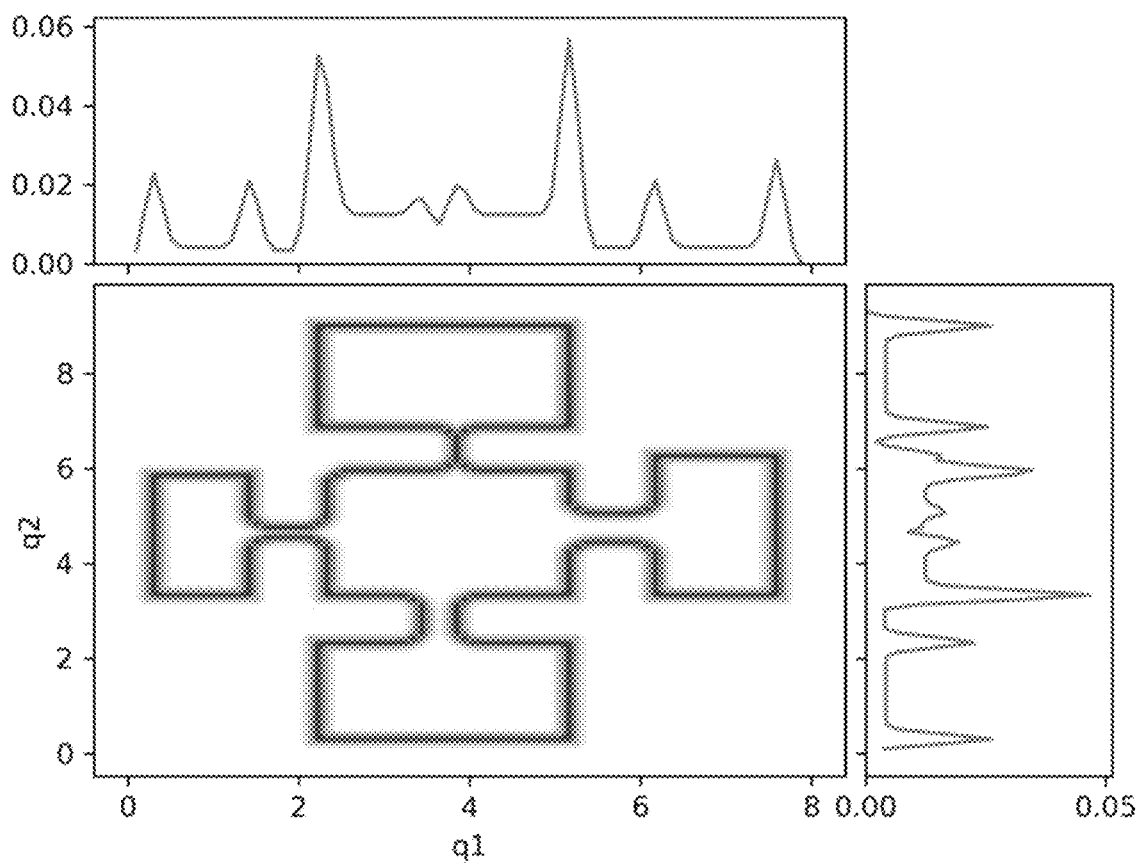
FIG. 39 illustrates an example of an updated probability density after observing distances to a wall, according to some embodiments.

If the sensor has an average error rate ∈, the processor may use the distribution $$m(p_1, p_2, q_1, q_2) = \begin{cases} c_1 > 0, & q_1, q_2 \text{ with the observed floor type} \\ c_2 > 0, & \text{else} \end{cases}$$

with $c_1$, $c_2$ chosen such that $\int_p \int_{D_{obs}} md(q_1, q_2)d(p_1,p_2)=1-∈$ and $\int_p \int_{D_{obs}^c} md(q_1, q_2)d(p_1,p_2)=∈$. $D_{obs}$ is the $q_1$, $q_2$ with the observed floor type and $D_{obs}^c$ is its complement. By construction, the distribution m has a probability 1−∈ for $q_1$, $q_2$∈$D_{obs}$ and probability ∈ for $q_1$, $q_2$∈$D_{obs}^c$. Given that the floor sensor measures floor type 3402, the processor updates the probability distribution for position as shown in FIG. 35. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 36, the processor may generate a density describing the possible location of the robotic device based on a measured Wi-Fi signal strength. The darker areas in FIG. 36 represent stronger Wi-Fi signal strength and the signal source is at $q_1$, $q_2$=4.0, 2.0. Given that the robotic device measures a Wi-Fi signal strength of 0.4, the processor generates the probability distribution for position shown in FIG. 37. The likely area of the robotic device is larger since the Wi-Fi signal does not vary very much. For wall distance measurements, a wall distance map, such as that shown in FIG. 38 may be used by the processor to approximate the area of the robotic device given a distance measured. Given that the robotic device measures a distance of 3 distance units, the processor generates the probability distribution for position shown in FIG. 39. For example, the processor evolves the Fokker-Planck equation over time and as observations are successively taken, the processor re-calculates the density function with each observation wherein parts that do not match the observation are considered less likely and parts that highly match the observations relatively increase in probability. An example of observations over time may be, t=1: observe $p_2$=0.75; t=2: observe $p_2$=0.95 and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 40:
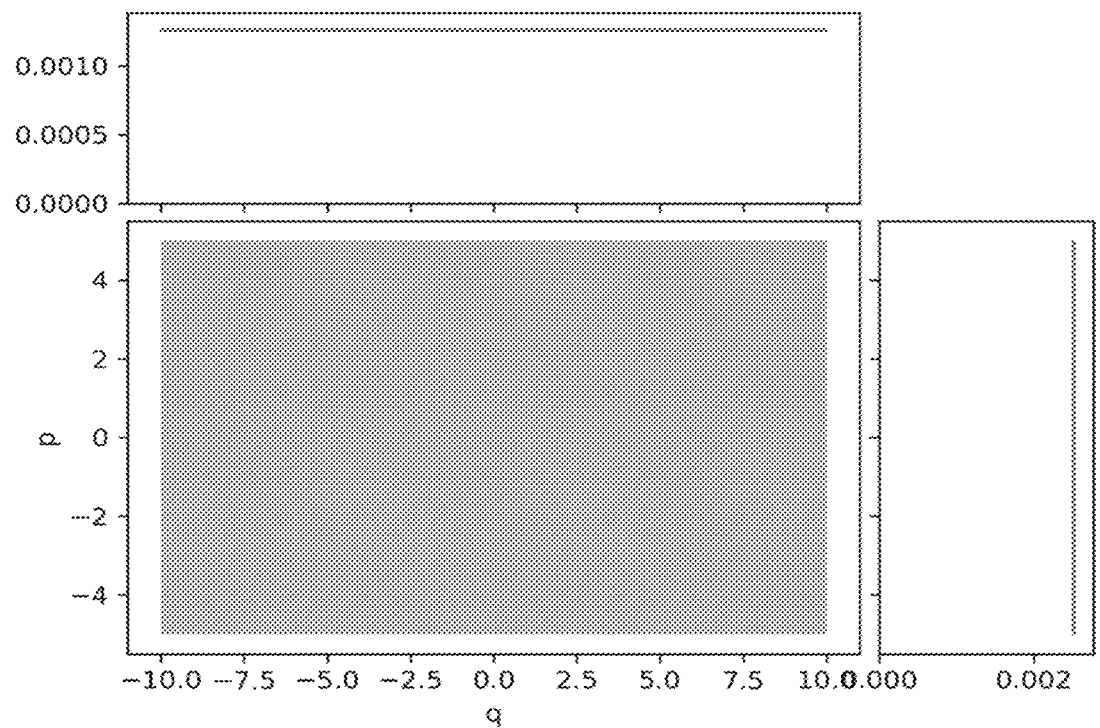
FIGS. 40-43 illustrate an example of an evolution of a probability density of a position of a robotic device as it moves and observes doors, according to some embodiments.
Figure 41:
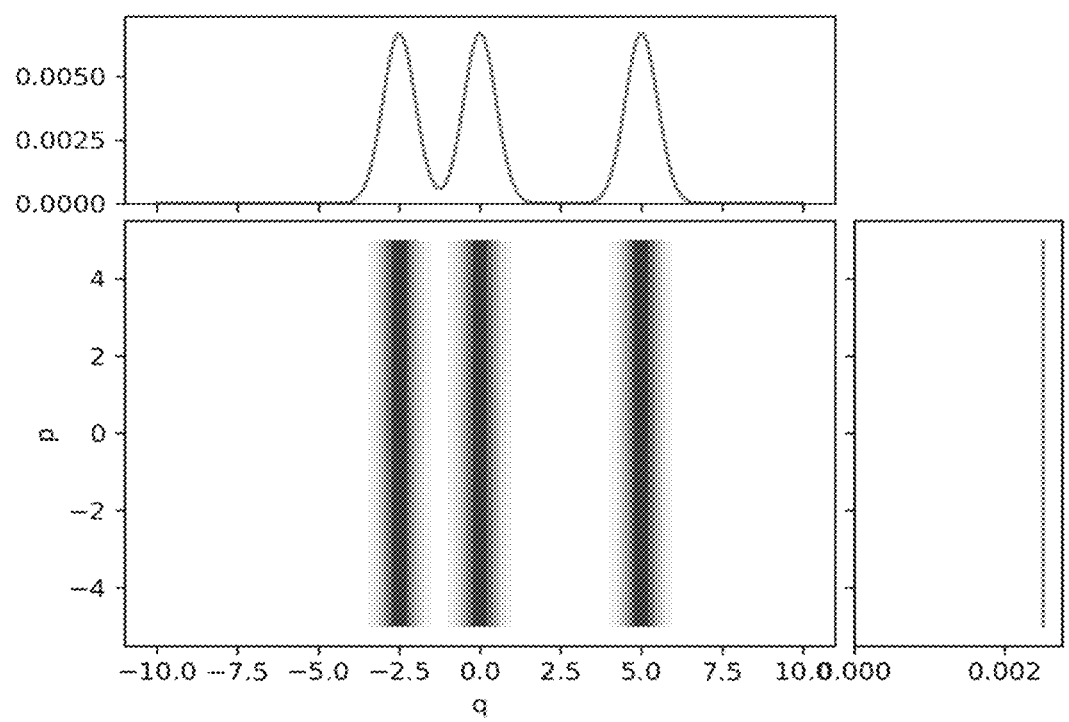
Figure 42:
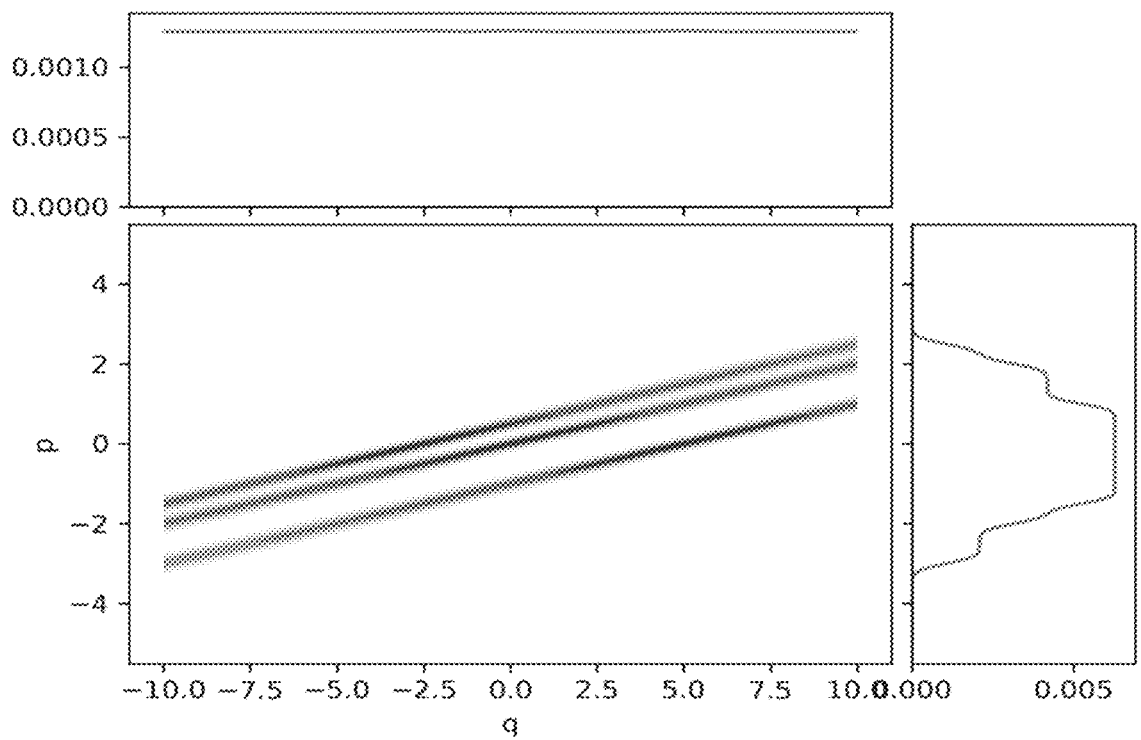
Figure 43:
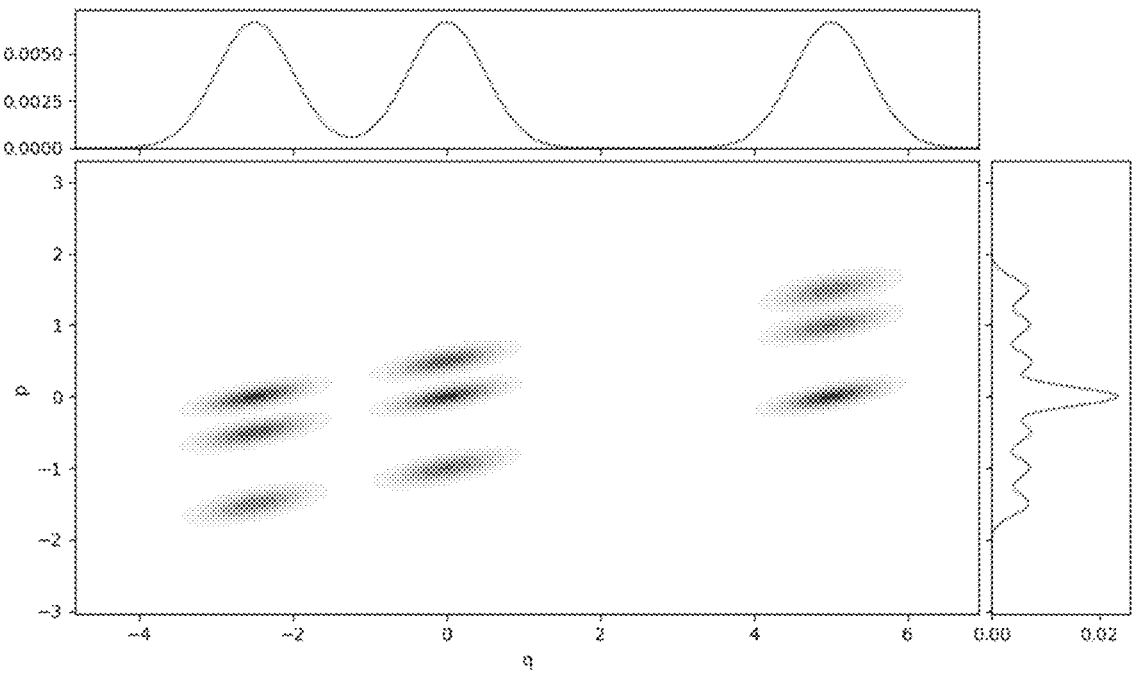

In another example, the robotic device navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein $q \in [-10, 10]$ and $p \in [-5, 5]$. The floor has three doors at $q_0$=−2.5, $q_1$=0, and $q_2$=5.0 and the processor is capable of determining when it is located at a door based on sensor data observed and the momentum of the robotic device is constant, but unknown. Initially the location of the robotic device is unknown, therefore the processor generates an initial state density such as that in FIG. 40. When the processor determines the robotic device is in front of a door, the possible location of the robotic device is narrowed down, but not the momentum. Therefore, the processor may update the probability density to that shown in FIG. 41. The processor evolves the probability density, and after five seconds the probability is as shown in FIG. 42, wherein the uncertainty in the position space has spread out again given that the momentum is unknown. However, the evolved probability density keeps track of the correlation between position and momentum. When the processor determines the robotic device is in front of a door again, the probability density is updated to FIG. 43, wherein the density has significantly narrowed down, indicating a number of peaks representing possible location and momentum combinations of the robotic device. For the left door, there is equal likelihood for p=0, p=−0.5, and p=−1.5. These momentum values correspond with the robotic device travelling from one of the three doors in five seconds. This is seen for the other two doors as well.

In some embodiments, the processor models motion of the robotic device using equations $\dot{x}=v\cos\omega$, $\dot{y}=v\sin\omega$, and $\dot{\theta}=\omega$, wherein v and w are translational and rotational velocities, respectively. In some embodiments, translational and rotational velocities of the robotic device are computed using observed wheel angular velocities $\omega_l$ and $\omega_r$ using $$\begin{pmatrix} v \\ \omega \end{pmatrix} = J \begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor evolves the probability density $\rho=(x, y, \theta, \omega_l, \omega_r)$ using $$\frac{\partial \rho}{\partial t} = -\begin{pmatrix} v\cos\theta \\ v\cos\theta \\ \omega \end{pmatrix} \cdot \nabla_q \rho + \nabla_p \cdot (D\nabla_p \rho)$$

wherein $$D = \frac{1}{2}\sigma_N \sigma_N^T$$

is a 2-by-2 diffusion tensor, $q=(x, y, \theta)$ and $p=(\omega_l, \omega_r)$. In some embodiments, the domain is obtained by choosing x, y in the map of the environment, $\theta \in [0, 2\pi)$, and $\omega_l$, $\omega_r$ as per the robotic device specifications. In some embodiments, solving the equation may be a challenge given it is five-dimensional. In some embodiments, the model may be reduced by replacing odometry by Gaussian density with mean and variance. This reduces the model to a three-dimensional density $\rho=(x, y, \theta)$. In some embodiments, independent equations may be formed for $\omega_l$, $\omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \overline{v}\cos\theta \\ \overline{v}\cos\theta \\ \overline{\omega} \end{pmatrix} \cdot \nabla \rho + \nabla \cdot (D\nabla \rho), t > 0$$

wherein $$D = \begin{pmatrix} dv^2\cos^2\theta & dv^2\sin\theta\cos\theta & 0 \\ dv^2\sin\theta\cos\theta & dv^2\sin^2\theta & 0 \\ 0 & 0 & d\omega^2 \end{pmatrix},$$

$\overline{v}, \overline{\omega}$ represent the current mean velocities, and dv, dω the current deviation. In some embodiments, the processor determines $\overline{v}, \overline{\omega}$ from the mean and deviation of the left and right wheel velocities $\omega_L$ and $\omega_R$ using $$\begin{pmatrix} v \\ \omega \end{pmatrix} = J \begin{pmatrix} \overline{\omega}_L \\ \overline{\omega}_R \end{pmatrix}.$$

In some embodiments, the processor uses Neumann boundary conditions for x, y and periodic boundary conditions for θ.

Figure 44:
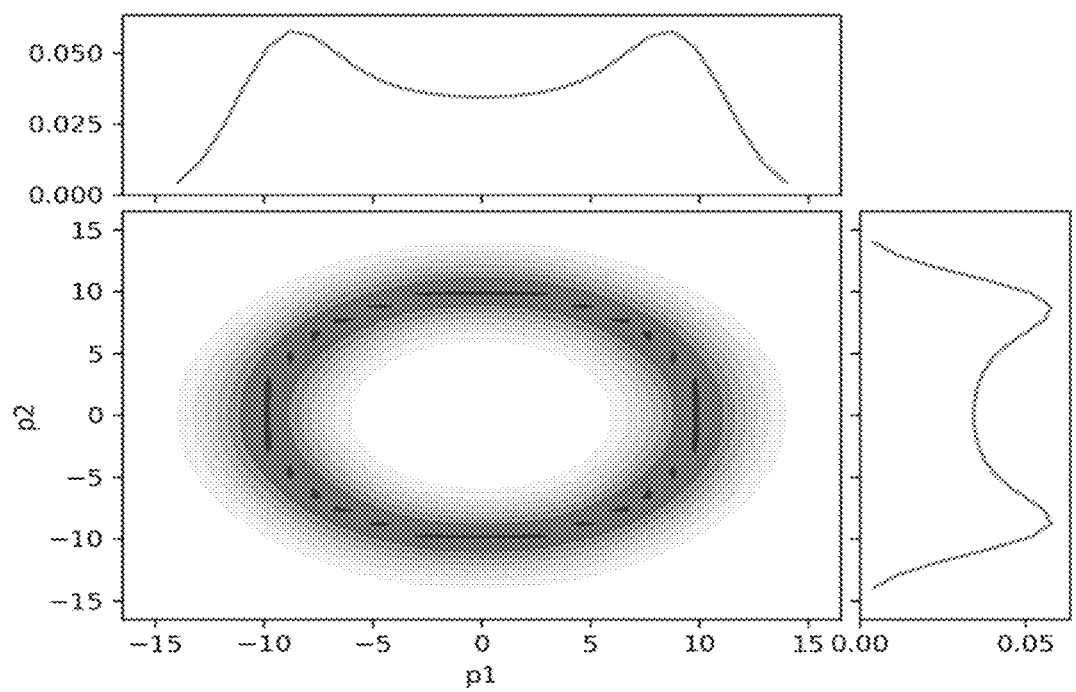
FIG. 44 illustrates an example of a velocity observation probability density, according to some embodiments.
Figure 45:
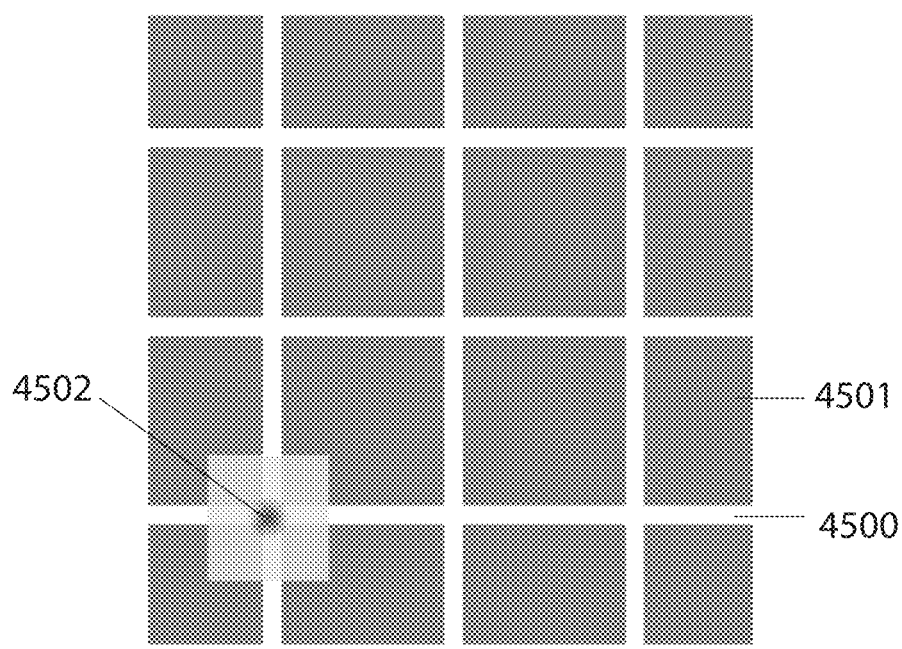
FIG. 45 illustrates an example of a road map, according to some embodiments.

In another example, the processor localizes a robotic device with position coordinate q=(x, y) and momentum coordinate p=($p_x$, $p_y$). For simplification, the mass of the robotic device is 1.0, the earth is assumed to be planar, and q is a position with reference to some arbitrary point and distance. Thus, the processor evolves the probability density ρ over time according to $$\frac{\partial \rho}{\partial t} = -p \cdot \nabla_q \rho + \nabla_p \cdot (D \nabla_p \rho),$$

wherein D is as defined above. The processor uses a moving grid, wherein the general location of the robotic device is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the robotic device. Velocity measurements provide no information on position, but provide information on $p_x^2+p_y^2$, the circular probability distribution in the p space, as illustrated in FIG. 44 with |p|=10 and large uncertainty. GPS position measurements provide no direct momentum information but provides a position density. The processor further uses a road map to exclude impossible states of the robotic device. For instance, it is impossible to drive through buildings and if the velocity is high there is a higher likelihood that the robotic device is on specific roads. FIG. 45 illustrates a road map used by the processor in this example, wherein white areas 4500 indicate roads and gray areas 4501 indicate no roads and the maximum off road speed is ±5 m/s. Position 4502 is the current probability density collapsed to the $q_1$, $q_2$ space. In combining the road map information with the velocity observations, the processor determines that is highly unlikely that with an odometry measurement of |p|=10 that the robotic device is in a position off the road. In some embodiments, other types of information may be used to improve accuracy of localization. For example, a road map to correlate position and velocity, distance to and probability density of other robotic devices using similar technology, Wi-Fi map to extract position, and video footage to extract position.

In some embodiments, the processor uses finite differences methods (FDM) to numerically approximate partial differential equations of the form $$\frac{\partial \rho}{\partial t} = -\{\rho, H\} + \nabla_p \cdot (D \nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x, t) with velocity v, diffusion coefficient α, $$\frac{\partial u}{\partial t} = a \frac{\partial^2 u}{\partial x^2} - v \frac{\partial u}{\partial x}$$

on a mesh $x_0, \ldots, x_J$, and times $t_0, \ldots, t_N$ may be approximated by a recurrence equation of the form $$\frac{u_j^{n+1} - u_j^n}{k} = a \frac{u_{j+1}^n - 2u_j^n + u_{j-1}^n}{h^2} - v \frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2}, \text{ and}$$

$$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $$t_{n+\frac{1}{2}},$$

the recurrence equation is $$\frac{u_j^{n+1} - u_j^n}{k} = \frac{1}{2}\left( a \frac{u_{j+1}^{n+1} - 2u_j^{n+1} + u_{j-1}^{n+1}}{h^2} - v \frac{u_{j+1}^{n+1} - u_{j-1}^{n+1}}{2h} + a \frac{u_{j+1}^n - 2u_j^n + u_{j-1}^n}{h^2} - v \frac{u_{j+1}^n - u_{j-1}^n}{2h} \right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1} - u_j^n}{k} = a\frac{u_{j+1}^{n+1} - 2u_j^{n+1} + u_{j-1}^{n+1}}{h^2} - v\frac{u_{j+1}^{n+1} - u_{j-1}^{n+1}}{2h},$$

which is unconditionally stable for an time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D\nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., $L=-\{\cdot, H\}+\nabla_p \cdot (D\nabla_p)$. The processor discretizes the abstract equation in space (e.g., by FEM or FDM)

$$\frac{\partial \bar{\rho}}{\partial t} = \bar{L}\bar{\rho},$$

wherein $\bar{\rho}$, $\bar{L}$ are the projections of $\rho$, L on the discretized space. The processor discretizes the equation in time using a numerical time integrator (e.g., Crank-Nicolson)

$$\frac{\bar{\rho}^{n+1} - \bar{\rho}^n}{h} = \frac{1}{2}(\bar{L}\bar{\rho}^{n+1} + \bar{L}\bar{\rho}^n),$$

leading to the equation $$\left(I - \frac{h}{2}\bar{L}\right)\bar{\rho}^{n+1} = \left(I + \frac{h}{2}\bar{L}\right)\bar{\rho}^n,$$

which the processor solves. In a fully discretized system, this is a linear equation. Depending on the space and discretization, this will be a banded, sparse matrix. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Boundary conditions are essential in solving the partial differential equations. Boundary conditions are a set of constraints that determine what happens at the boundary of the domain while the partial differential equation describe the behaviour within the domain. In some embodiments, the processor uses one or more the following boundary conditions: reflecting, zero-flux (i.e., homogenous Neumann boundary conditions)

$$\frac{\partial \rho}{\partial \vec{n}} = 0$$

for p, q∈∂D, $\vec{n}$ unit normal vector on boundary; absorbing boundary conditions (i.e., homogenous Dirichlet boundary conditions) ρ=0 for p, q∈∂D; and constant concentration boundary conditions (i.e., Dirichlet) ρ=ρ₀ for p, q∈∂D. To integrate the boundary conditions into FDM, the processor modifies the difference equations on the boundary, and when using FEM, they become part of the weak form (i.e., integration by parts) or are integrated in the solution space. In some embodiments, the processor uses Fenics for an efficient solution to partial differential equations.

In some embodiments, the processor uses quantum SLAM. In some embodiments, the processor may determine a probability density over all possible states of the robotic device using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t)=|\Psi(\vec{r}, t)|^2$. In some embodiments, the processor normalizes the wave function which is equal to the total probability of finding the particle, or in this case the robotic device, somewhere. The total probability of finding the robotic device somewhere adds up to unity $\int |\Psi(\vec{r}, t)|^2 \, d\vec{r}=1$. In some embodiments, the processor may apply Fourier transform to the wave function $\Psi(\vec{r}, t)$ to yield the wave function $\Phi(\vec{p}, t)$ in the momentum space, with associated momentum probability distribution $\sigma(\vec{p}, t)=|\Phi(\vec{p}, t)|^2$. In some embodiments, the processor may evolve the wave function $\Psi(\vec{r}, t)$ using Schrödinger equation $$i\hbar \frac{\partial}{\partial t}\Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is the imaginary unit, $\hbar$ is the reduced Planck constant, $\nabla^2$ is the Laplacian, and $V(\vec{r})$ is the potential. An operator is a generalization of the concept of a function and transforms one function into another function. For example, the momentum operator $\hat{p} = -i\hbar\nabla$ and that is why $$-\frac{\hbar^2}{2m}\nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function (e.g., $$\Psi(\vec{r},t) = \Phi(\vec{r})e^{-\frac{iEt}{\hbar}},$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi = E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r}, t) = \Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $$\varphi_k, |c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r}) = |\Psi(\vec{r},t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\phi|$ (i.e., bra). The integral over the product of two functions is analogous to an inner product of abstract vectors, $\int\phi^*\psi d\tau = \langle\phi|\cdot|\psi\rangle = |\psi\rangle$. In some embodiments, $\langle\phi|$ and $\langle\phi|$ are state vectors of a system and the processor determines the probability of finding $\langle\phi|$ in state $|\psi\rangle$ using $p(\langle\phi|,|\psi\rangle) = |\langle\phi|\psi\rangle|^2$. For a Hermitian operator $\hat{A}$ eigenkets and eigenvalues are denoted $A|n\rangle = \alpha_n|n\rangle$, wherein $|n\rangle$ is the eigenket associated with the eigenvalue $\alpha_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A = \langle n|\alpha_n$. For every physical property (energy, position, momentum, angular momentum, etc.) there exists an associated linear, Hermitian operator $\hat{A}$ (called am observable) which acts on the Hilbert space H. Given A has eigenvalues $\alpha_n$ and eigenvectors $|n\rangle$, and a system in state $|\phi\rangle$, the processor determines the probability of obtaining $\alpha_n$ as an outcome of a measurement of A using $p(\alpha_n) = |\langle n|\phi\rangle|^2$. In some embodiments, the processor evolves the time-dependent Schrodinger equation using $$i\hbar\frac{\partial|\psi\rangle}{\partial t} = \hat{H}|\psi\rangle.$$

Given a state $|\phi\rangle$ and a measurement of the observable A, the processor determines the expectation value of A using $\langle A\rangle = \langle\phi|A|\phi\rangle$, corresponding to $$\langle A\rangle = \frac{\int\phi^*\hat{A}\phi d\tau}{\int\phi^*\phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robotic device, the processor evolves the wave function $\Psi(\vec{r},t)$ using the Schrödinger equation $$i\hbar \frac{\partial}{\partial t}\Psi(\vec{r},t) = \left[-\frac{\hbar^2}{2m}\nabla^2 + V(\vec{r})\right]\Psi(\vec{r},t).$$

In some embodiments, a solution is written in terms of eigenfunctions $\psi_n$ with eigenvalues $E_n$ of the time-independent Schrodinger equation $H\psi_n = E_n\psi_n$, wherein $\Psi(\vec{r}, t) = \Sigma_{c_n} c_n e^{-iE_n t/\hbar}\psi n$ and $c_n = \int \Psi(\vec{r}, 0)\psi_n^* dr$. In some embodiments, the time evolution is expressed as a time evolution via a unitary operator $U(t)$, $\Psi(\vec{r}, t) = U(t)\Psi(\vec{r}, 0)$ wherein $U(t) = e^{-iHt/\hbar}$. In some embodiments, the probability density of the Hilbert space may be updated by the processor each time an observation or measurement is received by the processor. For each observation with observation operator A the processor may perform an eigen-decomposition $A\omega_n = \alpha_n \omega_n$, wherein the eigenvalue corresponds to the observed quantity. In some embodiments, the processor observes a value a with probability $0 \le p \le 1$. In some embodiments, wherein the operator has a finite spectrum or a single eigenvalue is observed, the processor may collapse to the eigenfunction(s) with corresponding probability $$\Psi(\vec{r},t) \to \gamma \sum_{n=1}^{N} p(a_n) d_n \omega_n,$$

wherein $d_n = \int \omega_n^* \Psi dr, p(\alpha)$ is the probability of observing value $\alpha$, and $\gamma$ is a normalization constant. In some embodiments, wherein the operator has continuous spectrum, the summation may be replaced by an integration $\Psi(\vec{r}, t) \to \gamma \int p(\alpha) d_n \omega_n d\alpha$, wherein $d_n = \int \omega_n^* \Psi dr$.

For example, consider a robotic device confined to move within an interval $$\left[-\frac{1}{2}, \frac{1}{2}\right].$$

For simplicity, the processor sets $h=m=1$, and an infinite well potential and the regular kinetic energy term are assumed. The processor solves the time-independent Schrodinger equations, resulting in wave functions $$\psi_n = \begin{cases} \sqrt{2}\sin\left(k_n\left(x-\frac{1}{2}\right)\right)e^{-i\omega_n t}, & -\frac{1}{2} < x < \frac{1}{2} \\ 0, & \text{otherwise} \end{cases},$$

wherein $k_n = n\pi$ and $E_n = \omega_n = n^2\pi^2$. In the momentum space this corresponds to the wave functions $$\phi_n(p,t) = \frac{1}{\sqrt{2\pi}}\int_{-\infty}^{\infty} \psi_n(x,t)e^{-ipx}dx = \frac{1}{\sqrt{\pi}}\frac{n\pi}{n\pi+p}\text{sinc}\left(\frac{1}{2}(n\pi-p)\right).$$

The processor takes suitable functions and computes an expansion in eigenfunctions. Given a vector of coefficients, the processor computes the time evolution of that wave function in eigenbasis. In another example, consider a robotic device free to move on an x-axis. For simplicity, the processor sets $\hbar = m = 1$. The processor solves the time-independent Schrodinger equations, resulting in wave functions $$\psi_E(x,t) = Ae^{\frac{i(px-Et)}{\hbar}},$$

wherein energy $$E = \frac{\hbar^2 k^2}{2m}$$

and momentum $p = \hbar k$. For energy E there are two independent, valid functions with $\pm p$. Given the wave function in the position space, in the momentum space, the corresponding wave functions are $$\phi_E(p,t) = e^{\frac{i(px-Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}}\int \psi(x,0)e^{\frac{ipx}{\hbar}}dx,$$

then the processor gets time dependence by taking the inverse Fourier resulting in $$\psi(x,t) = \frac{1}{\sqrt{2\pi\hbar}}\int \phi(p) e^{\frac{ipx}{\hbar}} e^{\frac{iEt}{\hbar}} dp.$$

An example of a common type of initial wave function is a Gaussian wave packet, consisting of a momentum eigenfunctions multiplied by a Gaussian in position space $$\psi(x) = Ae^{-\left(\frac{x}{a}\right)^2} e^{\frac{ip_0 x}{\hbar}},$$

wherein $p_0$ is the wave function's average momentum value and $\alpha$ is a rough measure of the width of the packet. In the momentum space, this wave function has the corm $$\phi(p) = Be^{-\left(\frac{a(p-p_0)}{2\hbar}\right)^2},$$

which is a Gaussian function of momentum, centered on $p_0$ with approximate width $$\frac{2\hbar}{a}.$$

Figure 46A:
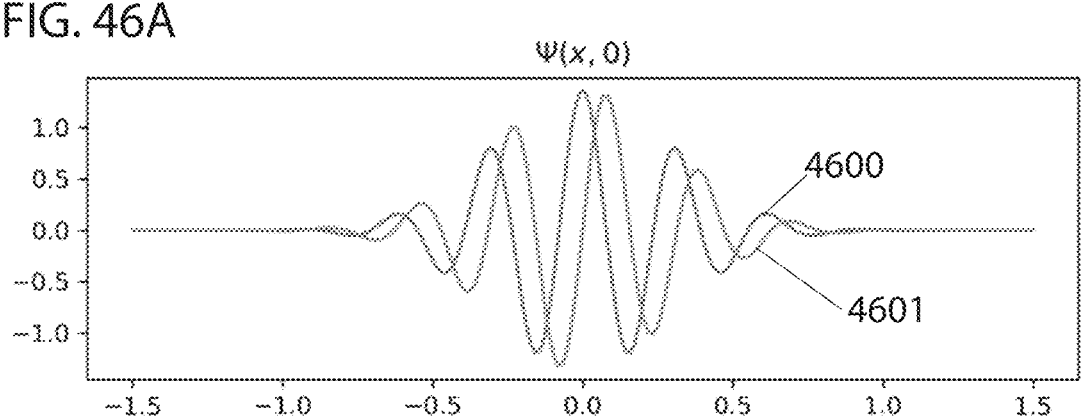
FIGS. 46A-46D illustrate an example of a wave packet, according to some embodiments.
Figure 46B:
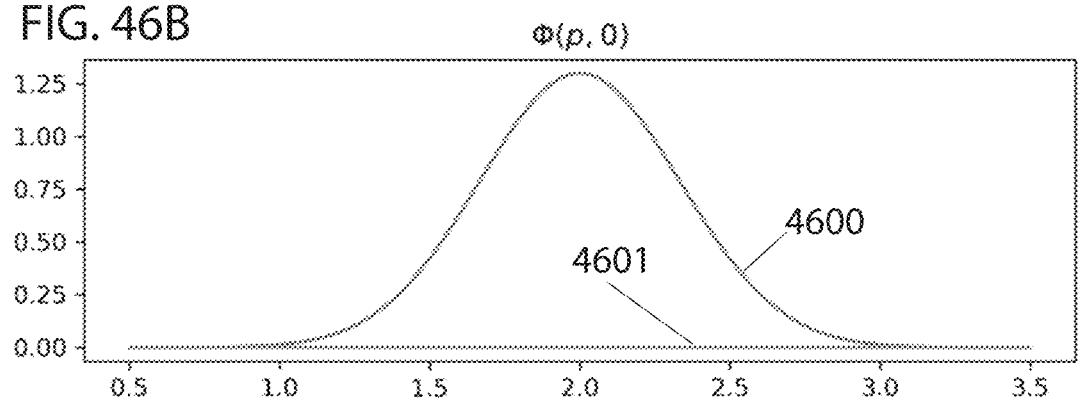
Figure 46C:
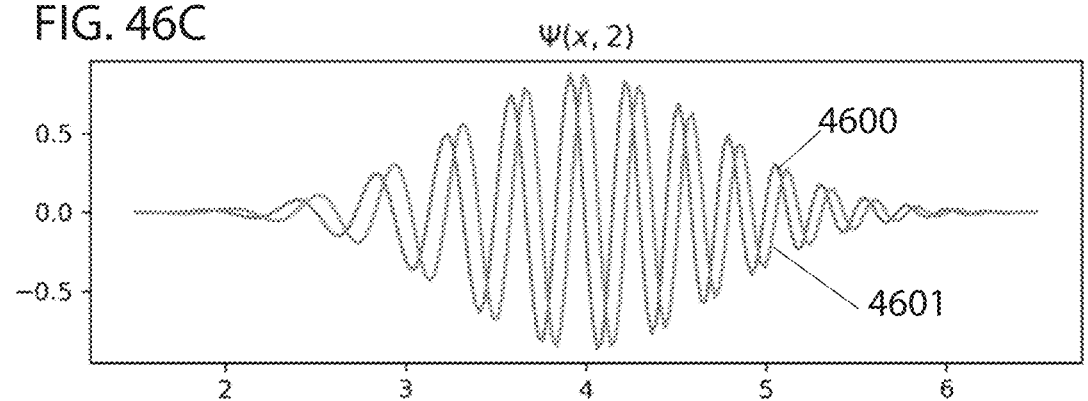
Figure 46D:
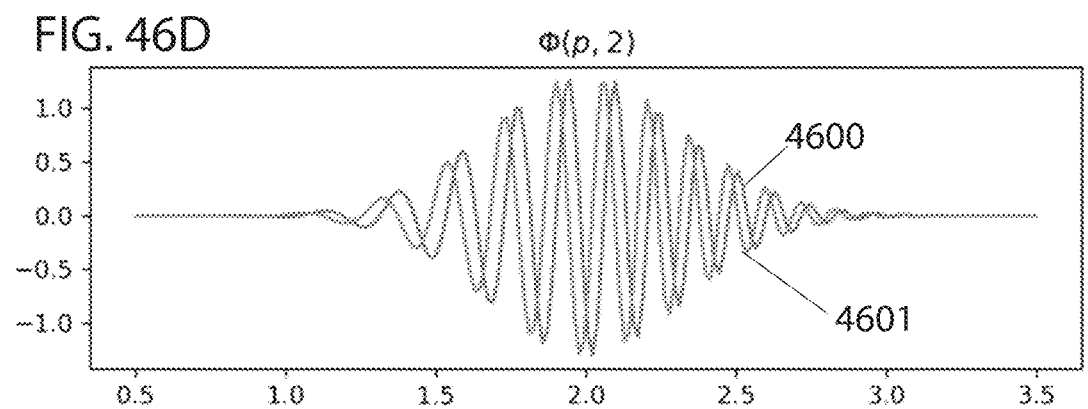

Note Heisenberg's uncertainty principle wherein in the position space width is $\sim \alpha$, and in the momentum space is $\sim 1/\alpha$. FIGS. 46A and 46B illustrate an example of a wave packet at a first time point for $\psi(x)$ and $\phi(p)$, respectively, with $x_0$, $p_0 = 0, 2, \hbar = 0.1, m = 1$, and $\alpha = 3$. 4600 are real parts and 4601 are imaginary parts. As time passes, the peak moves with constant velocity $$\frac{p_0}{m}$$

and the width of the wave packet in the position space increases. This happens because the different momentum components of the packet move with different velocities. In the momentum space, the probability density $|\phi(p, t)|^2$ stays constant over time. See FIGS. 46C and 46D for the same wave packet at time t=2.

Figure 47A:
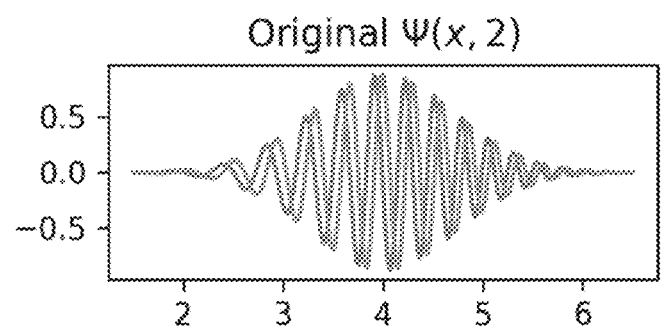
FIGS. 47A-47E illustrate an example of evolution of a wave function in a position and momentum space with observed momentum, according to some embodiments.
Figure 47B:
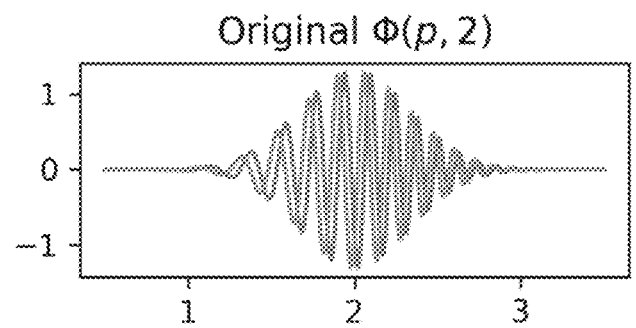
Figure 47C:
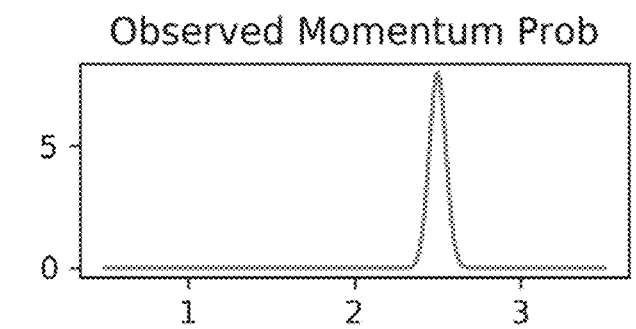
Figure 47D:
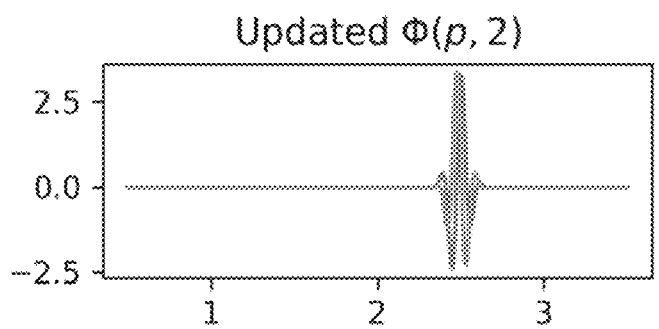
Figure 47E:
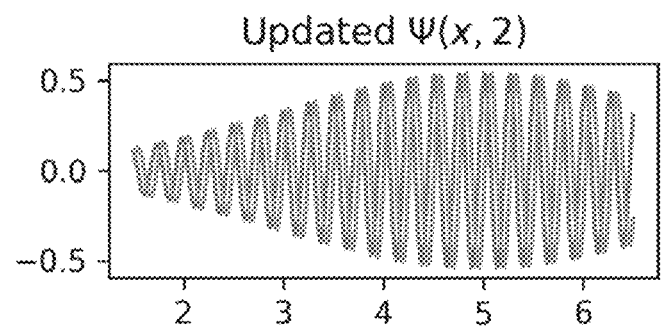
Figure 48A:
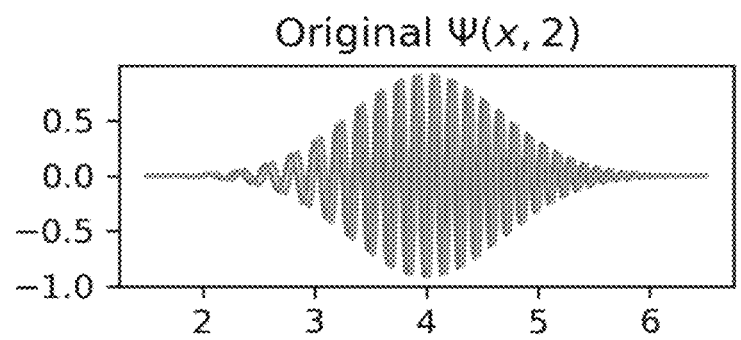
FIGS. 48A-48E illustrate an example of evolution of a wave function in a position and momentum space with observed momentum, according to some embodiments.
Figure 48B:
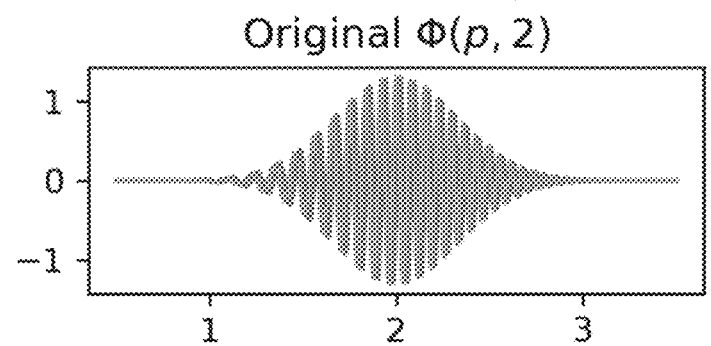
Figure 48C:
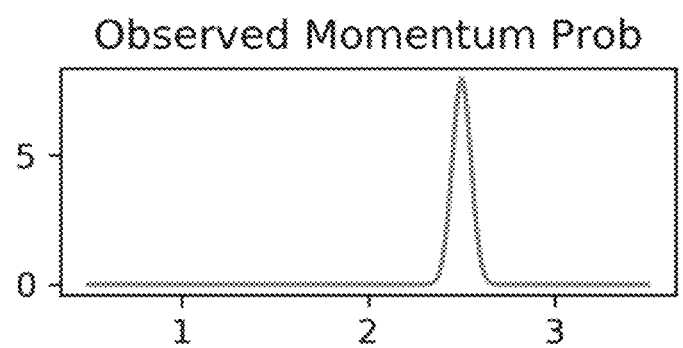
Figure 48D:
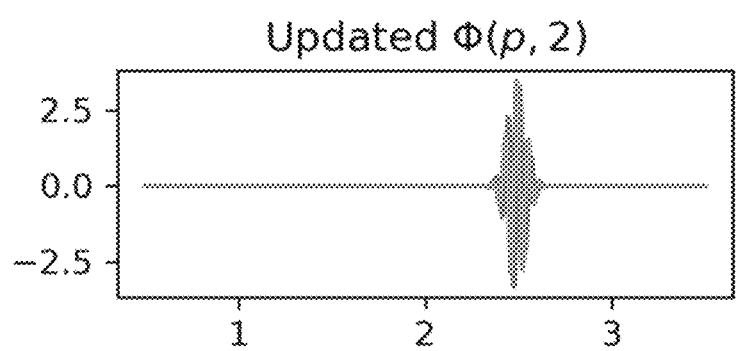
Figure 48E:
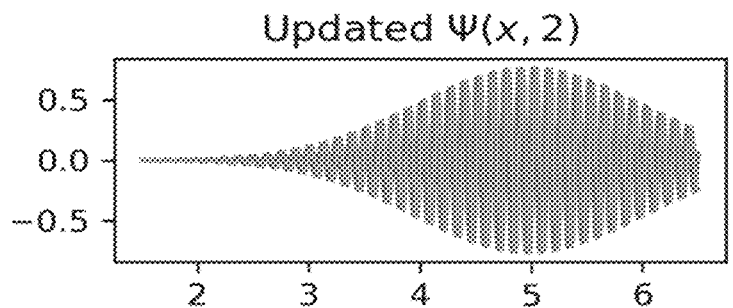
Figure 49A:
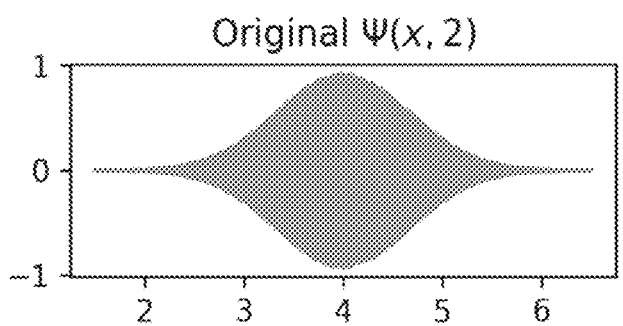
FIGS. 49A-49E illustrate an example of evolution of a wave function in a position and momentum space with observed momentum, according to some embodiments.
Figure 49B:
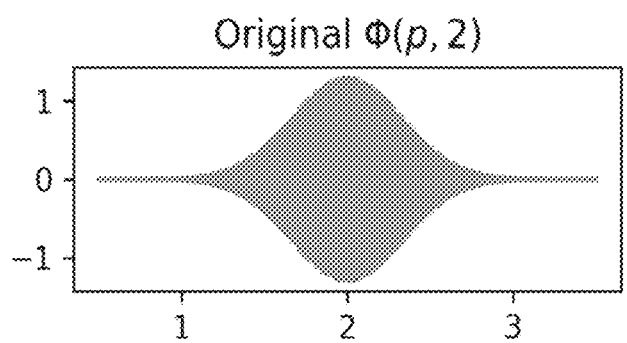
Figure 49C:
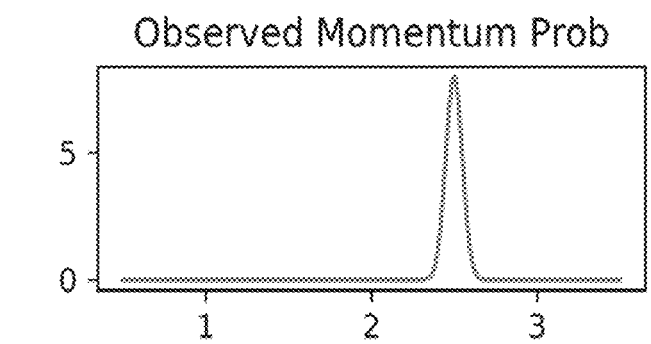
Figure 49D:
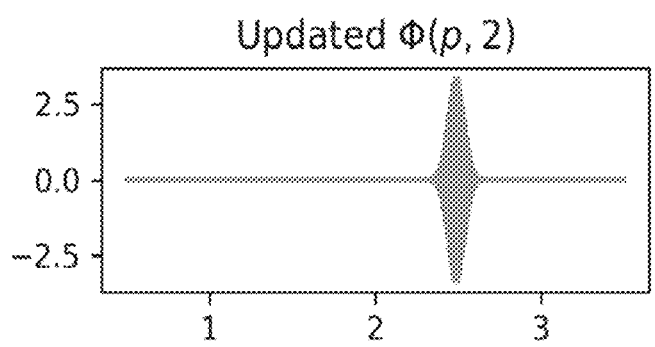
Figure 49E:
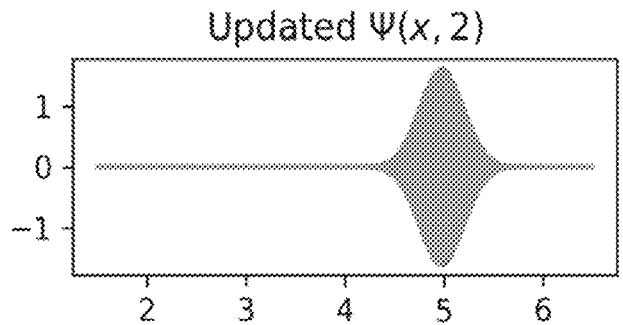
Figure 50A:
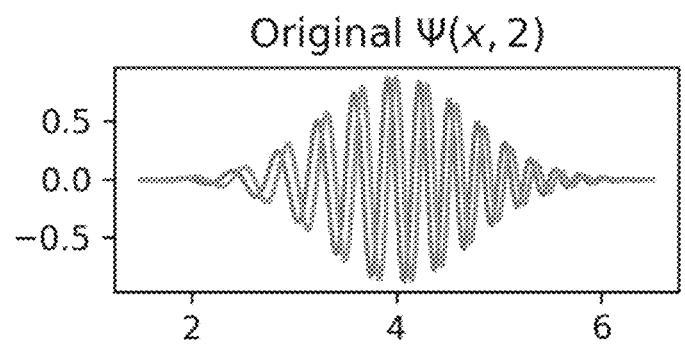
FIGS. 50A-50E illustrate an example of evolution of a wave function in a position and momentum space with observed momentum, according to some embodiments.
Figure 50B:
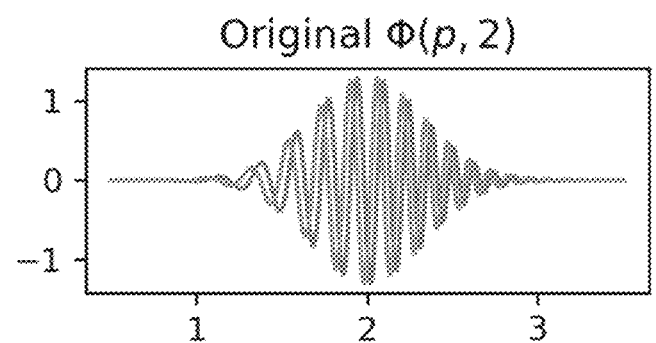
Figure 50C:
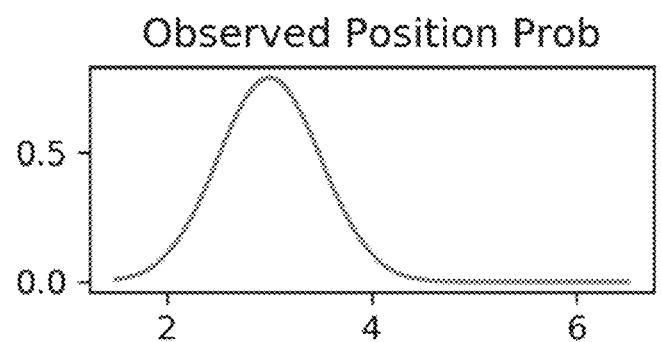
Figure 50D:
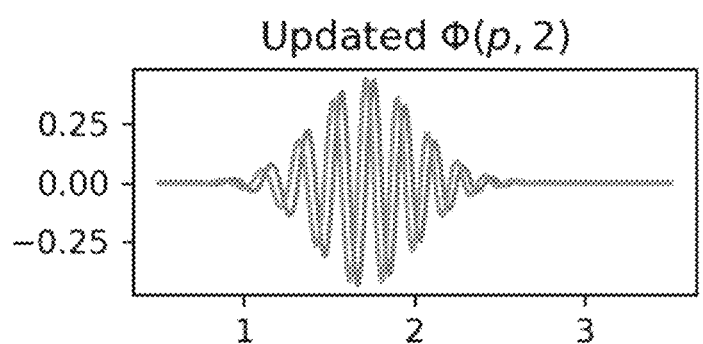
Figure 50E:
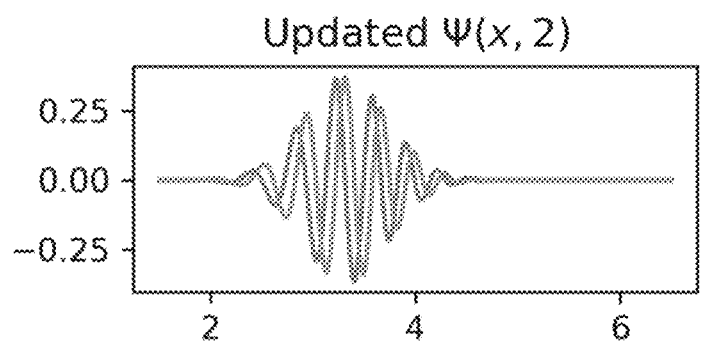

When modeling the robotic device using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with σ=0.05, a strong assumption that the momentum is 2.5. Since the observation operator is the momentum operators, the wave function expressed in terms of the eigenfunctions of the observation operator is $\phi(p, t)$. The processor projects $\phi(p, t)$ into the observation space with probability $f$ by determining $\tilde{\phi}(p, t)=f(p)\phi(p, t)$. The processor normalizes the updated $\tilde{\phi}$ and takes the inverse Fourier transform to obtain the wave function in the position space. FIGS. 47A, 47B, 47C, 47D, and 47E illustrate the initial wave function in the position space $\psi(x)$, the initial wave function in the momentum space $\phi(p)$, the observation density in the momentum space, the updated wave function in the momentum space $\tilde{\phi}(p, t)$ after the observation, and the wave function in the position space $\psi(x)$ after observing the momentum, respectively, at time t=2, with $x_0$, $p_0$=0, 2, $\hbar$=0.1, m=1, and α=3. Note that in each figure the darker plots are the real parts while the lighter plots are the imaginary parts. The resulting wave function in the position space (FIG. 47D) may be unexpected after observing a very narrow momentum density (FIG. 47C) as it concludes that the position must have spread further out from the original wave function in the position space (FIG. 47A). This effect is due to Heisenberg's uncertainty principle. With decreasing h this effect diminishes, as can be seen in FIGS. 48A-48E and FIGS. 49A-49E, illustrating the same as FIGS. 47A-47E but with $\hbar$=0.05 and $\hbar$=0.001, respectively. Similar to observing momentum, position may also be observed and incorporated as illustrated in FIGS. 50A-50E which illustrate the initial wave function in the position space $\psi(x)$, the initial wave function in the momentum space $\phi(p)$, the observation density in the position space, the updated wave function in the momentum space $\tilde{\phi}(x, t)$ after the observation, and the wave function in the position space $\psi(p)$ after observing the position, respectively, at time t=2, with $x_0$, $p_0$=0, 2, $\hbar$=0.1, m=1, and α=3.

Figure 51A:
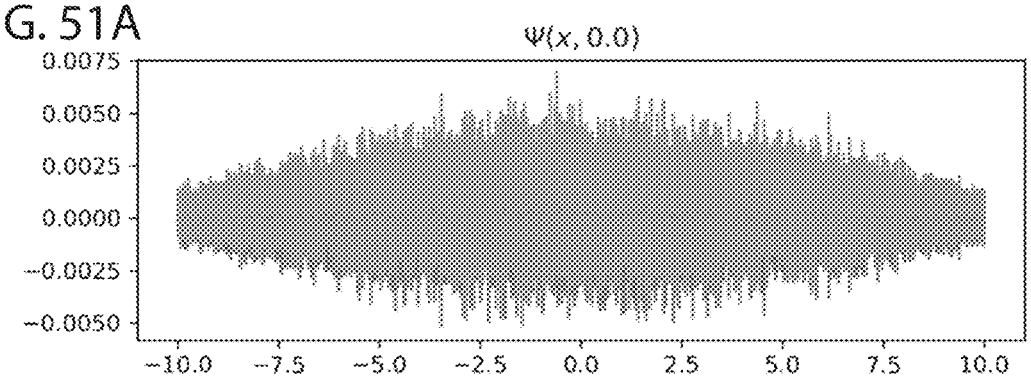
FIGS. 51A and 51B illustrate an example of an initial wave function of a state of a robotic device, according to some embodiments.
Figure 51B:
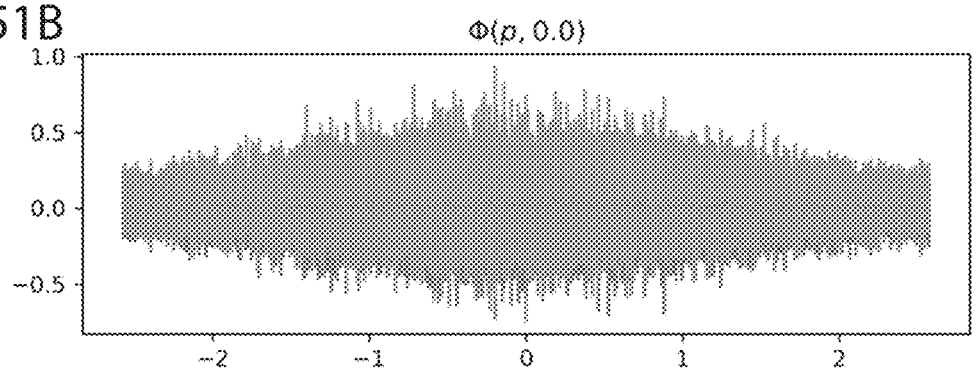
Figure 52A:
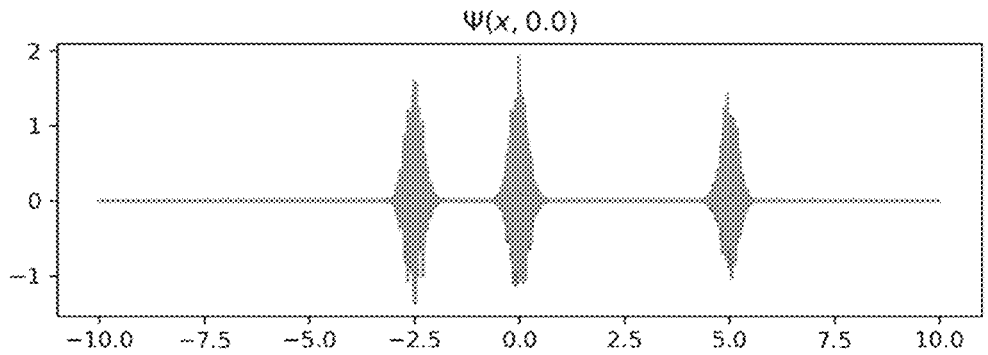
FIGS. 52A and 52B illustrate an example of a wave function of a state of a robotic device after observations, according to some embodiments.
Figure 52B:
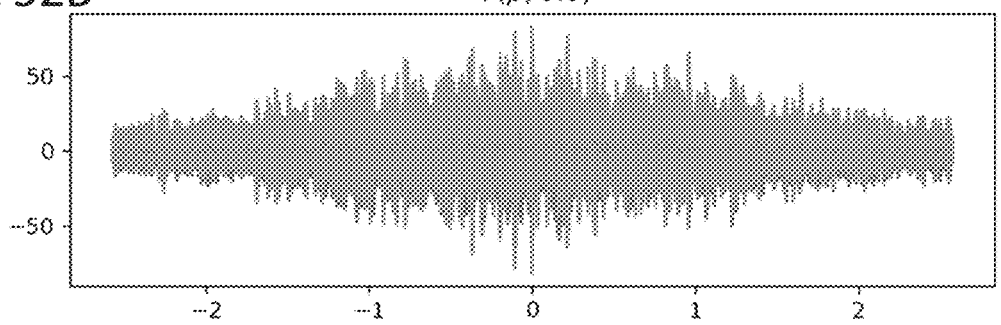
Figure 53A:
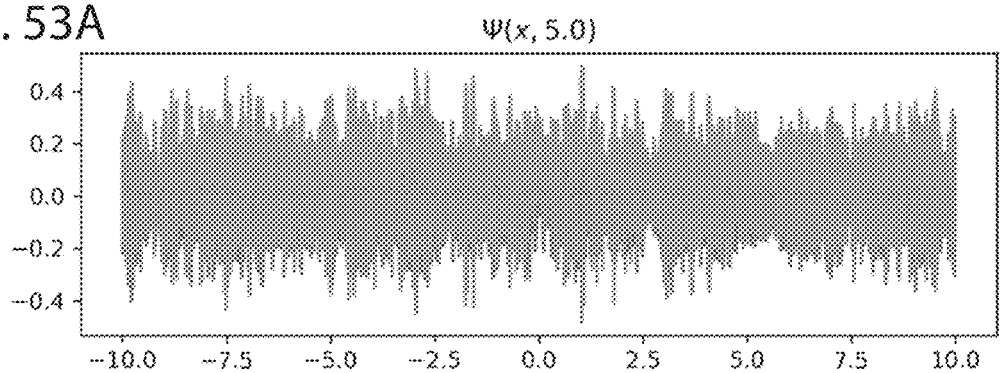
FIGS. 53A and 53B illustrate an example of an evolved wave function of a state of a robotic device, according to some embodiments.
Figure 53B:
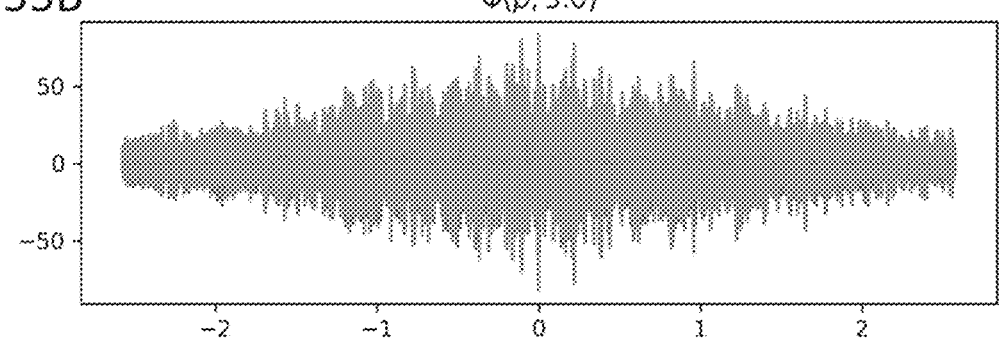
Figure 54A:
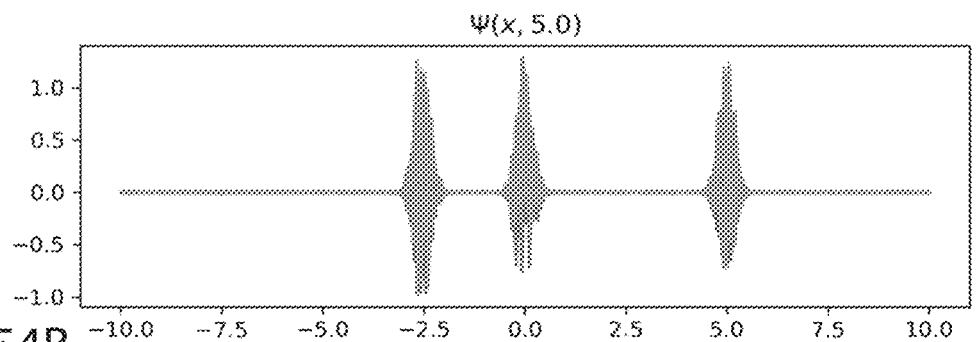
FIGS. 54A, 54B, 55A-55H, and 56A-56F illustrate an example of a wave function of a state of a robotic device after observations, according to some embodiments.
Figure 54B:
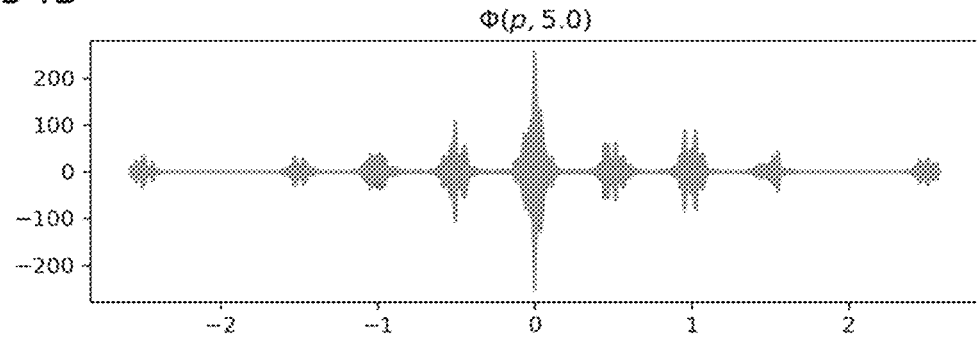
Figure 55A:
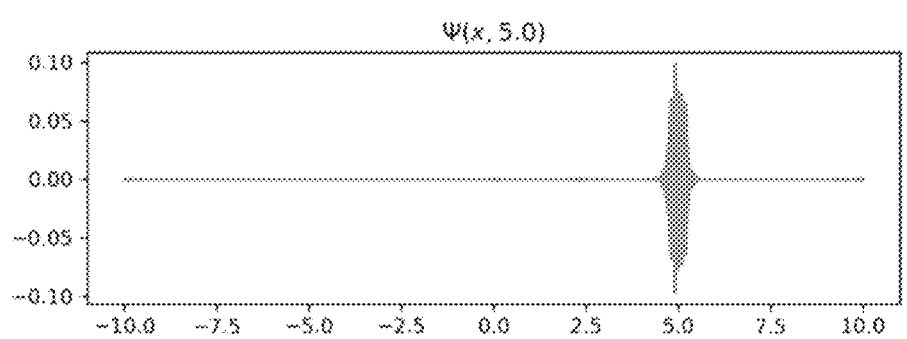
Figure 55B:
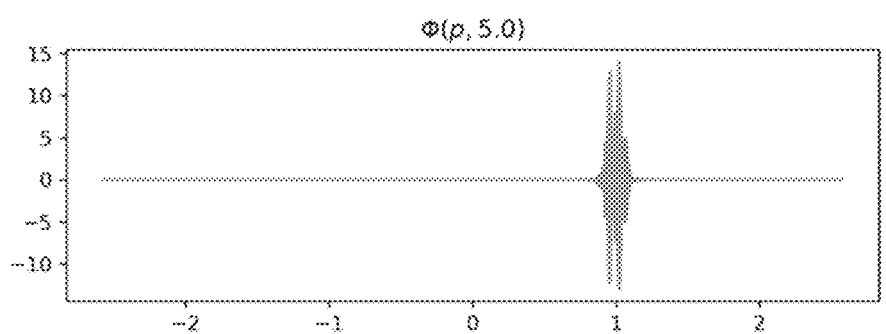
Figure 55C:
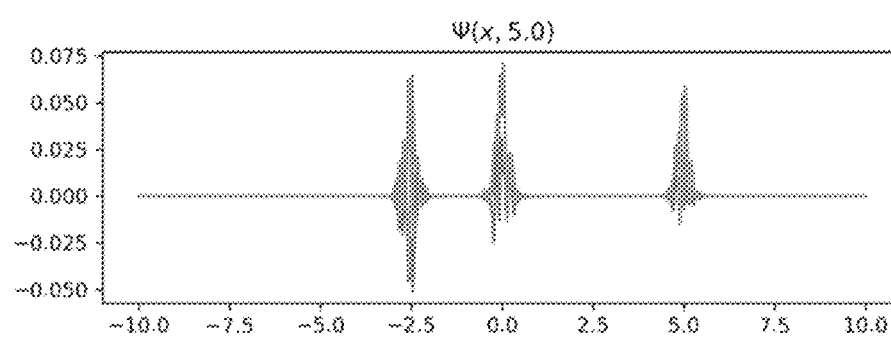
Figure 55D:
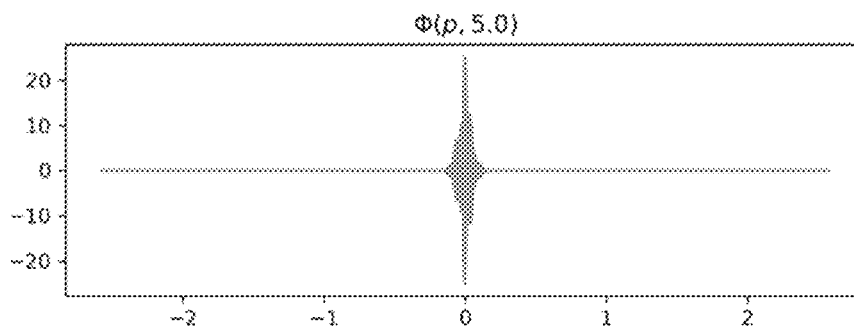
Figure 55E:
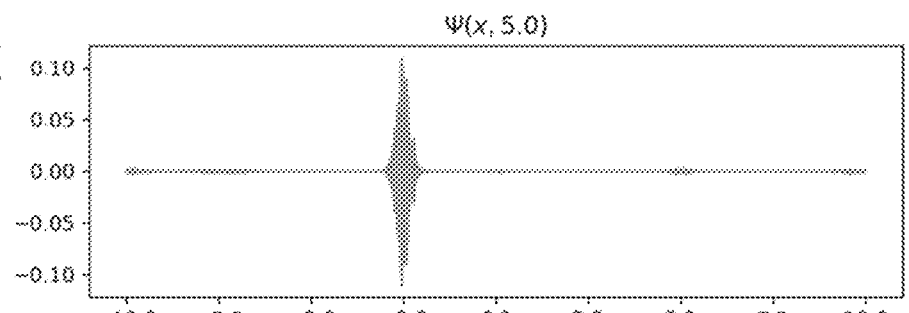
Figure 55F:
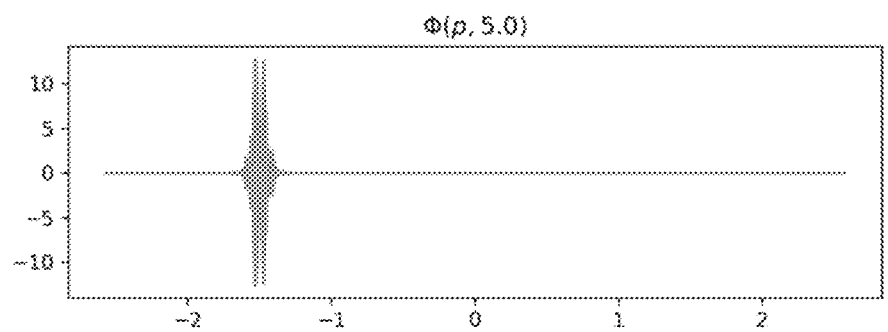
Figure 55G:
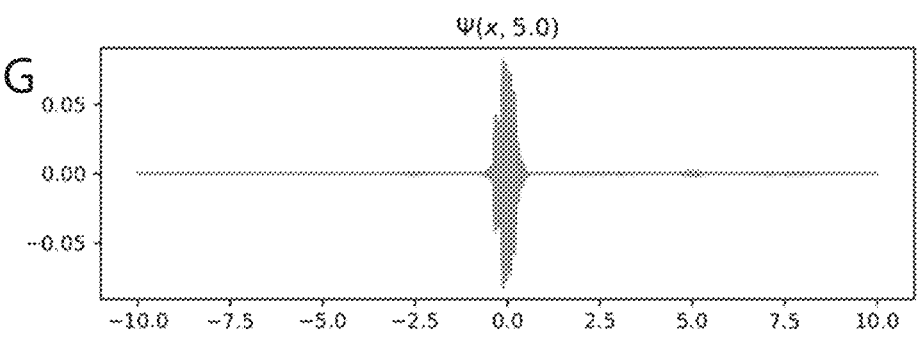
Figure 55H:
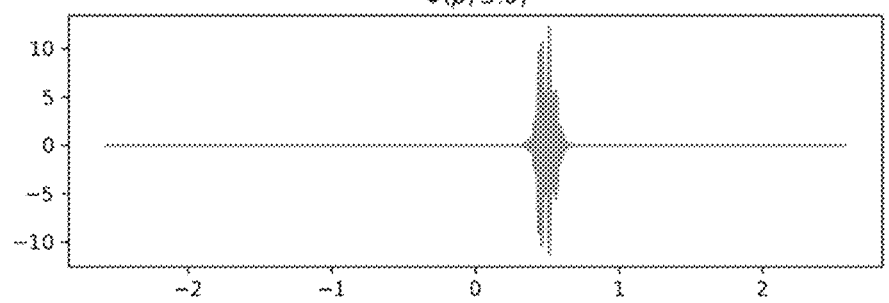
Figure 56A:
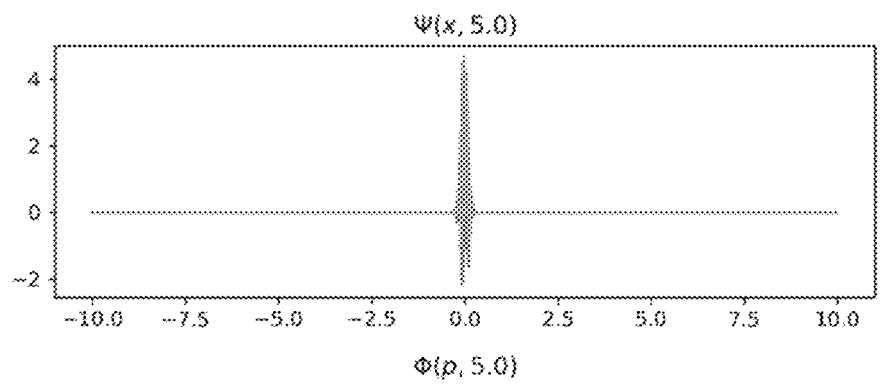
Figure 56B:
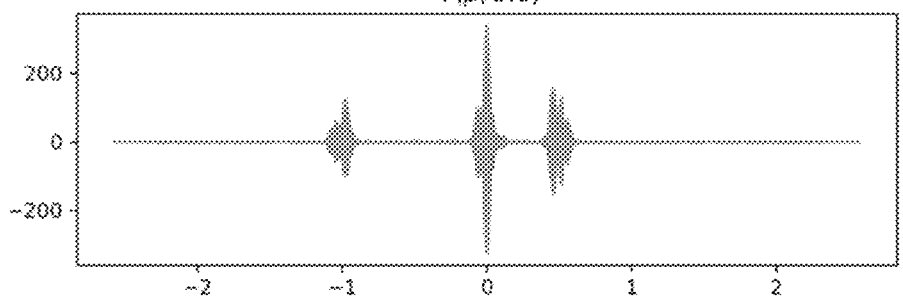
Figure 56C:
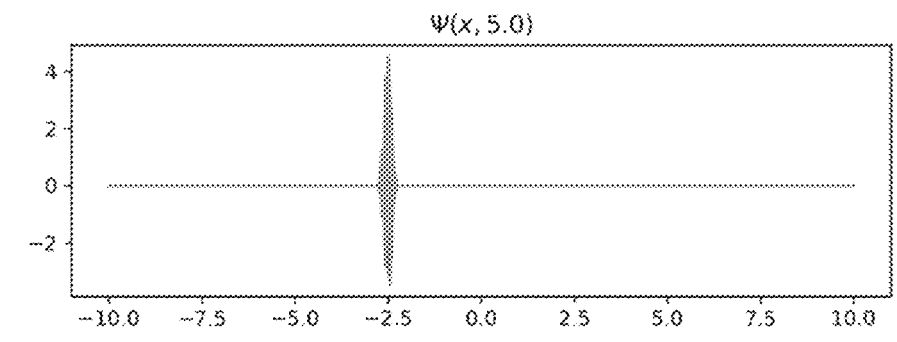
Figure 56D:
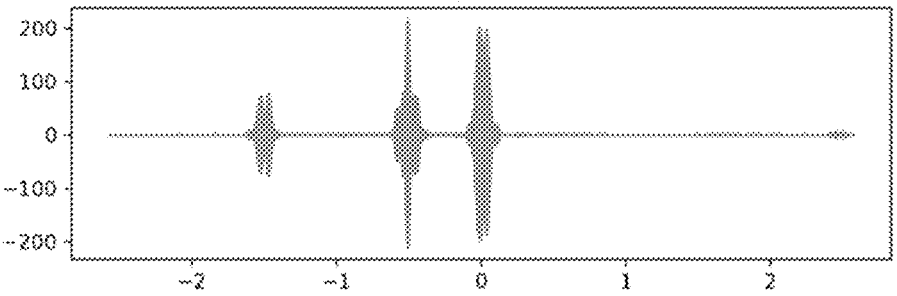
Figure 56E:
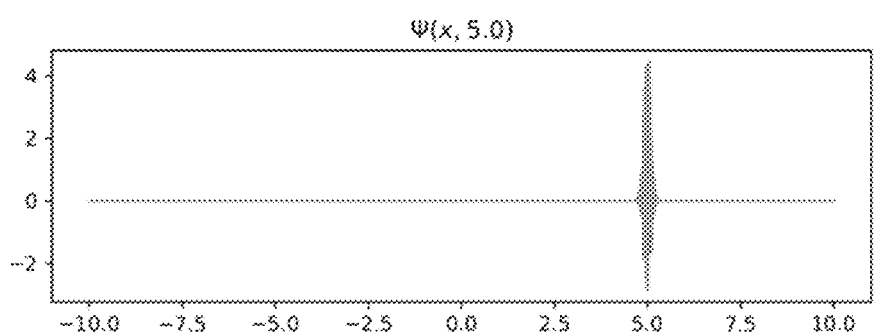
Figure 56F:
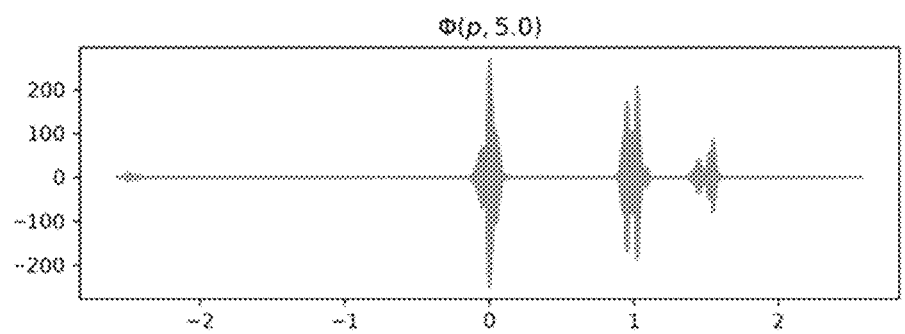

In quantum SLAM, wave functions represent probability amplitude of finding the system in some state. Physical pure states in quantum SLAM are represented as unit-norm vectors in a special complex Hilbert space and time evolution in this vector space is given by application of the evolution operator. Further, in quantum SLAM, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a robotic device navigates along a one-dimensional floor that includes three doors at doors at $x_0$=−2.5, $x_1$=0, and $x_2$=5.0 and the processor is capable of determining when it is located at a door based on sensor data observed and the momentum of the robotic device is constant, but unknown. Initially the location of the robotic device is unknown, therefore the processor generates initial wave functions of the state shown in FIGS. 51A and 51B. When the processor determines the robotic device is in front of a door, the possible position of the robotic device is narrowed down to three possible positions, but not the momentum, resulting in wave functions shown in FIGS. 52A and 52B. The processor evolves the wave functions with a Hamiltonian operator, and after five seconds the wave functions are as shown in FIGS. 53A and 53B, wherein the position space has spread out again given that the momentum is unknown. However, the evolved probability density keeps track of the correlation between position and momentum. When the processor determines the robotic device is in front of a door again, the wave functions are updated to FIGS. 54A and 54B, wherein the wave functions have significantly narrowed down, indicating a number of peaks representing possible position and momentum combinations of the robotic device. And in fact, if the processor observes another observation, such as momentum p=1.0 at t=5.0, the wave function in the position space also collapses to the only remaining possible combination, the location near x=5.0, as shown in FIGS. 55A and 55B. It can be seen that the processor collapsed the momentum wave function accordingly. Also, the processor reduced the position wave function to a peak at x=5.0. Given constant momentum, the momentum observation of p=1.0, and that the two door observations were 5 seconds apart, the position x=5.0 is the only remaining valid position hypothesis. FIGS. 55C and 55D illustrate the resulting wave function for a momentum observation of p=0.0 at t=5.0 instead. FIGS. 55E and 55F illustrate the resulting wave function for a momentum observation of p=−1.5 at t=5.0 instead. FIGS. 55G and 55H illustrate the resulting wave function for a momentum observation of p=0.5 at t=5.0 instead. Similarly, the processor collapses the momentum wave function when position is observed instead of momentum. FIGS. 56A and 56B illustrate the resulting wave function for a position observation of x=0.0 at t=5.0 instead. FIGS. 56C and 56D illustrate the resulting wave function for a position observation of x=−2.5 at t=5.0 instead. FIGS. 56E and 56F illustrate the resulting wave function for a position observation of x=5.0 at t=5.0 instead.

In some embodiments, wherein the state of the robotic device within the space is initially unknown, the processor may generate a uniform probability distribution over the space. In other instances, any other probability distribution may be generated depending on the information known about the state of the robotic device and the certainty of the information. Over time and as more measurements and observations are received by the processor, the probability distribution over all possible states of the robotic device in the space evolves.

In some embodiments, the processor initially assumes the robotic device is located somewhere within an area greater than the size of the robot, the location being the seed location of the robotic device. This is due to initial uncertainty in the position and heading of the robotic device and the surroundings. As more data is collected and the processor is more certain of the position of the robotic device relative to its surroundings, the processor reduces the size of area within which the robotic device is assumed to be located. On the other hand, as the robotic device moves and noise, such as movement noise, is introduced, the processor increases the area within which the robotic device is assumed to be located as uncertainty in the position of the robot increases. In some embodiments, the processor adjusts the shape of the area within which the robotic device is assumed to be located within based on deviation between the measured and true heading and translation of the robotic device as it moves. In some embodiments, the processor uses information on linear and angular undershoot and overshoot to help determine the shape of the area within which the robotic device is assumed to be located within. Force is needed to cause linear and angular acceleration and a given amount of force can either be spent on linear overshooting or angular overshooting. If the robotic device overshoots linearly it undershoots angularly and vice versa.

Figure 57A:
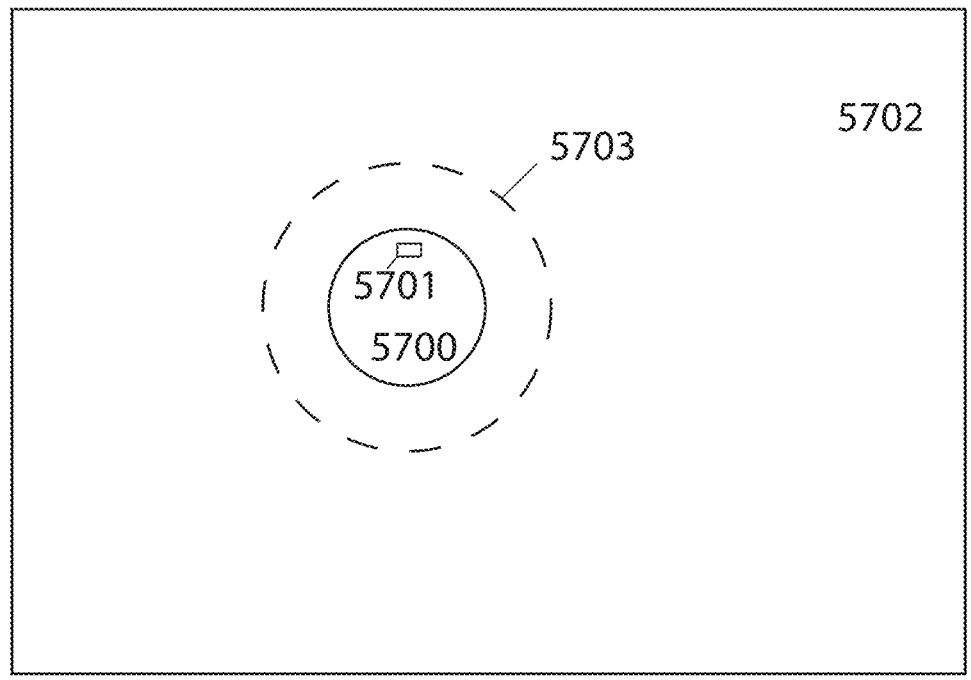
FIGS. 57A-57C illustrate an example of seed localization, according to some embodiments.
Figure 57B:
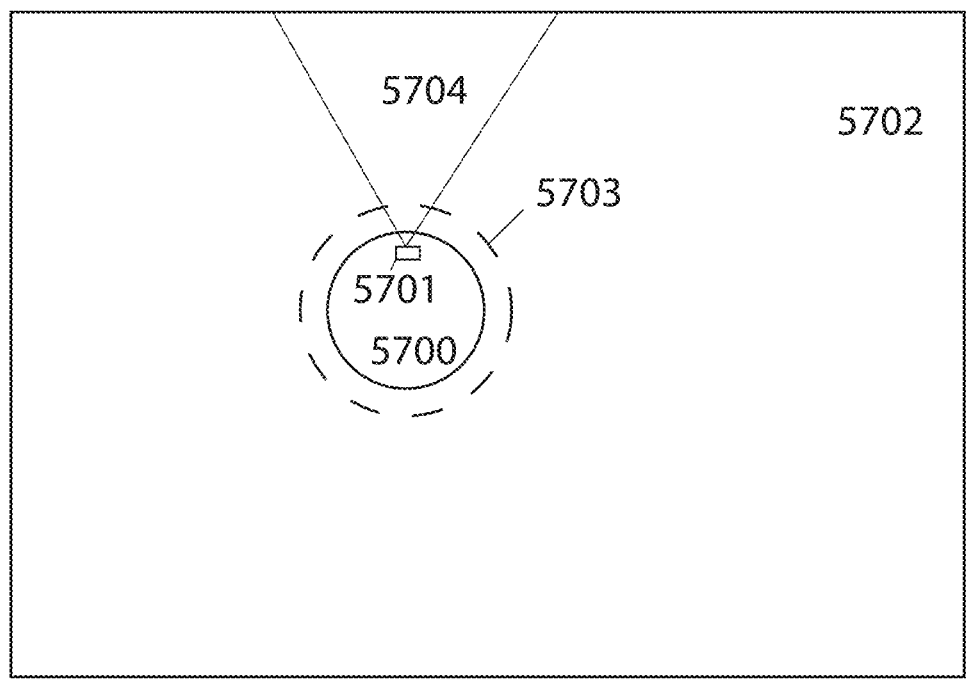
Figure 57C:
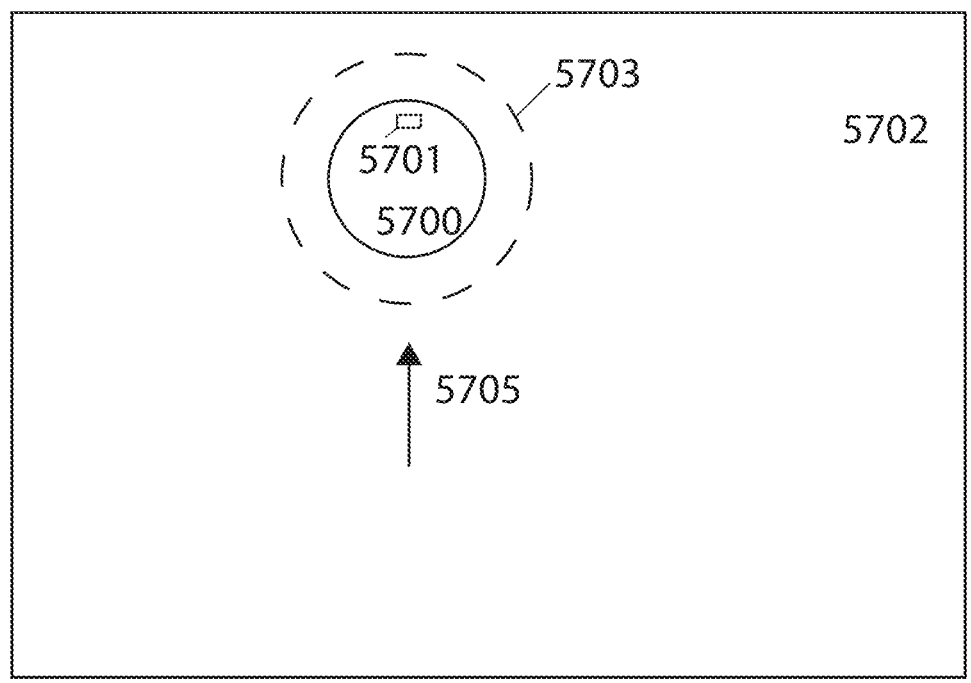
Figure 58:
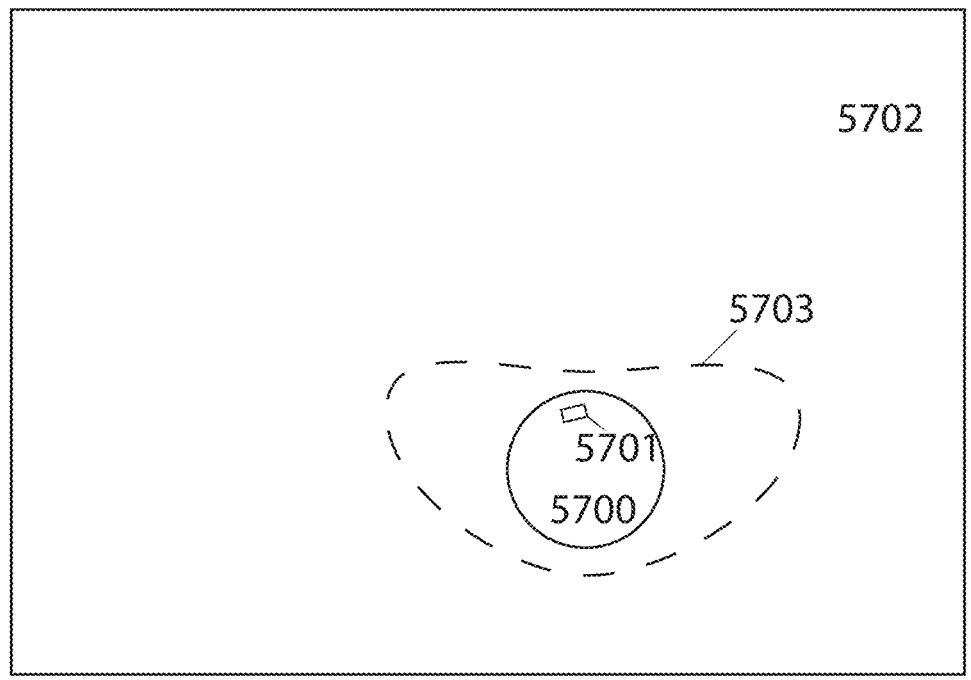
FIG. 58 illustrates an example of a shape of a region with which a robot is located, according to some embodiments.

FIGS. 57A-57C illustrate an example of how the area within which the robotic device is assumed to be located changes in size with the collection of data and movement of the robotic device. FIG. 57A illustrates robotic device 5700 with sensor 5701 within environment 5702. Robotic device 5700 rotates 360 degrees while sensor 5701 captures data of the environment. The processor of robotic device 5700 uses a subset of the data to create a low-resolution map of the environment. Initially, the processor of robotic device 5700 assumes robotic device 5700 is located somewhere within area 5703, greater in size than robotic device 5700 as there is uncertainty in the location of robotic device 5700. For example, the true rotation of the robotic device may not actually be exactly 360 degrees or the robotic device may not actually rotate exactly in place resulting in uncertainties in position and heading of the robotic device relative to the surrounding environment. FIG. 57B illustrates sensor 5701 capturing data of the environment within field of view 5704. As more data is captured and processed, the processor becomes more certain of the predicted location of robotic device 5700 and hence reduces the size of area 5703 within which the robotic device is assumed to be located. FIG. 57C illustrates robotic device 5700 moving within environment 5702 in direction 5705. As robotic device 5700 moves, noise, such as movement noise, is introduced and the processor increases area 5703 within which the robotic device is assumed to be located as uncertainty in the location of the robotic device 5700 increases. FIG. 58 illustrates an example of a shape of area 5703 within which robotic device 5700 with sensor 5701 is assumed to be located. As robotic device 5700 moves within environment 5702, the processor of robotic device 5700 adjusts the shape of area 5703 based on deviation between the measured and true heading and translation of robotic device 5700 as it moves. In some embodiments, the processor uses information on linear and angular undershoot and overshoot to help determine the shape of area 5703.

The multi-dimensionality in quantum localization described above provides robustness that may be useful in various applications. In some embodiments, the processor uses localization for controlling the operation, settings, and functionality of the robotic device. For example, the processor uses localization to control the behavior of the robotic device in different areas, where for instance, certain cleaning functions or settings are desired for different environments. These functions or settings may be triggered once the processor has localized the robotic device against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robotic device. If the processor localizes the robotic device against a boundary, for example, it may choose to select a path along the boundary or it may trigger a polymorphic or other type of path planning algorithm. Or, localizing the robotic device against a boundary may trigger a path planning algorithm for cleaning central areas of the environment and, once completed, a wall follow algorithm for cleaning along the boundaries of the environment.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multipurpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used.

In embodiments, other methods of localization may be used independently or in combination. Examples of localization methods are described in U.S. Patent Application Nos. 62/746,688, 16/297,508, 62/740,573, 62/740,580, Ser. Nos. 15/955,480, 15/425,130, and 15/955,344 the entire contents of which are hereby incorporated by reference.

In some embodiments, SLAM techniques (or any mapping and localization methods and techniques) may be combined with virtual reality. For example, the combination may be powerful in the real estate industry. Rather than manually capturing images used for selling a home, for example, consider a robot capable of mapping a home (as described above) while also capturing videos of the home. In some instances, the processor of the robot combines the generated map and the video to create a virtual reality of the home for potential buyers to experience. In some instances, the processor of the robot creates the virtual reality and shares it with an application of the communication device paired with the robot. In some embodiments, the processor may autonomously modify the virtual reality of the home by staging it with hypothetical furniture in the virtual reality space. In some embodiments, the processor may remove items captured in the virtual reality space. In some embodiments, the virtual reality is displayed by the application of the communication device and a user may choose VR objects (e.g., furniture) or VR features (e.g., paint color, flooring type) to add or remove from the virtual reality of the home. In some embodiments, the application includes preset staging packages (e.g., modern, luxury, chic, minimalist, etc.) that a user may choose using the application. In some embodiments, the application may be used by a user for interior design purposes. For example, the application may be used by the user to download specific VR objects, such as particular furniture from well-known furniture manufacturers, and place the VR objects within the VR home to determine if it fits within the space. In another example, the processor may be used to create a virtual reality of a street. The application of the communication device may be used by the user to remove cars and add potted flowers in the virtual reality of the street. In some embodiments, the virtual reality of an environment is generated while also mapping the environment as described above.

In some embodiments, the processor determines its actions (e.g., for a robotic surface cleaner, which cleaning tools to use or speed of a main brush or impeller) based on characteristics of the environment using methods similar to those described in U.S. patent application Ser. Nos. 16/239,410 and 16/163,530, the entire contents of which are hereby incorporated by reference. For example, in some embodiments, the processor of the robotic device uses the data from one or more environmental sensors (e.g., sensors that sense attributes or can observe or provide data from which inferences can be made about characteristics of an environment, such as those of a driving surface, the weather, obstacles, etc.) to determine actions in real-time. Examples of sensors include, but are not limited to, floor sensors, debris sensors, obstacle sensors, cliff sensors, acoustic sensors, cameras, optical sensors, distance sensors, motion sensors, tactile sensors, electrical current sensors, gyroscopes, odometers, optical encoders, IR sensors, and the like. Sensors may sense various attributes of one or more features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment and the processor obtains the sensor data. In some embodiments, the sensed data is associated with location data of the robot indicating the location of the robot at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, motor, etc.) based on the environmental characteristics inferred. In some embodiments, the processor activates or deactivates (or modulates intensity of) functions (e.g., vacuuming, mopping, UV, mowing, plowing, mining, etc.) based on the environmental characteristics inferred. In other instances, the processor adjusts a movement path, operational schedule (e.g., time when various designated areas are worked upon, such as when cleaned), and the like based on sensory data. Examples of environmental characteristics include floor type, obstacle density, activity level, room or area type, level of debris accumulation, level of user activity, time of user activity, weather conditions, road conditions, accident frequency, etc.

In some embodiments, the processor of the robotic device determines a movement path of the robot based on the map of the environment. For example, in some embodiments, the robotic device is configured to implement a path planning method that is responsive to stimulus from an observed environment using the processor of the robot. Some embodiments segment a working environment into regions and then dynamically adjust a coverage pattern within each of those regions abased on sensed attributes of the environment. In some embodiments, a topological graph represents the route plan of the robot and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robot as it follows along edges linked at vertices. While executing the movement path, in some embodiments, rewards may be assigned as the robot takes actions to transition between states and the net cumulative reward may be used to evaluate a particular movement path comprised of actions and states. The processor may iteratively calculate a state-action value function during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment.

In some embodiments, the next action or movement of the robot along a path defined by properties of vertices and edges chosen based on real-time sensory input is determined using a Markov Decision Process (MDP). As the robotic device executes an action, it transitions from a current state to a new state and movement from one state to the next is defined by a discrete time slot. This may be represented by a Markov Chain comprised of a sequence of random variables $s_1, s_2, s_3, \ldots$. The random variables are states the robotic device may experience and form a set S called the state space. The topological graph defining the movement path of the robotic device may therefore be thought of as a sequence of states $s \in S$, where states are connected by paths and are each defined with a discrete time stamp $t \in T$. For the robotic device to transition from a current state s to next state s', the robotic device performs an action $a \in A$ over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state is dependent only on the present state. This is mathematically represented by $P(s'|s)$. A Markov chain may, therefore, be represented by a topological graph, where the edges of graph t are labelled by the probabilities of transitioning from one state at time t to another at time t'. A Markov chain may be further extended to a MDP through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by $P(s'|s)$, the immediate reward after transitioning from state s to state s' given by r, and the discount factor $\gamma$, representing the difference in importance between future and present rewards. The goal of MDP is to find an optimal policy function $\pi$ that specifies the highest rewarded action a to take for each state s. For a MDP, after completing each action and transitioning to a new state, a reward is assigned and a state-action value function is iteratively calculated as the expected value of the current reward plus the discounted maximum future reward at the next state. The state-action value function provides the value of a state. The processor of the robot does not require any visualization in choosing the next action of the robot, it only involves, in some embodiments, optimization of the state-action value function. In optimizing the state-action value function, the highest rewarded actions from each state are concurrently (e.g., simultaneously) identified and used in deriving the optimal policy. In embodiments, where the time is not considered discrete, the value of the reward may be dependent on sequential time required to complete the action and transition to a new state, where a greater negative reward is assigned for longer times. In such a case, the robot is always incurring negative reward and actions having smaller negative reward are considered superior. (Of course, the selection of sign is arbitrary, and embodiments may also implement the reverse arrangement, which is not to suggest that any other description is limiting.) Events that increase the time required to complete an action and transition to the next state may therefore indirectly increase the amount of negative reward incurred. Other optimization factors may also assign negative reward, including but not limited to, collisions with obstacles, number of U-turns, repeat coverage, transitions between different types of flooring or switching rooms. Once the robot completes its task, and hence the movement path required to complete the task, a predetermined positive reward value is assigned. A net reward value for the executed movement path, consisting of a sequence of states and actions, is then calculated as the sum of the cumulative negative reward from the multiple actions taken while transitioning from one state to another and the positive reward upon completion of the task.

Over time, the goal is to find optimal state-action value function and optimal policy from which actions from different states are selected. For a single state, there may be several actions that can be executed. The sequence of states and actions that result in the maximum net reward provide the optimal state-action value function for a given state. The action for a given state that results in maximum reward provides the optimal policy for the given state. An optimal policy for a state space may then contain the highest valued action corresponding to multiple states. As different movement paths are executed over time, the number of states experienced, actions taken from each state, and transitions increase. The path devised by the processor of the robot may iteratively evolve to become more efficient by choosing transitions that result in most favorable outcomes and by avoiding situations which previously resulted in low net reward. After convergence, assuming the system did not fall into a local minimum or is able to get out of a local minimum, the evolved movement path is trusted to be more efficient than alternate paths which may be devised using real-time sensory input of the working environment. In order to get out of local maximin, stochastic optimization is employed. This provides a reliable and efficient method for a robotic device to devise path plans as their movements are evaluated and optimized in real-time such that the most efficient movements are eventually executed and factors reducing efficiency, including but not limited to, repeat coverage, collisions with obstacles, transitions between different types of flooring, and U-turns, are reduced with the fine-tuning of properties over time.

The MDP consisting of a sequence of states and actions followed by rewards is mathematically notated below. Actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t, a_t, r_{t+1}, s_{t+1}, a_{t+1}, r_{t+2}, s_{t+2}, a_{t+2}, r_{t+3}, \ldots \alpha_T, r_T, s_T$. In some embodiments, the processor determines the net return $R_T = r_{t+1} + \gamma^1 r_{t+2} + \ldots + \gamma^{T-t-1} r_T$ to be expected in the future as the sum of the rewards received for the sequence of states and actions beginning from state $s_t$ and ending with terminal state $S_T$, wherein $0 \leq \gamma < 1$ is a discount factor applied as distant rewards are less important. In some embodiments, the processor determines the value of a state-action pair using $Q(s, \alpha) = E[R_T | s_t = s, \alpha_t = \alpha]$ which is equivalent to the expected return $R_T$ for the sequence of states and actions beginning with state $s_t$ and action $\alpha_t$ and ending with terminal state $s_T$. By finding the sequence of states and actions which maximize the state-action value function Q (s, $\alpha$), the processor determines the optimal value function $Q^*(s, \alpha) = \max E[R_T | s_t = s, \alpha_t = \alpha]$. And the optimal policy $\pi^*(s) = \arg \max Q^*(s, \alpha)$ for each state can be derived by the processor by identifying the highest valued action which can be taken from each state. To iteratively calculate the state-action value function for a given state s and action $\alpha$, the processor may apply the Bellman Optimality equation. In some embodiments, the processor uses the optimal value function $Q^*(s, \alpha) = E[r + \gamma \max Q^*(s', \alpha')]$, obeying the Bellman Optimality equation. The equation expresses that the value for a given state s and action $\alpha$ should represent the current reward r observed at state s plus the maximum discounted $\gamma$ future reward for the next state s' the robot would end up in. In some embodiments, the processor uses the optimal value function to iteratively calculate the state-action value for a given state s and action a as the sequence of states and action are executed using $Q_{i+1}(s, a) = E[r + \gamma \max Q_i(s', a')]$. i is the iteration number and begins at i=0, with $Q_0(s', \alpha')$ being initially assumed based, for example, on previous experience, the midpoint of the min and max value possible, or an arbitrary value. Based on the definition of an expected value, the equation is equivalent to $Q_{i+1}(s, \alpha) = \Sigma P(s'|s)[r + \gamma \max Q_i(s', \alpha')]$, wherein P(s'|s) is the probability that action a will lead to state s', as previously described above. In some embodiments, the sequence of states and actions corresponds to the states visited and actions taken while executing the movement path from start to finish, where actions are defined by the properties of vertices and edges chosen based on sensory input of the robot. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions. Detailed examples of path planning methods are described in U.S. patent application Ser. Nos. 16/041,286, 15/406,890, 14/673,633, 14/817,952, and 16/198,393, the entire contents of which are hereby incorporated by reference.

In some embodiments, the processor divides the environment into subareas and orders them for coverage to improve operational efficiency. In some embodiments, the robotic device finishes operating in one subarea before operating in another subarea. For example, in some embodiments, the processor divides the map into a plurality of cells wherein each cell corresponds to an area of the environment. In some embodiments, the processor segments the map into a plurality of zones, each zone having a subset of the plurality of cells. In some embodiments, the processor determines a sequence of the zones among a plurality of candidate sequences based on an effect of the sequence on a cost of a cost function that is based on travel distance of the robot through the sequence. In some embodiments, the robot traverses the zones in the determined sequence. In some embodiments, the cost function is based on other variables, such as actual surface coverage of zones, repeat coverage of zones, and total operational time.

In some embodiments, the processor represents the map of a workspace by a plurality of cells, each cell representing a different location of the workspace. In some embodiments, each cell is defined by an ordered pair representing an angle and a distance from an origin of a coordinate system. In some embodiments, each cell of the workspace can only belong to a single zone and overlap between zones is avoided by construction. In some embodiments, entries in the matrices of zones have a value of zero if cell is empty or a value of one if the cell is occupied (e.g., by an object such as a wall, a building, a car, furniture, etc.). An entry in a matrix simply refers to a position within the matrix (e.g., row and column in a two-dimensional matrix). In some embodiments, an entry may include a numerical value, classification, or other description type, etc. of a parameter (e.g., cell occupancy, pixel brightness, pixel position, etc.). Parameters may be qualitative (e.g., a classification) or quantitative (e.g., indicated by a numerical value). For example, a parameter may be cell occupancy given by a classification of occupied or unoccupied. Or a parameter may be pixel brightness given by a numerical value indicative of pixel brightness. In some embodiments, the processor executes the following iteration for each zone of a sequence of zones, beginning with the first zone to optimize division of zones: expansion of the zone if neighbor cells are empty, movement of the robotic device to a point in the zone closest to the current position of the robot, addition of a new zone coinciding with the travel path of the robot from its current position to a point in the zone closest to the robot if the length of travel from its current position is significant, execution of a surface coverage pattern within the zone, and removal of any uncovered cells from the zone. In another embodiment, the processor determines an optimal coverage plan by minimizing a cost function. In some embodiments, the cost function depends on distance travelled between zones, total coverage, and total operational time. In some embodiments, the cost function is minimized by removing, adding, shrinking, expanding, moving and switching the order of coverage of zones. In some embodiments, the processor uses gradient descent to compute the division of zones that results in minimal cost by iteratively modifying division of zones based on a partial derivative of the cost function with respect to each respective parameter defining the zones. This is repeated until the cost is below a predetermined threshold. In yet another embodiment, the processor determines optimal division of zones by modeling zones as emulsions of liquid. Behaviors of emulsions of liquid, such as minimization of surface tension and surface area and expansion and contraction of the emulsion driven by an internal pressure are used by the processor in modeling the zones. In some embodiments, the processor represents the workspace by a grid map divided into zones. In some embodiments, the grid map is converted into a routing graph consisting of nodes connected by edges. A zone is represented by a set of nodes. The nodes are connected and represent an area on the grid map. A zone is assigned a set of boundary edges wherein a boundary edge connects two nodes. The set of boundary edges define the set of boundary nodes and give information about which are just inside and outside a zone. In some embodiments, a zone can be expanded or reduce by adding or removing nodes. In some embodiments, the processor computes a numerical value assigned to each node. In some embodiments, the value of each node indicates whether to add or remove the node from a zone. In some embodiments, the numerical value computed is dependent on growth and decay of the zone, distance of the node from the center of the zone, order of zone coverage, and a surface smoother score. In some embodiments, the processor computes an order score for each node to determine order of coverage based on the distance between the boundary node of interest and the closest boundary node in the next zone to be covered, the distance between the closest boundary nodes between the current zone and the next zone to be covered, and the distance between the furthest boundary nodes between the current zone and the next zone to be covered. Further details and examples of methods for dividing an environment into subareas are described in U.S. patent application Ser. Nos. 14/817,952, 16/198,393, and 62/740,558, the entire contents of which are hereby incorporated by reference. In some embodiments, during coverage the processor of the robot recognizes a room. In some embodiments, the processor instructs the robot to skip coverage of the room upon recognizing the room (e.g., as a room that has previously been covered either in the same or different work sessions). In some embodiments, a user may choose particular areas for the robot to skip for coverage.

In some embodiments, the memory of the robotic device may contain an internal database of obstacles likely to be encountered within the environment. In some embodiments, the database may further include humans likely to be encountered. In some embodiments, the camera of the robotic device or of a communication device held by the robotic device captures images of obstacles (and humans in some cases) in the environment. In some embodiments, the processor (of the robot or the communication device) identifies an obstacle by extracting features of the obstacle and comparing it with features of obstacles stored in the internal database. Similar methods may be applied for identifying humans captured in images. In some embodiments, the processor increases the likelihood of encountering that type of obstacle in the region of the environment in which it was encountered. For example, when a robot encounters a remote, image sensors of the robot capture images of the remote and the processor determines it is a remote based on features of remote extracted from the image matching with features of a remote stored in an internal database. The processor of the robot may mark the region in which the remote was encountered within an internal map as a region with increased likelihood of containing a remote. In some embodiments, regions wherein obstacles are consistently encountered may be classified by the processor as a high obstacle density area. In some embodiments, the processor of the robot may attempt to alter its movement path to avoid areas with high obstacle density. In some embodiments, the date, time, location, and type of obstacle encountered may be catalogued for use in future working sessions. In some embodiments, for example, where obstacles are encountered frequently at a similar time, a robot may plan a working session for such an area when obstacles are encountered less frequently, and may prioritize working in other locations at such times.

In some embodiments, all data are processed on the robot. In other embodiments, some data are processed on at least one separate device, such as a docking station of the robot, a communication device, or another external computing device.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, the localization techniques described herein may be implemented on a localization chip or a processing chip with localization processing unit. In some embodiments, a localization and mapping chip or a processing chip such as a CPU or MCU with a localization and mapping processing unit may be used.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A robotic device, comprising:
a chassis including a set of wheels;
a motor to drive the set of wheels;
a battery to power the robotic device;
a controller in communication with the motor and wheels, the controller including a processor operable to control the motor and wheels to steer movement of the robotic device;
a camera; and,
a tangible, non-transitory, machine readable medium storing instructions that when executed by an image processor effectuates operations comprising:
causing the camera to capture one or more images of an environment of the robotic device;
receiving, with the image processor, one or more multidimensional arrays including at least one parameter that describes a feature included in the one or more images, wherein values of the at least one parameter correspond with pixels of a corresponding one or more images of the feature;
determining, with the image processor, an amount of asymmetry of the feature in the one or more images based on at least a portion of the values of the at least one parameter; and,
transmitting, with the image processor, a signal to the processor of the controller to adjust a heading of the robotic device by an amount proportional to the amount of asymmetry of the feature, and
wherein the robotic device maintains its heading while moving along a movement path within the environment until it either reaches a border of the environment or the image processor detects asymmetry of the feature in the one or more images.

2. The robotic device of claim 1, wherein determining the amount of asymmetry comprises comparing at least a portion of the values of the at least one parameter corresponding with pixels of a first portion of an image of the one or more images with at least a portion of the values of the at least one parameter corresponding with pixels of a second portion of the image.

3. The robotic device of claim 2, wherein the first portion of the image and the second portion of the image correspond to a division of the image about a vertical line or horizontal line.

4. The robotic device of claim 1, wherein the movement path is perpendicular or parallel to a surface of the feature.

5. The robotic device of claim 1, wherein the feature is projected onto a surface perpendicular or parallel to the movement path of the robotic device using one or more light emitters.

6. The robotic device of claim 1, wherein determining the amount of asymmetry comprises:
counting a number of columns or rows of pixels found between a division line of an image of the one or more images and a first column or row of pixels containing at least one pixel with brightness intensity above a predetermined threshold in a first and second direction from the division line, and
subtracting a number of pixels from the other, the second direction being opposite the first,
wherein a direction of the heading adjustment is indicated by a sign of the amount of asymmetry, wherein a positive and a negative amount of asymmetry indicate opposite directions.

7. The robotic device of claim 6, wherein determining the heading adjustment comprises multiplying the amount of asymmetry by a predetermined ratio of heading adjustment per pixel.

8. The robotic device of claim 1, wherein determining the amount of asymmetry comprises comparing the overlap of pixels between two images captured consecutively.

9. The robotic device of claim 1, wherein determining the amount of asymmetry comprises:
identifying a position of a first point of the projected feature in an image of the one or more images by a first set of coordinates and a position of a second point of the projected feature in the image by a second set of coordinates, the second point symmetrically corresponding with the first point when the heading is accurate, and,
determining the distance of the first point and second point from a division line in the image and subtracting one distance from the other.

10. The robotic device of claim 9, wherein determining the heading adjustment comprises multiplying the amount of asymmetry by a predetermined ratio of heading adjustment per unit of distance.

11. The robotic device of claim 1, wherein the feature comprises a line, a curve, a polygon, one or more points, an edge, or a corner.

12. The robotic device of claim 1, wherein the camera continuously captures images of the feature and the image processor continuously monitors and determines any adjustment required in the heading of the robotic device based on the captured images.

13. A method for guiding a robotic device, comprising:
capturing, with a camera, one or more images of a feature of an environment;
receiving, with an image processor, the one or more images of the feature;
determining, with the image processor, an amount of asymmetry of the feature in the one or more images based on at least a portion of the pixels in the one or more images; and,
transmitting, with the image processor, a signal to a controller in communication with a wheel motor of a robotic device to adjust the heading of the robotic device by an amount proportional to the amount of asymmetry of the feature,
wherein the controller maintains the heading of the robotic device while moving along a movement path until the robotic device either reaches a border or the image processor detects asymmetry of the feature in the one or more images.

14. The method of claim 13, wherein the feature is projected onto a surface using one or more light emitters.

15. The method of claim 13, wherein the camera continuously captures images of the environment and the image processor constantly monitors and determines any adjustment required in the heading of the robotic device based on the captured images.

16. The method of claim 13, wherein the image processor uses at least a portion of the one or more images to determine a distance to a surface of the feature.

17. The method of claim 13, wherein adjusting the heading of the robotic device comprises:
counting, with the image processor, a number of columns or rows of pixels between a division line of an image of the one or more images and a first column or row of pixels containing at least one pixel with brightness intensity above a predetermined threshold in a first and second direction from the division line and subtracting one number of pixels from the other to obtain the amount of asymmetry, the second direction being opposite from the first; and,
determining, with the image processor, the heading adjustment by multiplying the amount of asymmetry by a predetermined ratio of heading adjustment per pixel.

18. The method of claim 13, wherein adjusting the heading of the robotic device comprises:
identifying, with the image processor, a position of a first point of the feature in an image of the one or more images by a first set of coordinates and a position of a second point of the feature in the image by a second set of coordinates, the second point symmetrically corresponding with the first point when the heading is accurate;
determining, with the image processor, the distance of the first point and the second point from a division line of the image and subtracting one distance from the other to obtain the amount of asymmetry; and,
determining, with the image processor, the heading adjustment by multiplying the amount of asymmetry by a predetermined ratio of heading adjustment per unit of distance.

19. The method of claim 13, wherein the feature comprises one or more of a line, a curve, a polygon, one or more points, an edge, a corner, a wall, and a floor.

20. The method of claim 13, wherein determining the amount of asymmetry of the feature comprises comparing an overlap of pixels between two images captured consecutively.

* * * * *